(12) United States Patent
Nagaki et al.

(10) Patent No.: US 10,439,374 B2
(45) Date of Patent: Oct. 8, 2019

(54) WIRE GRIPPER

(71) Applicant: NAGAKI SEIKI Co., Ltd., Daito-shi, Osaka (JP)

(72) Inventors: Takayuki Nagaki, Daito (JP); Tamotsu Iwama, Daito (JP)

(73) Assignee: NAGAKI SEIKI CO., LTD., Daito-Shi, Osaka (JP)

(*) Notice: Subject to any disclaimer, the term of this patent is extended or adjusted under 35 U.S.C. 154(b) by 241 days.

(21) Appl. No.: 15/322,404

(22) PCT Filed: Jun. 13, 2016

(86) PCT No.: PCT/JP2016/067542
§ 371 (c)(1),
(2) Date: Dec. 27, 2016

(87) PCT Pub. No.: WO2017/119149
PCT Pub. Date: Jul. 13, 2017

(65) Prior Publication Data
US 2018/0212407 A1  Jul. 26, 2018

(30) Foreign Application Priority Data

Jan. 6, 2016  (JP) .................................. 2016-001102
Mar. 16, 2016  (JP) .................................. 2016-052463

(51) Int. Cl.
*H02G 1/04* (2006.01)
*B65H 59/00* (2006.01)
(Continued)

(52) U.S. Cl.
CPC .............. *H02G 1/04* (2013.01); *B65H 59/00* (2013.01); *H02G 1/00* (2013.01); *B65H 2701/34* (2013.01);
(Continued)

(58) Field of Classification Search
CPC .............. Y10T 24/3936; Y10T 24/394; Y10T 24/3956; H02G 1/00; H02G 1/02;
(Continued)

(56) References Cited

U.S. PATENT DOCUMENTS 3,599,297 A * 8/1971 Sievers .................. F16G 11/105
24/132 R
2015/0244154 A1 * 8/2015 Nagaki .................. H02G 7/056
254/134.6

FOREIGN PATENT DOCUMENTS

JP  3163196 U  9/2010
JP  3180307 U  11/2012
(Continued)

*Primary Examiner* — Abigail E Troy
(74) *Attorney, Agent, or Firm* — Rabin & Berdo, P.C.

(57) ABSTRACT

Provided is a wire gripper that can make it easier to lift its tip being grasped by fingers. A wire gripper 10 includes: a wire gripper body member 12 including a fixed gripping body 20 having a linear body pressing portion 24; an operating member 14 pivotably mounted to the wire gripper body member 12 through a support shaft 70; a movable gripping body member 16 including a linear body holding portion 22 that pivotally moves toward the linear body pressing portion 24 of the fixed gripping body 20 in accordance with the pivotal movement of the operating member 14; and a coupling member 18 coupled to the operating member 14 through a rotary shaft 72 for coupling member for pivotally moving the operating member 14. The coupling member 18 includes a ring portion 130 provided at the backward end of an elongate coupling member body 80. The ring portion 130 is bent at a prescribed angle in the bending region 100 relative to a reference plane Pyz including a lateral axis along which the linear body pressing portion 24 and the linear body holding portion 22 extend.

5 Claims, 33 Drawing Sheets

(51) Int. Cl.
    *H02G 1/00*         (2006.01)
    *F16B 2/10*         (2006.01)
    *F16B 2/18*         (2006.01)
    *H02G 7/02*         (2006.01)

(52) U.S. Cl.
    CPC ................. *F16B 2/10* (2013.01); *F16B 2/185* (2013.01); *H02G 7/02* (2013.01)

(58) Field of Classification Search
    CPC . H02G 1/04; H02G 7/02; B65H 59/00; B65H 2701/34; F16B 2/10; F16B 2/185; F16G 11/00
    See application file for complete search history.

(56) References Cited

FOREIGN PATENT DOCUMENTS

| | | | | |
|---|---|---|---|---|
| JP | 2013-247744 A | 12/2013 | | |
| JP | 5465733 B2 | 4/2014 | | |
| WO | WO-2014045616 A1 * | 3/2014 | ............... | H02G 1/04 |

* cited by examiner

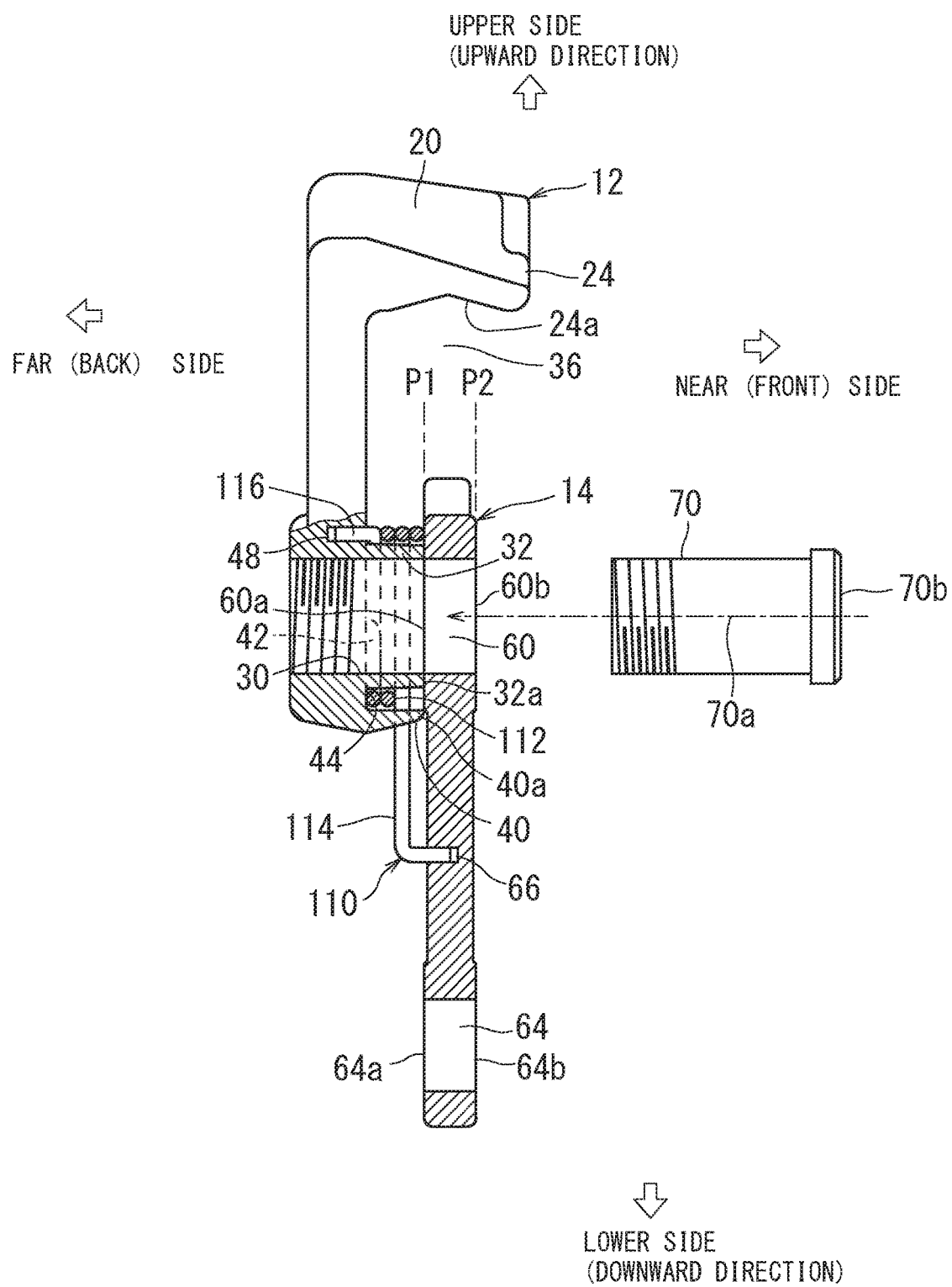

FIG. 7A
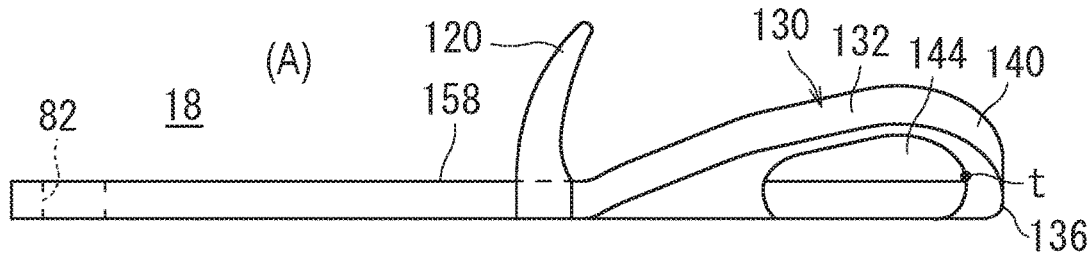
(A)
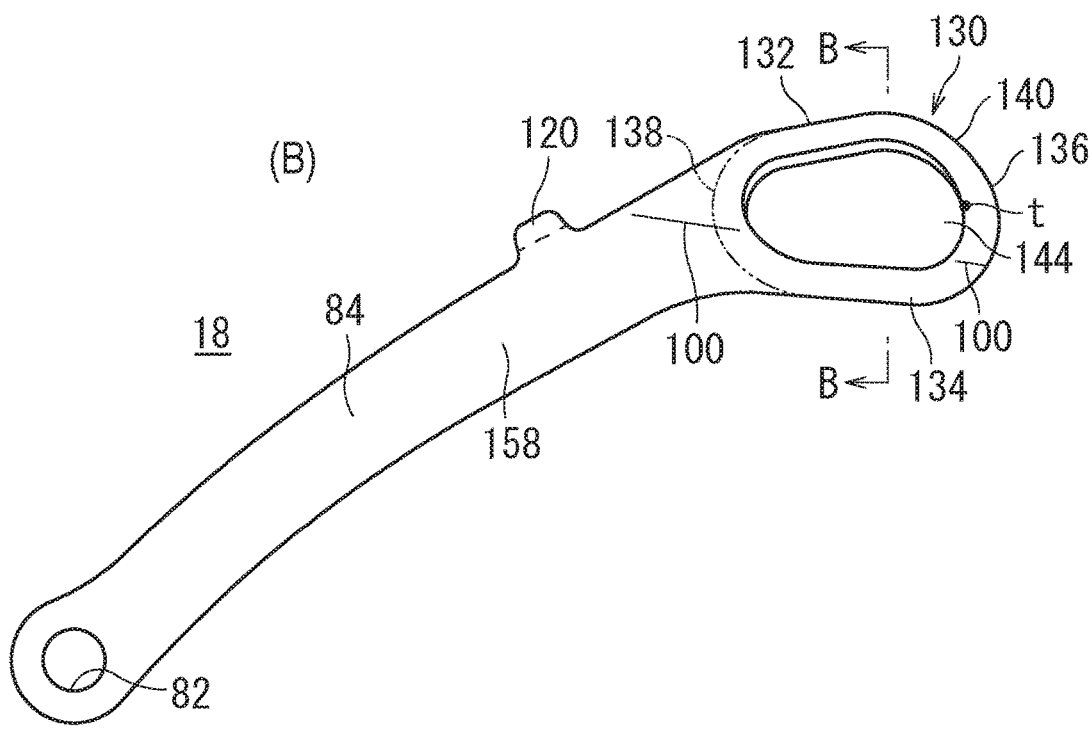
(B)
(C)
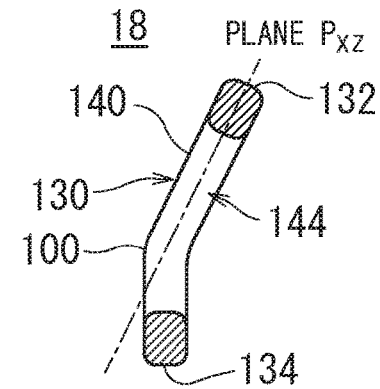
CROSS SECTIONAL SURFACE B-B

FIG. 7B
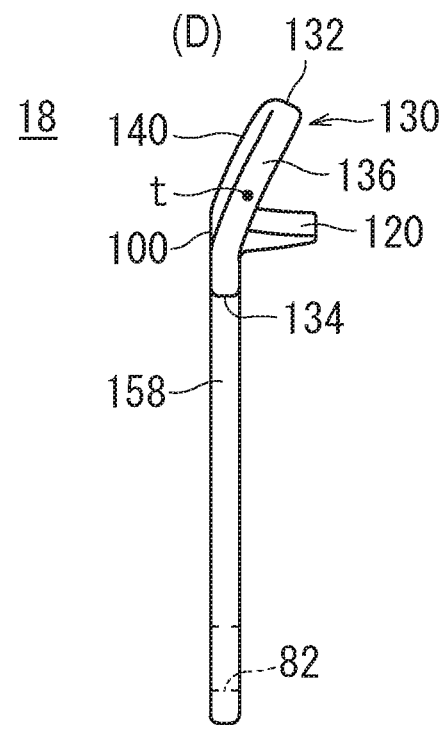
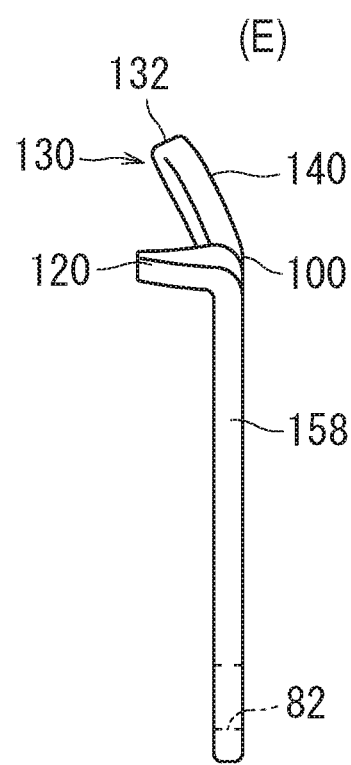

FIG. 17
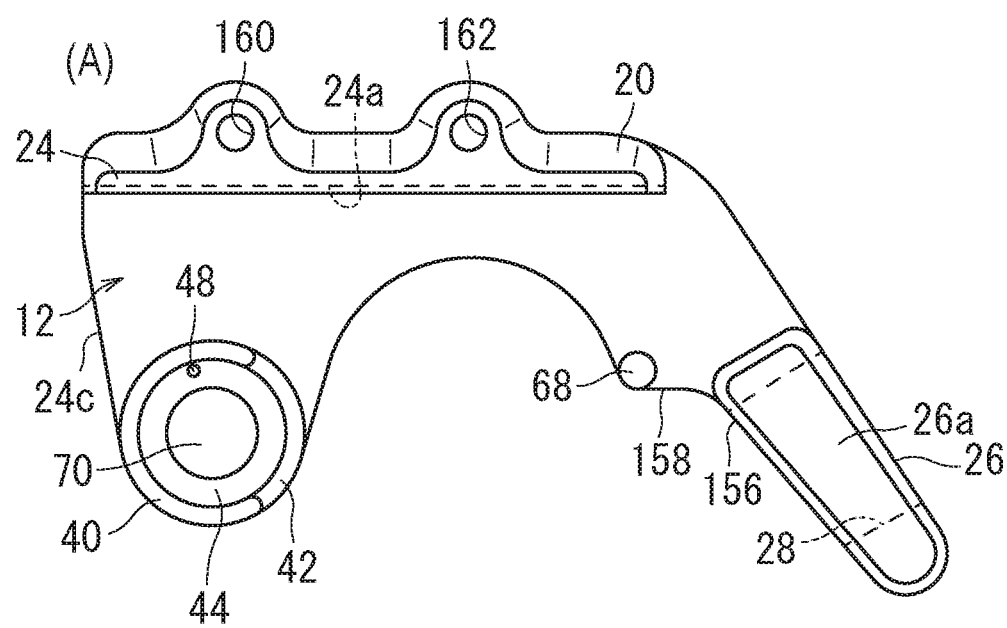
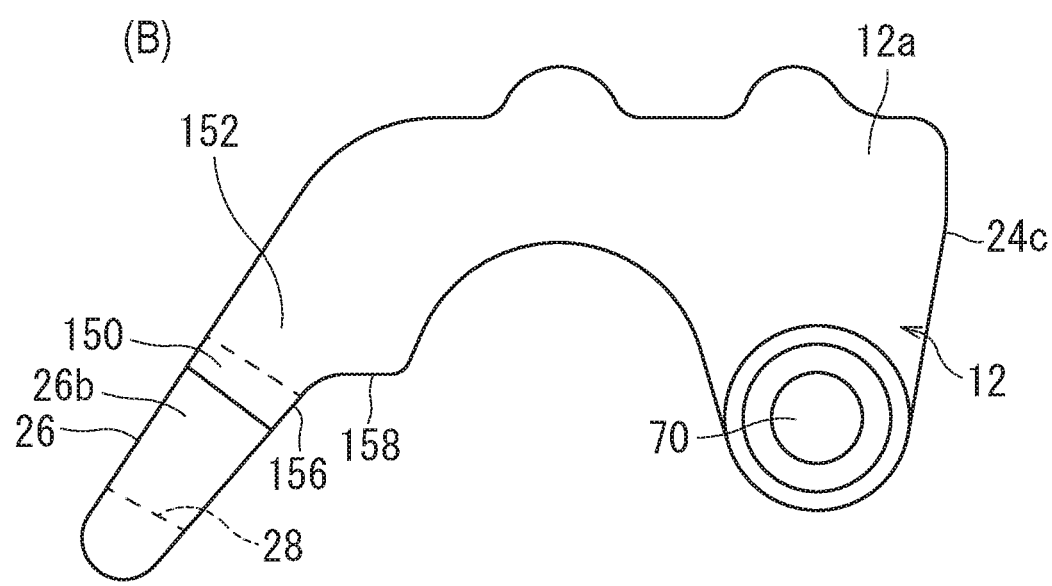

FIG. 23A
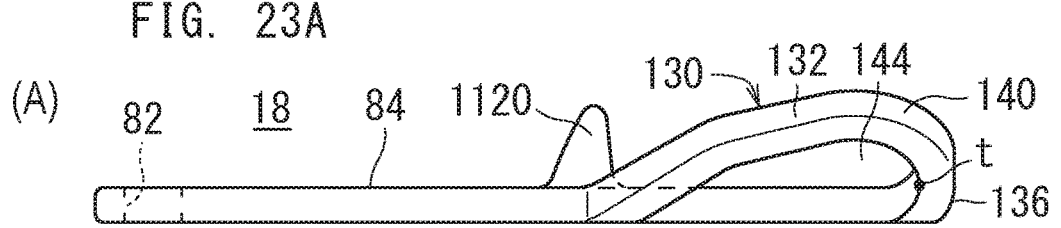
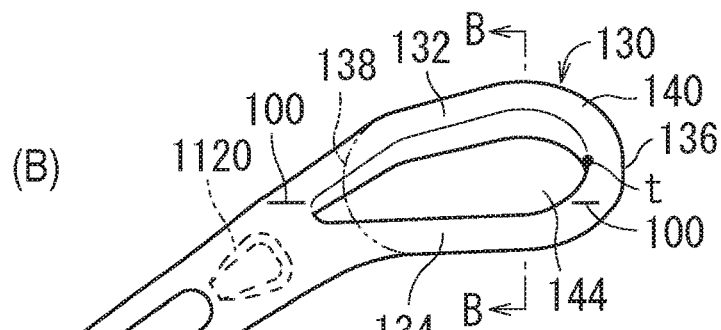
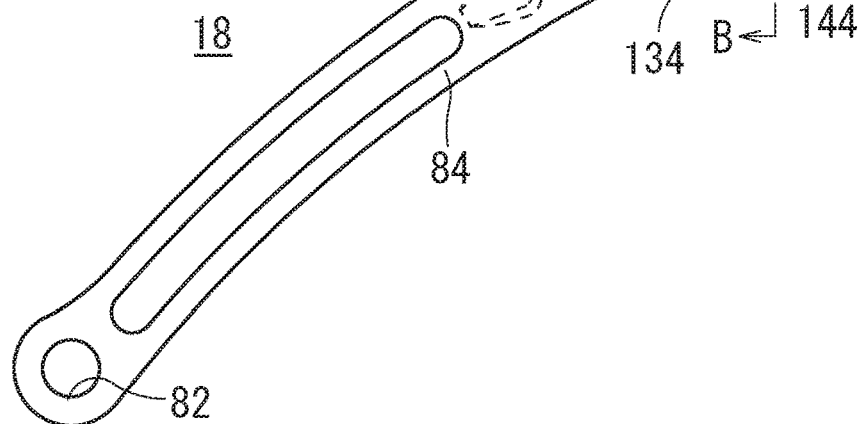
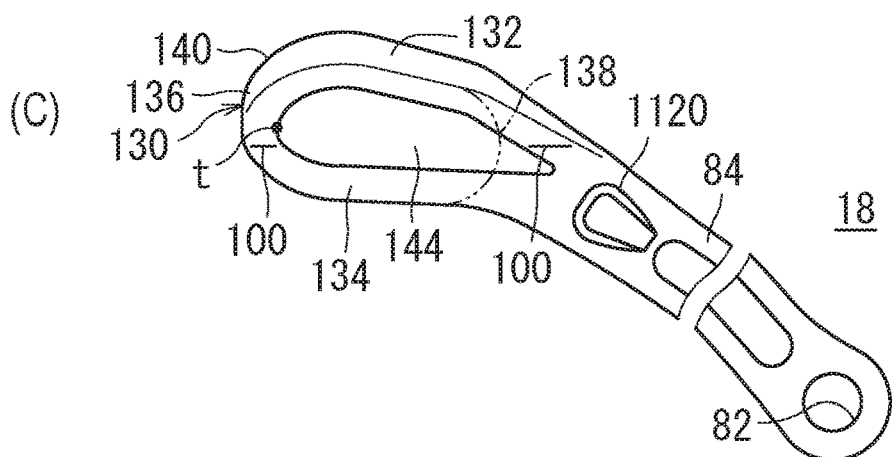
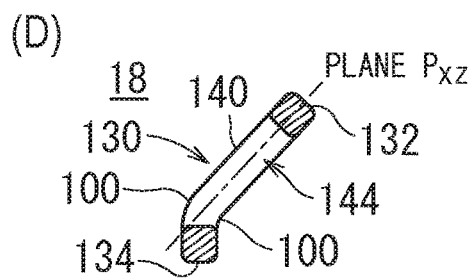

FIG. 23B
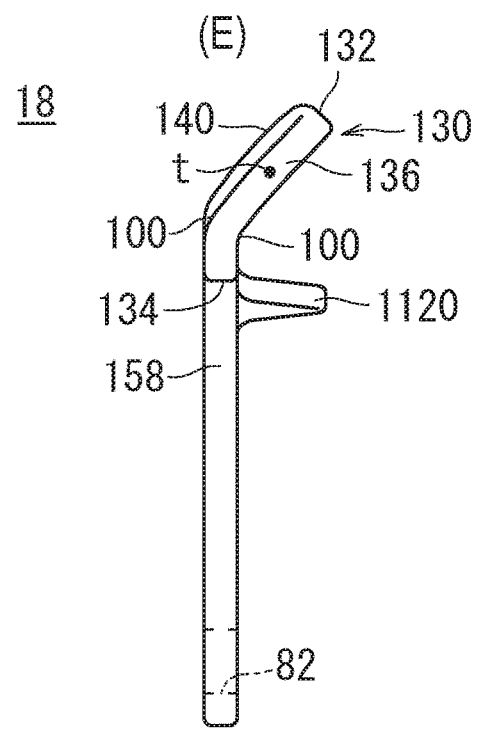
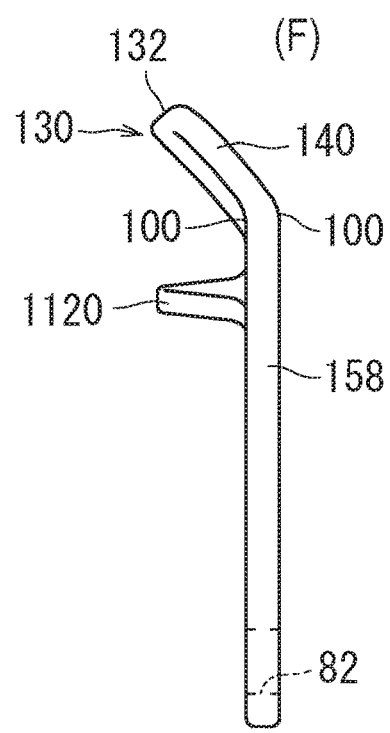

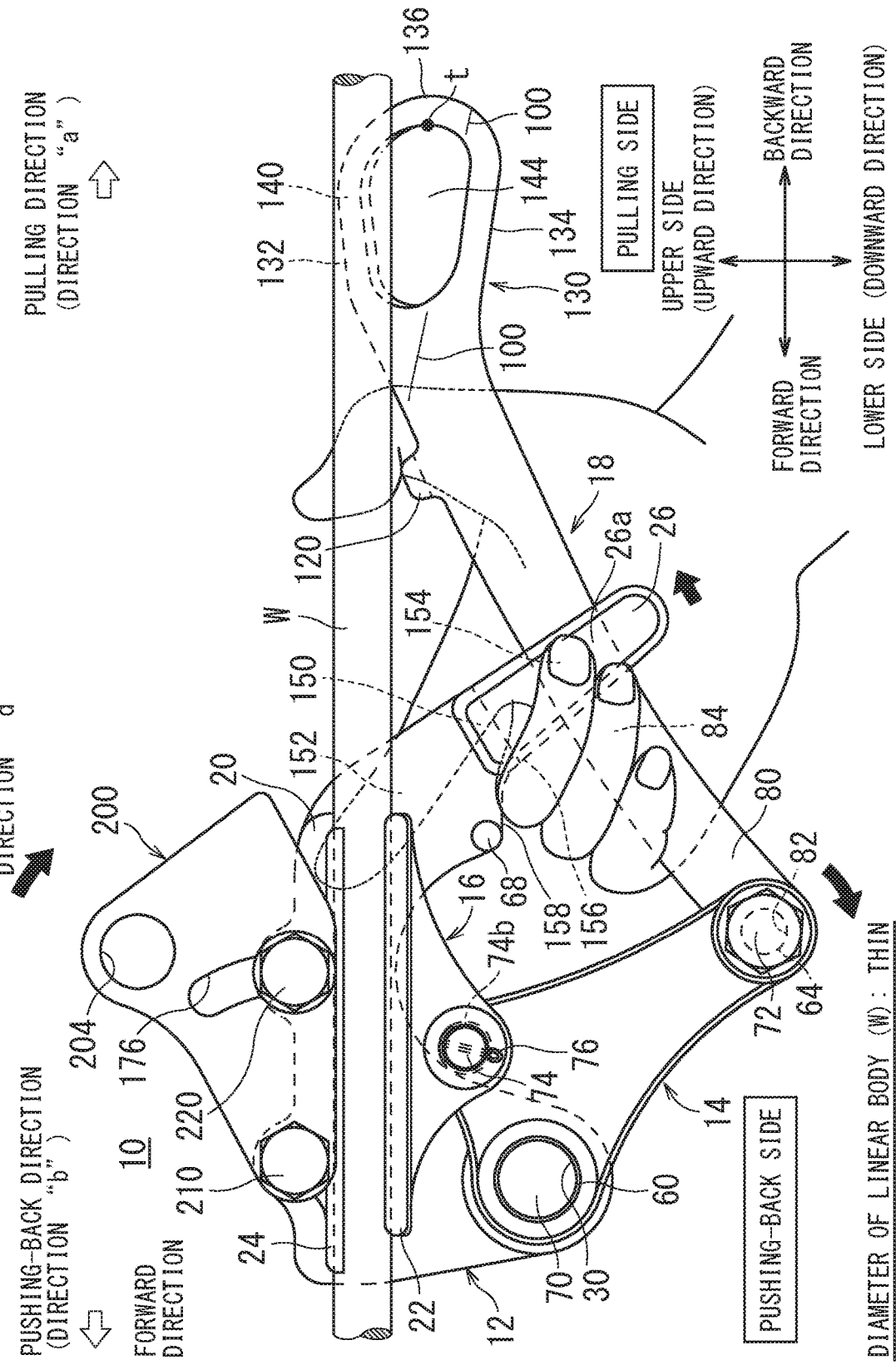

DIAMETER OF LINEAR BODY (W): THIN

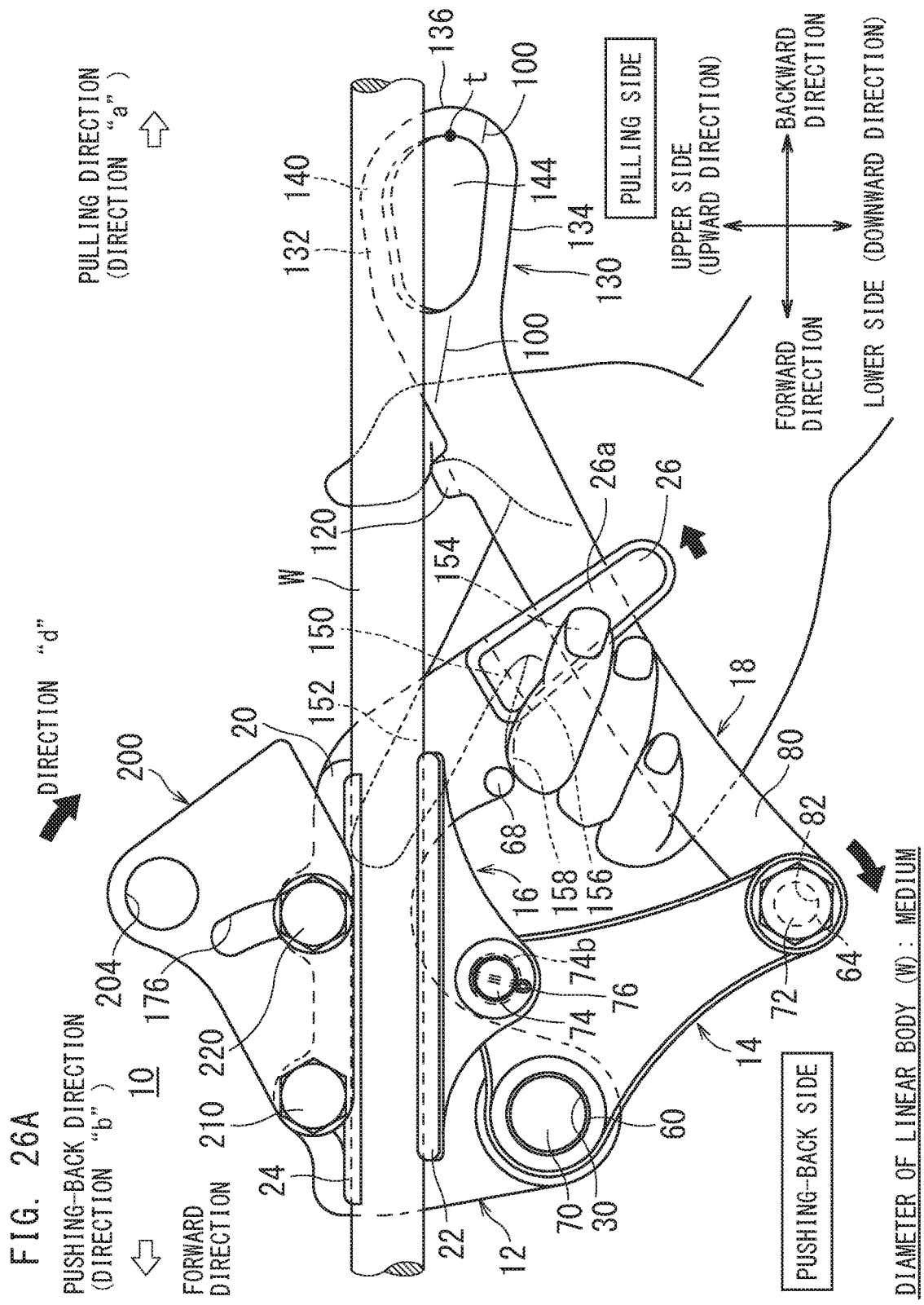

DIAMETER OF LINEAR BODY (W): MEDIUM

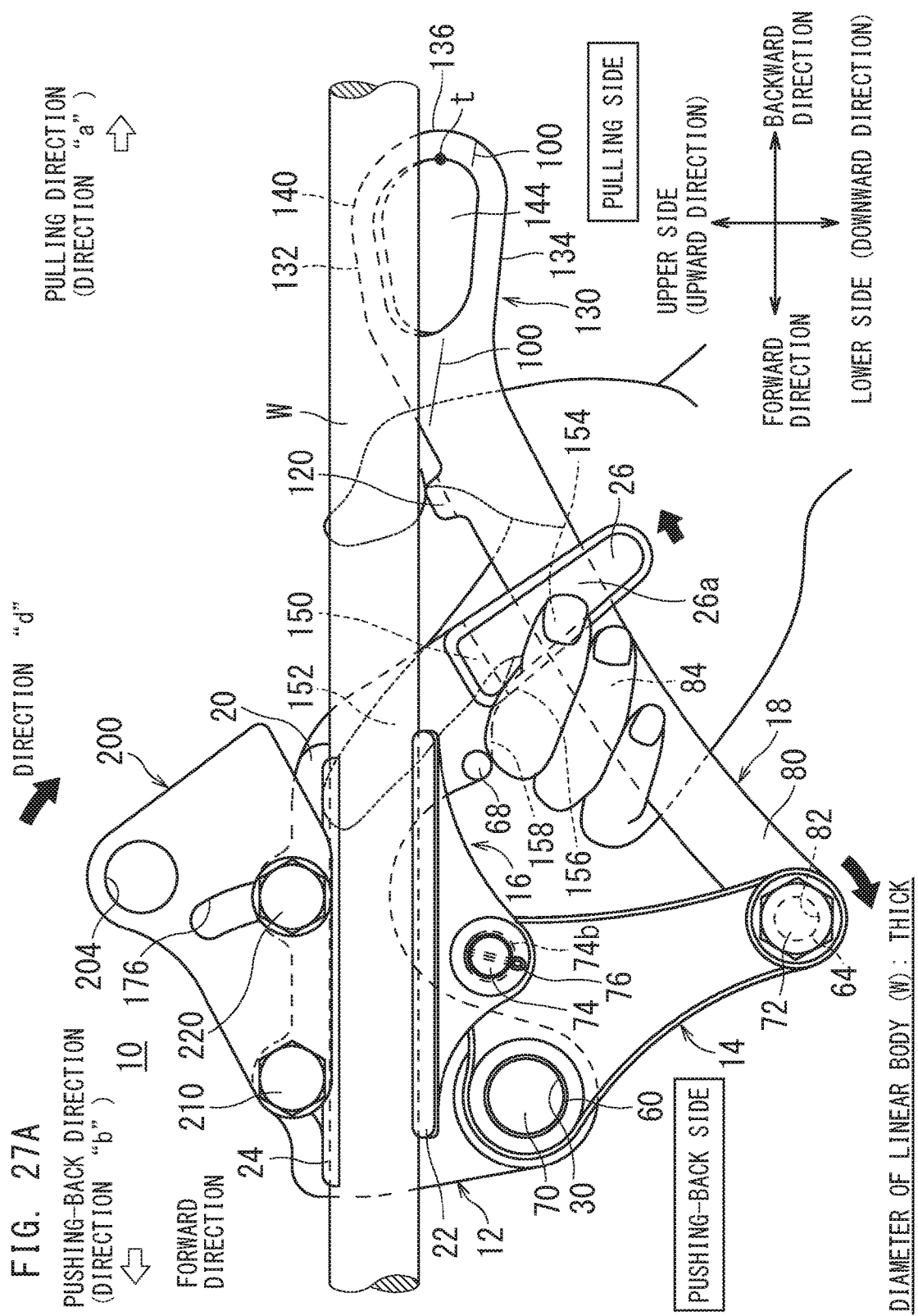

DIAMETER OF LINEAR BODY (W): THICK

WIRE GRIPPER

TECHNICAL FIELD

The present invention relates to a wire gripper which is attached to an apparatus for pulling a linear body such as a wire when a wire-allocating work or the like is performed and is used for an application for gripping the linear body such as a wire.

BACKGROUND ART

For example, when performing an allocating work for a wire (liner body), a wire-tensioning apparatus equipped with wire grippers coupled at both ends of an extensible rod-shaped body is used to create looseness in a portion where an allocating work is performed by pulling the wire. The wire-tensioning apparatus grips the wire with the wire grippers on both sides, then shortens the interval between the wire grippers coupled to both ends of the rod-shaped body by decreasing the length of the rod-shaped body to thereby create looseness in the electric wire between both ends gripped by the wire grippers. The wire-allocating work can be easily performed by cutting desired portions in the loosened electric wire. A wire gripper disclosed in a patent document 1 is opened to the public as prior art of gripping such an electric wire.

In the wire gripper shown in the patent documents 1, a ring portion provided at the backward side of a coupling member is twisted at 15° to 45° relative to the flat surface of the coupling member and an electric wire by twisting. The ring portion of the coupling member having such a structure can make a reliable approach to a linear body without interfering with the linear body. As such, in the wire gripper shown in the patent documents 1, the center position of the ring portion and the center of the linear body are not significantly spaced apart from each other, and the linear body is hardly bent when the linear body is pulled. Thereby, it is possible to minimize damages and so forth created on the surface of the linear body due to the bending of the linear body.

PRIOR ART DOCUMENT

Patent Document

Patent document 1: Japanese Patent No. 5465733

SUMMARY OF THE INVENTION

Problem to be Solved by the Invention

Generally, when a wire gripper maintains a tensile force applied to an installed electric wire during work, a greater force is applied to each part constituting the wire gripper.

Here, if each part of, for example, a long lever member that constitutes a wire gripper is made thicker to improve the mechanical strength of the long lever member, the weight of the wire gripper eventually increases, thereby making it difficult to use the wire gripper at higher places.

Further, an operation of attaching a wire gripper to an electric wire involves work at height performed for electric wires installed, which is a dangerous work that might cause a worker to accidentally touch an active portion of the wire. In such environment, an action that can be easily done at ground level cannot be done that easily. Here, a wire gripper has been desired, which allows a worker to perform a work at height easily and safely.

Therefore, a primary object of the present invention is to provide a lightweight wire gripper that is equipped with a coupling member having an excellent mechanical strength. Further, a secondary object of the present invention is to provide a wire gripper that enables easier and safer attachment of the wire gripper to an electric wire or the like.

Means for Solving the Problem

A wire gripper according to claim 1 of the present invention includes: a wire gripper body member including a fixed gripping body having a linear body pressing portion; an operating member mounted to the wire gripper body member pivotably about a support shaft; a movable gripping body member including a linear body holding portion that pivotally moves toward the linear body pressing portion of the fixed gripping body in accordance with the pivotal movement of the operating member; and a coupling member coupled to the operating member through a rotary shaft for coupling member for pivotally moving the operating member, wherein the coupling member includes an elongate coupling member body and a ring portion provided at the backward end of the coupling member body; the ring portion is bent at a prescribed angle in the bending region relative to a reference plane including a lateral axis along which the linear body pressing portion and the linear body holding portion extend; and when the linear body is gripped between the linear body pressing portion and the linear body holding portion, the bending region is formed substantially parallel to the direction in which the linear body pressing portion and the linear body holding portion extend, and located to extend the ring portion at a position lower than the linear body.

A wire gripper described in claim 2 of the present invention is the wire gripper according to claim 1, wherein an inclined portion in the ring portion, which is formed by bending the ring portion in the bending region, is inclined at an angle in which the inclined portion is located on the far side of the outer peripheral surface of the linear body, when the linear body is gripped between the linear body pressing portion and the linear body holding portion and/or when the linear body is attached to the wire gripper.

According to the present invention, the ring portion of the coupling member makes a reliable approach to a linear body without interfering with the linear body. As such, the center position of the ring portion and the center position of the linear body are not significantly spaced apart from each other, and the linear body is hardly bent when the linear body is pulled. As a result, it is possible to minimize damages and so forth created on the surface of the linear body due to the bending of the linear body.

A wire gripper described in claim 3 of the present invention is the wire gripper according to claim 1 or claim 2, wherein, on the coupling member, a thumb hooking portion on which a thumb is hooked when a grip portion of the wire gripper is gripped by a human hand is formed on the side of the ring portion of the coupling member body in the region of the installation portion of the fixed gripping body.

According to the present invention, a thumb hooking portion on which a thumb is hooked when a grip portion of the wire gripper is gripped by a human hand is formed on the side of the ring portion of the coupling member body, thereby making it easier to reliably grip a wire gripper by a single hand. Thereby, it is possible to provide a wire gripper that enables easier and safer attachment of the wire gripper to the linear body.

A wire gripper described in claim 4 of the present invention is the wire gripper according to claim 1 or claim 2, wherein the coupling member includes the thumb hooking portion on which a thumb is hooked, and the thumb hooking portion is located on near side of the coupling member and on the side of the ring portion of the coupling member body at a position that prevents the thumb from interfering with the linear body.

A wire gripper according to claim 5 of the present invention is the wire gripper including: a wire gripper body member including a fixed gripping body having a linear body pressing portion and a coupling member guide; an operating member mounted to the wire gripper body member pivotably about a support shaft; a movable gripping body member including a linear body holding portion that pivotally moves toward the linear body pressing portion of the fixed gripping body in accordance with the pivotal movement of the operating member; and a coupling member coupled to the operating member through a rotary shaft for pivotally moving the operating member, wherein the wire gripper further includes a grasp portion for grasping the wire gripper; the grasp portion is composed of a coupling member body of the coupling member and a coupling member guide; and the grasp portion is formed so that the grasp portion can be grasped by a finger and/or a palm.

According to the present invention, a thumb hooking portion on which a thumb is hooked when a grip portion of the wire gripper is gripped by a human hand is formed on the side of the ring portion of the coupling member body, thereby making it easier to reliably grip a wire gripper by a single hand. Thereby, the wire gripper can be attached to the linear body easily and safely.

Effect of the Invention

According to the invention set forth in claim 1, the ring portion of the coupling member is bent at a prescribed angle in the bending region extending over at least the ring portion, and thus it is possible to provide a lightweight and durable wire gripper that includes a coupling member having an excellent mechanical strength.

According to the invention set forth in claim 5, the wire gripper includes: a wire gripper body member including a fixed gripping body having a linear body pressing portion and a coupling member guide; an operating member mounted to the wire gripper body member pivotably about a support shaft; a movable gripping body member including a linear body holding portion that pivotally moves toward the linear body pressing portion of the fixed gripping body in accordance with the pivotal movement of the operating member; and a coupling member coupled to the operating member through a rotary shaft for pivotally moving the operating member, wherein the wire gripper further includes a grasp portion for grasping the wire gripper; the grasp portion is composed of a coupling member body of the coupling member and a coupling member guide; and the grasp portion is formed so that the grasp portion can be grasped by a finger and/or a palm. With this configuration, the wire gripper can be reliably gripped by a single hand. Thereby, it is possible to provide a wire gripper that enables easier and safer attachment of the wire gripper to the linear body.

The above described objects, other objects, and features and advantages according to the present invention will be made clear by the following description of an embodiment for practicing the invention with reference to the drawings. In this specification and claims, a direction extending from the right side to the left side in a front view is referred to as a longitudinal direction; a direction extending from the upper side to the lower side is referred to as a height direction; the left side in the front view is referred to as a forward direction (direction of pushing back a coupling member); and the right side is referred to as a backward direction (direction of pulling a coupling member).

BRIEF DESCRIPTION OF THE DRAWINGS

FIG. 6 is left side cross-sectional view illustrating an attachment state between a wire gripper body member and an operating member.

FIG. 7A is a view illustrating a coupling member: (A) is a plan view; (B) is a front view; and (C) is a cross-sectional view taken along the line B-B shown in (B).

FIG. 7B is a view illustrating a coupling member: (D) is a right side view; and (E) is a left side view.

FIG. 17 is a view illustrating a wire gripper body member: (A) is a front view; and (B) is a rear side view.

FIG. 23A is a view illustrating a coupling member: (A) is a plan view; (B) is a front view; (C) is a rear side view; and (D) is a cross-sectional view taken along the line B-B shown in (B).

FIG. 23B is a side view illustrating a coupling member: (E) is a right side view; and (F) is a left side view.

FIG. 25A is a front view illustrating a state where a wire gripper is attached to a linear body while being grasped by a hand.

FIG. 26A is a front view illustrating a state where a wire gripper is attached to a linear body while being grasped by a hand.

FIG. 27A is a front view illustrating a state where a wire gripper is attached to a linear body while being grasped by a hand.

EMBODIMENT FOR PRACTICING THE INVENTION

Figure 1:
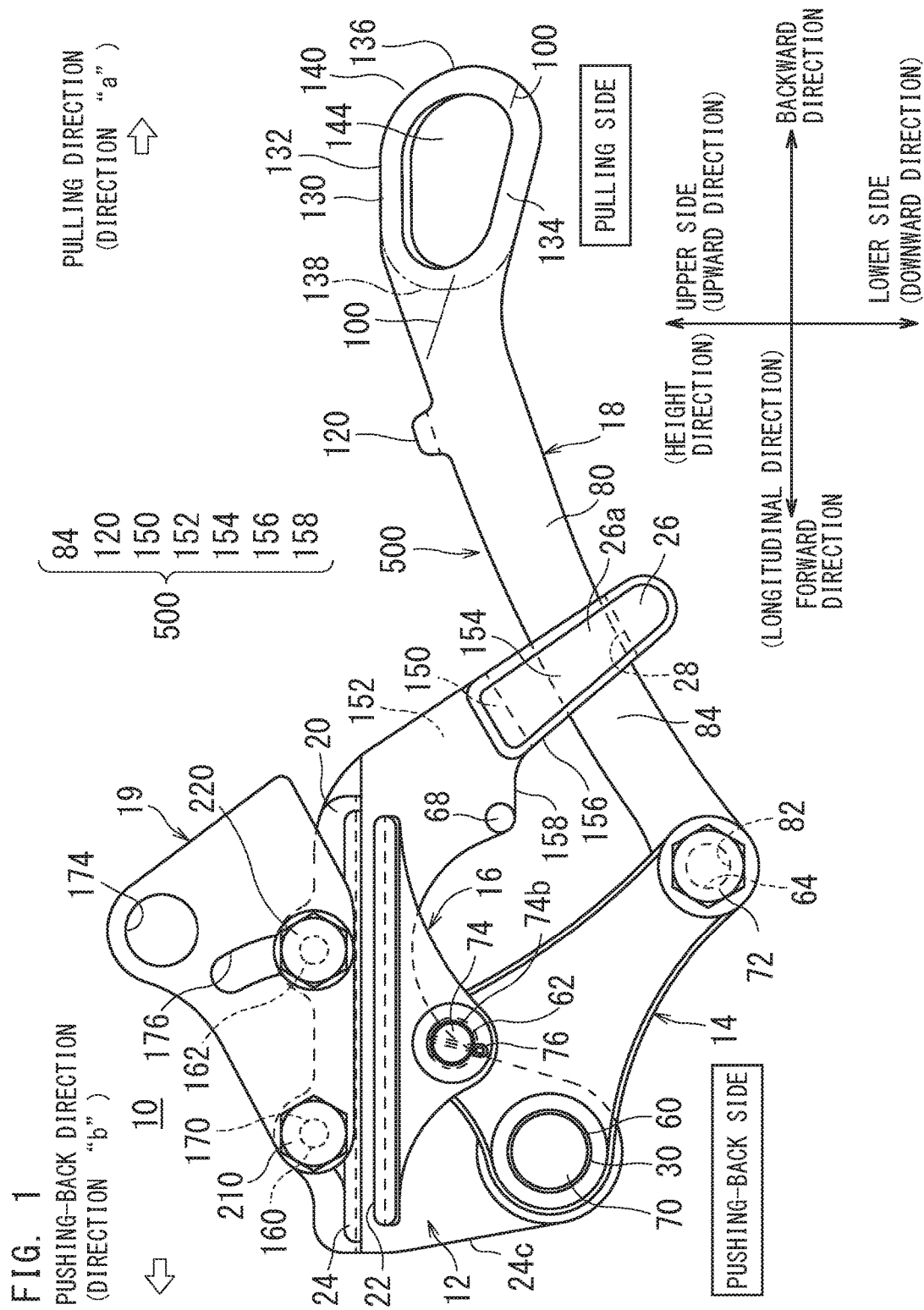
FIG. 1 is a front view illustrating a wire gripper (a wire gripper with a narrowed interval between a linear body pressing portion and a linear body holding portion) according to an embodiment of the present invention.

A wire gripper according to the present invention is attached to an apparatus for pulling a liner body such as a wire when performing an allocating work for a wire or the like, and is used for an application for gripping the liner body such as an electric wire or the like. Specifically, a wire gripper 10 is used to grip a linear body (W) when the linear body (W) including an electric wire such as a power line, a communication line, a wire for an elevator and so forth, is pulled by a wire tensioner (not shown) to thus apply tension to these wires. Although not shown yet, each of the wire grippers 10 is attached to both sides of a wire tensioner (not shown) and a single linear body (W) is gripped by the two wire grippers 10, wherein the wire gripper 10 is used for cutting and dividing the liner body (W) by pulling the liner body (W) using the wire tensioner to create looseness in the linear body (W).

The wire gripper 10 according to an embodiment of the present invention includes: a wire gripper body member 12 including a fixed gripping body 20 having a linear body pressing portion 24; an operating member 14 mounted to the wire gripper body member 12 pivotably about a support shaft 70; a movable gripping body member 16 including a linear body holding portion 22 that pivotally moves toward the linear body pressing portion 24 of the fixed gripping body 20 in accordance with the pivotal movement of the operating member 14; and a coupling member 18 coupled to the operating member 14 through a rotary shaft for pivotally moving the operating member 14. The coupling member 18 includes an elongate coupling member body 80 and a ring portion 130 provided at the backward end of the coupling member body 80, and the ring portion 130 is bent at a prescribed angle relative to a reference plane including a lateral axis along which the linear body pressing portion 24 and the linear body holding portion 22 extend, along an axis line in a pulling direction from a boundary with the coupling member body 80 to a side contour portion. When the linear body W is gripped between the linear body pressing portion 24 and the linear body holding portion 22, the bending region (100) is formed along the direction in which the linear body pressing portion 24 and the linear body holding portion 22 extend, and positioned along a pulling direction in which the coupling member 18 is pulled at a level lower than or equivalent to the level of the linear body holding portion 22.

A larger weight is allocated to the wire gripper body member 12, the operating member 14, and the movable gripping body member 16 than the coupling member 18 to thus establish weight distribution whereby a more weight is allocated in a direction in which the coupling member 18 is pushed back than in a direction in which the coupling member 18 is pulled. A grasp portion 500 for grasping the wire gripper 10 is provided in a region near the center of gravity and/or on the pulling side of the coupling member 18; and the grasp portion 500 is composed of a coupling member body 80 of the coupling member 18 and the coupling member guide 26 projected downward at the pulling side of the wire gripper body member 12 with the grasp portion 500 being formed so that the grasp portion 500 can be grasped by a finger and/or a palm. When the coupling member 18 is positioned on the push-back side of the coupling member 18 (first state), the center of gravity G of the wire gripper 10 equipped with a cover member 19 is positioned near a rotary shaft 74 for movable gripping body member. When the coupling member 18 is positioned slightly further on the pulling side than the first state (second state), the center of gravity G1 of the wire gripper 10 equipped with the cover member 19 is positioned slightly further on the pulling side than the rotary shaft 74 for movable gripping body member. When the coupling member 18 is further pulled from the second state (third state), the center of gravity G2 of the wire gripper 10 equipped with the cover member 19 is positioned further on the pulling side than the position of the center of gravity G1. The center of gravity G3 of the wire gripper 10 without the cover member 19 is positioned at little bit lower position than the first state.

1. Structure of Wire Gripper

Figure 2:
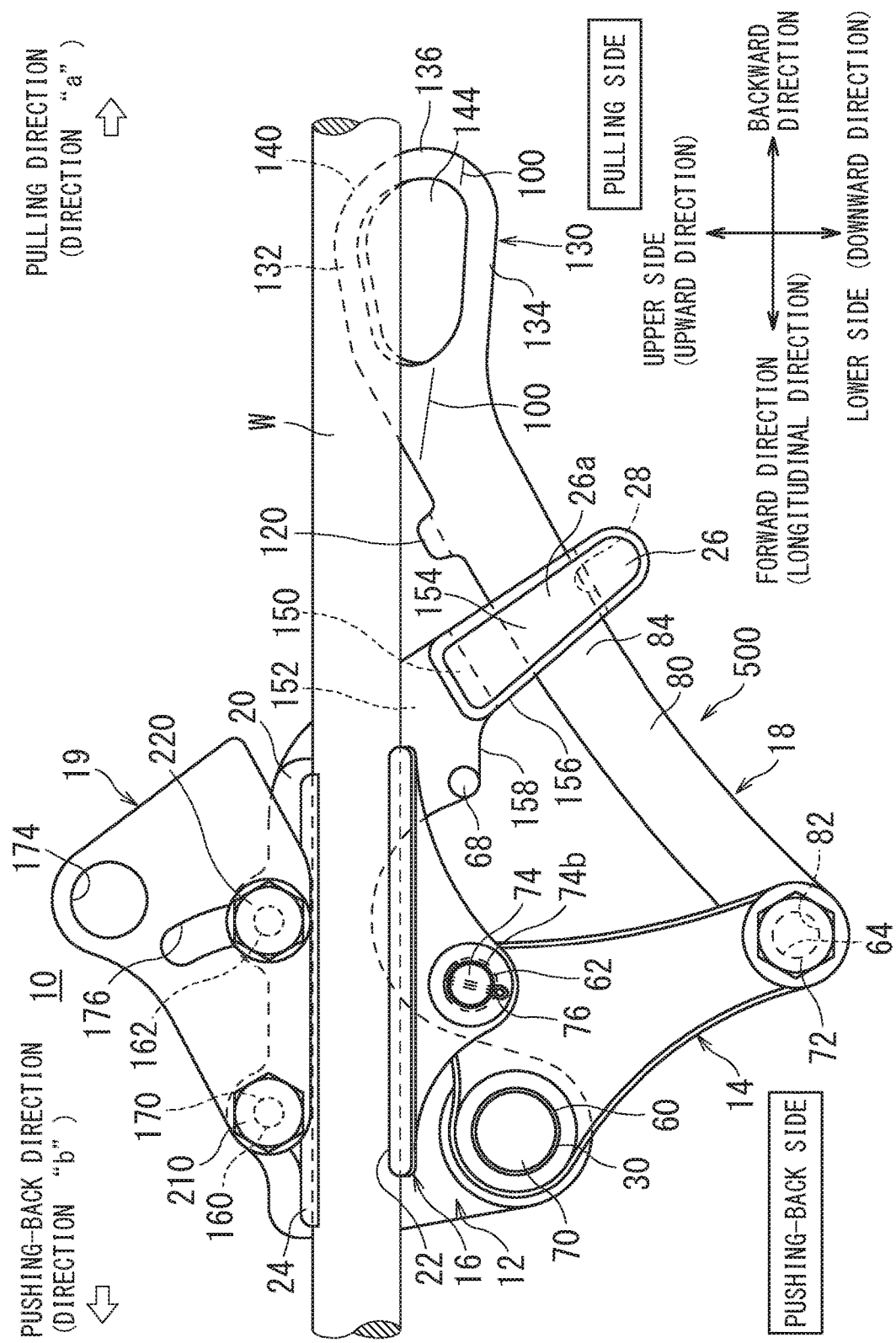
FIG. 2 is front view illustrating a wire gripper (a wire gripper with a linear body attached in between a linear body pressing portion and a linear body holding portion) according to an embodiment of the present invention.
Figure 3:
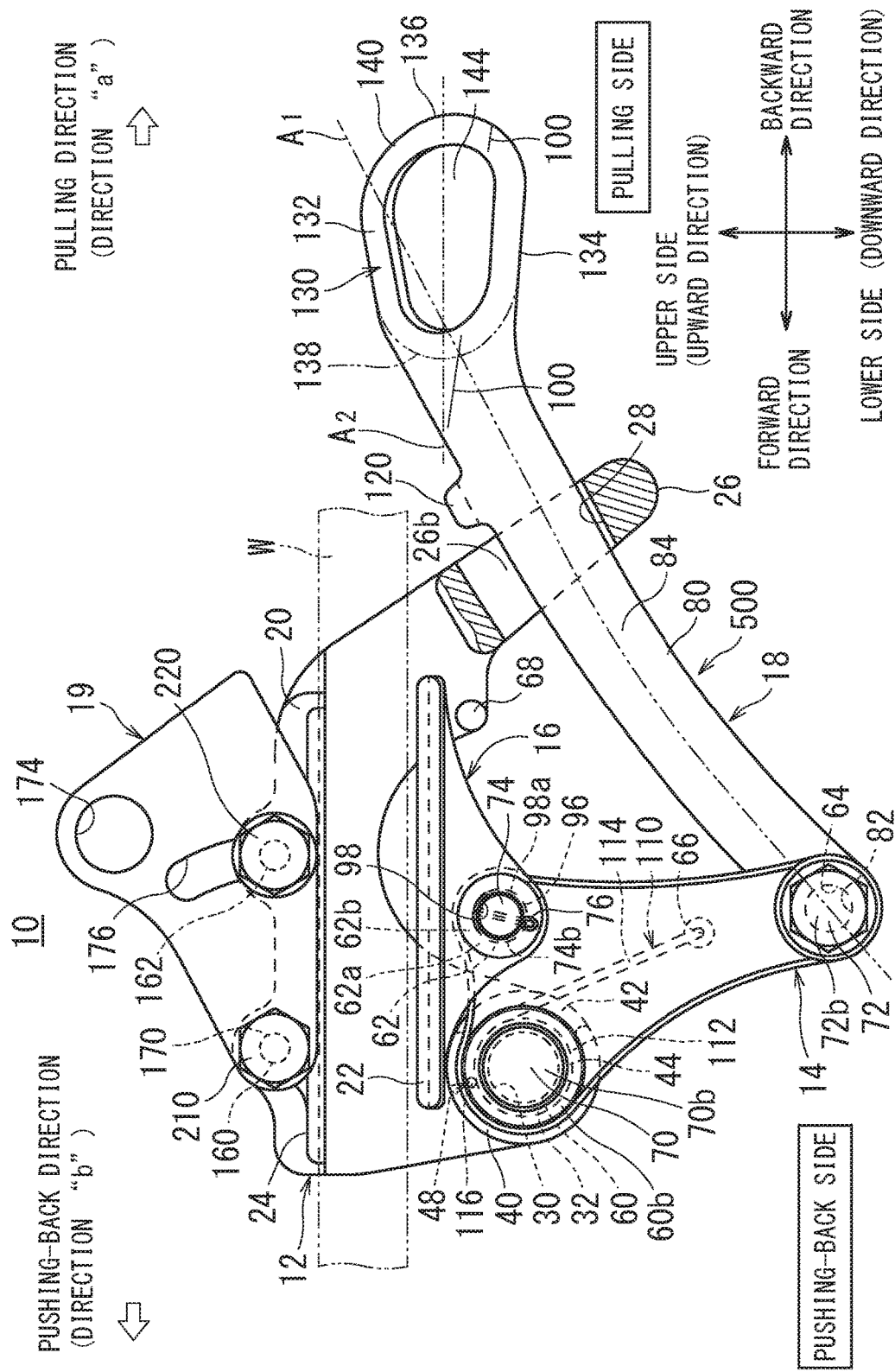
FIG. 3 is a front view illustrating a wire gripper (a wire gripper with a broaden interval between a linear body pressing portion and a linear body holding portion) according to an embodiment of the present invention.
Figure 4:
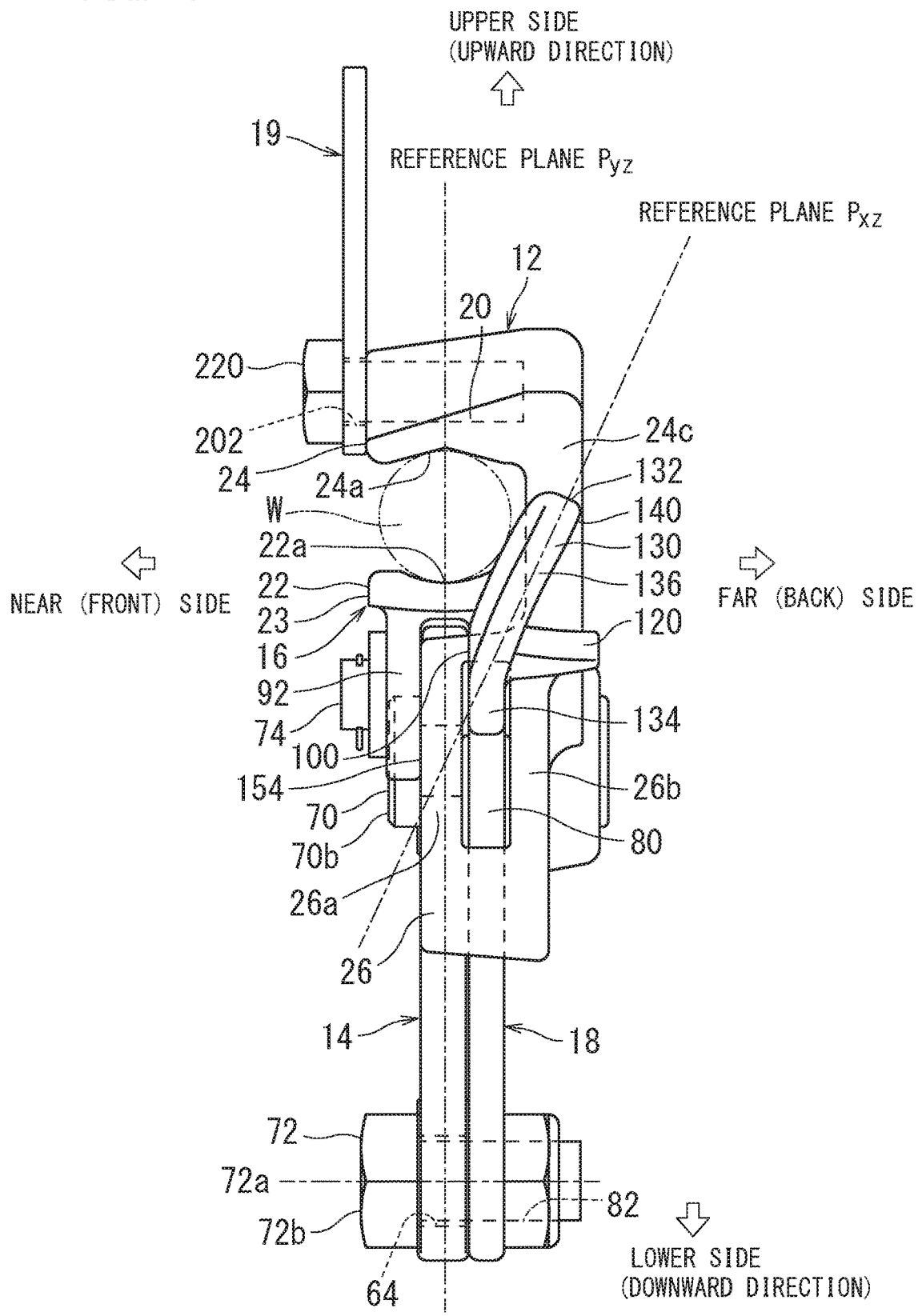
FIG. 4 is a right side view of a wire gripper shown in FIG. 2.
Figure 5:
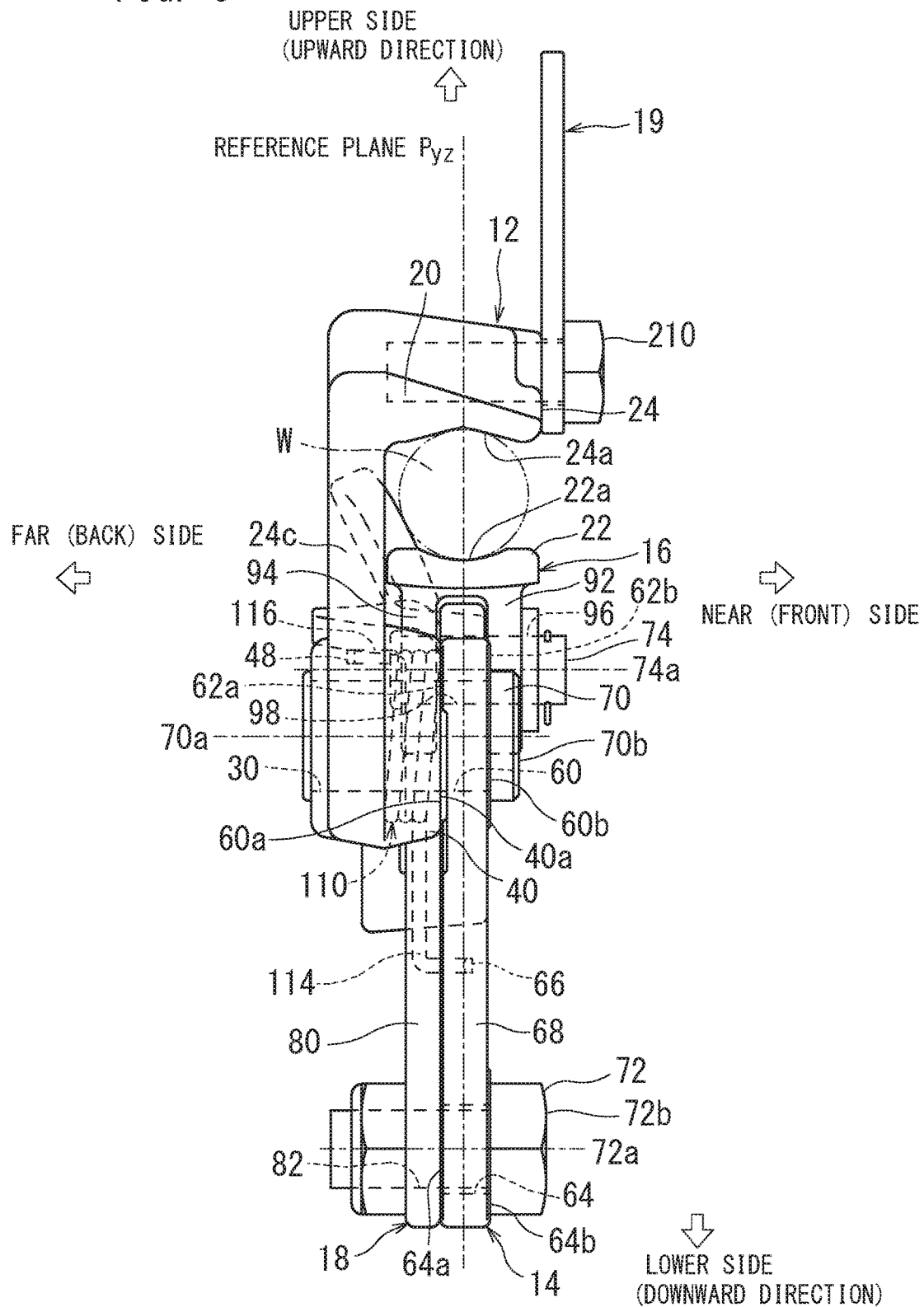
FIG. 5 is a left side view of a wire gripper shown in FIG. 2.

FIG. 1 is a front view illustrating a wire gripper 10 with a narrowed interval between a linear body pressing portion 24 and a linear body holding portion 22. FIG. 2 is a front view illustrating the wire gripper 10 with a linear body W attached in between the linear body pressing portion 24 and the linear body holding portion 22. FIG. 3 is a front view illustrating the wire gripper 10 with a broaden interval between the linear body pressing portion 24 and the linear body holding portion 22. FIG. 4 is a right side view of the wire gripper 10 shown in FIG. 2. FIG. 5 is a left side view of the wire gripper 10 shown in FIG. 2.

The wire gripper 10 includes: a wire gripper body member 12; an operating member 14 mounted to the wire gripper body member 12 pivotably about the support shaft 70; a movable gripping body member 16 including a linear body holding portion 22 that pivotally moves toward the linear body pressing portion 24 of the fixed gripping body 20 formed on the wire gripper body member 12 in accordance with the pivotal movement of the operating member 14; and a coupling member 18 coupled to the operating member 14 through a rotary shaft 72 for coupling member for pivotally moving the operating member 14; and a cover member 19 rotatably mounted to the wire gripper body member 12 through a rotary shaft 210 for cover member.

(a) Wire Gripper Body Member

The wire gripper body member 12 has a substantially reverse U shape in front view and has the fixed gripping body 20 that projects toward a near side at the upper portion. The linear body pressing portion 24 is formed on the fixed gripping body 20, extending along the longitudinal direction thereof. The linear body pressing portion 24 has an eaves shape projecting toward a near of the wire gripper body member 12 at the top of an installation portion 24c that projects upward from a wire gripper body 12a of the wire gripper body member 12. A clipping groove 24a is formed in the bottom surface of the linear body pressing portion 24. An opening 36 is formed between the linear body pressing portion 24 and the linear body holding portion 22 of the movable gripping body member 16 and a linear body is fitted into the opening 36. The clipping groove 24a is formed parallel to a reference plane Pyz including a lateral axis along which the linear body pressing portion 24 of the fixed gripping body 20 and the linear body holding portion 22 of the movable gripping body member 16 extend.

At the backward side of the wire gripper body member 12, the coupling member guide 26 projects downward at the pulling side of the wire gripper body member 12. The coupling member guide 26 extends in a direction intersecting with the extension line of the linear body pressing portion 24 to a vertically lower position than a support shaft hole 30 for pivotally supporting the operating member 14 later described.

The coupling member guide 26 has a guide hole 28 (through-hole) for guiding the coupling member 18 inserted therethrough. The guide hole 28 extends downward below the support shaft hole 30 for pivotally supporting the operating member 14 and the lower end of the guide hole 28 is positioned at a lower level than the support shaft hole 30.

The guide hole 28 is positioned further on the backward side than the linear body pressing portion 24 and the linear body holding portion 22, that is, on the pulling side of the coupling member 18. The coupling member guide 26 holds the coupling member 18 rotatably supported by the operating member 14 with the coupling member 18 being inserted into the guide hole 28.

The wire gripper body member 12 has the circular support shaft hole 30 for pivotally supporting the operating member 14 about the support shaft 70 in a vertically extending portion at the forward side below the linear body pressing portion 24. The support shaft hole 30 horizontally extends from the near side (the front side) of the wire gripper body member 12 toward the far side (the rear side).

As shown in FIG. 6, a thread 32 is formed to protect the support shaft 70 at a hole edge of the support shaft hole 30 into which the support shaft 70 is inserted. The thread 32 is a rib having a circular shape in front view. The thread 32 projects from the wire gripper body member 12 in a direction in which the outer peripheral edge of the support shaft hole 30 extends (in a direction in which a shaft center 70a of the support shaft 70 extends). The thread 32 has a flat top 32a, and spreads in a vertical direction intersecting with the extending direction of the hole peripheral edge of the support shaft hole 30. The top 32a of the thread 32 has a flat surface parallel to the near side surface of the wire gripper body member 12 and the clipping groove 24a of the linear body pressing portion 24, and the peripheral edge has a substantially trapezoidal cross-section, extending in a direction intersecting with the near side surface of the wire gripper body member 12. The thread 32 constitutes a base on which the operating member 14 is placed.

An arc-shaped thread 40 is formed to surround the thread 32 spaced apart from the outer peripheral edge of the thread 32 with substantially the same interval therebetween. The thread 40 has substantially the same height as the thread 32. A spring groove 44 is formed between the thread 40 and the thread 32. The thread 40 is an arc-shaped rib in front view, continuously provided from the lower portion of the support shaft hole 30 to the forward side. A lower portion of the thread 40 at the backward side (in a direction in which the coupling member 18 is pulled (direction a shown in FIG. 1)) is notched to create a space 42, which is provided to allow a coil spring 110 to move. The thread 40 projects from the wire gripper body member 12 in a direction in which the outer peripheral edge of the support shaft hole 30 extends (in a direction in which the shaft center 70a of the support shaft 70 extends). The thread 40 has a flat top 40a, and spreads in a vertical direction intersecting with the extending direction of the outer peripheral edge of the support shaft hole 30. The top 40a of the thread 40 has a flat surface parallel to the near side surface of the wire gripper body member 12 and the clipping groove 24a of the linear body pressing portion 24, and the peripheral edge has a substantially trapezoidal cross-section, extending in a direction intersecting with the near side surface of the wire gripper body member 12. The thread 40 constitutes a base on which the operating member 14 is placed.

The wire gripper body member 12 has a support 68 for movable gripping body member for reliably retaining the linear body W with the movable gripping body member 16 arranged parallel to the fixed gripping body 20 when the linear body W is gripped. The support 68 for movable gripping body member is positioned at the backward side of the wire gripper body member 12 vertically downward therefrom, and vertically upward from the coupling member guide 26.

Figure 10:
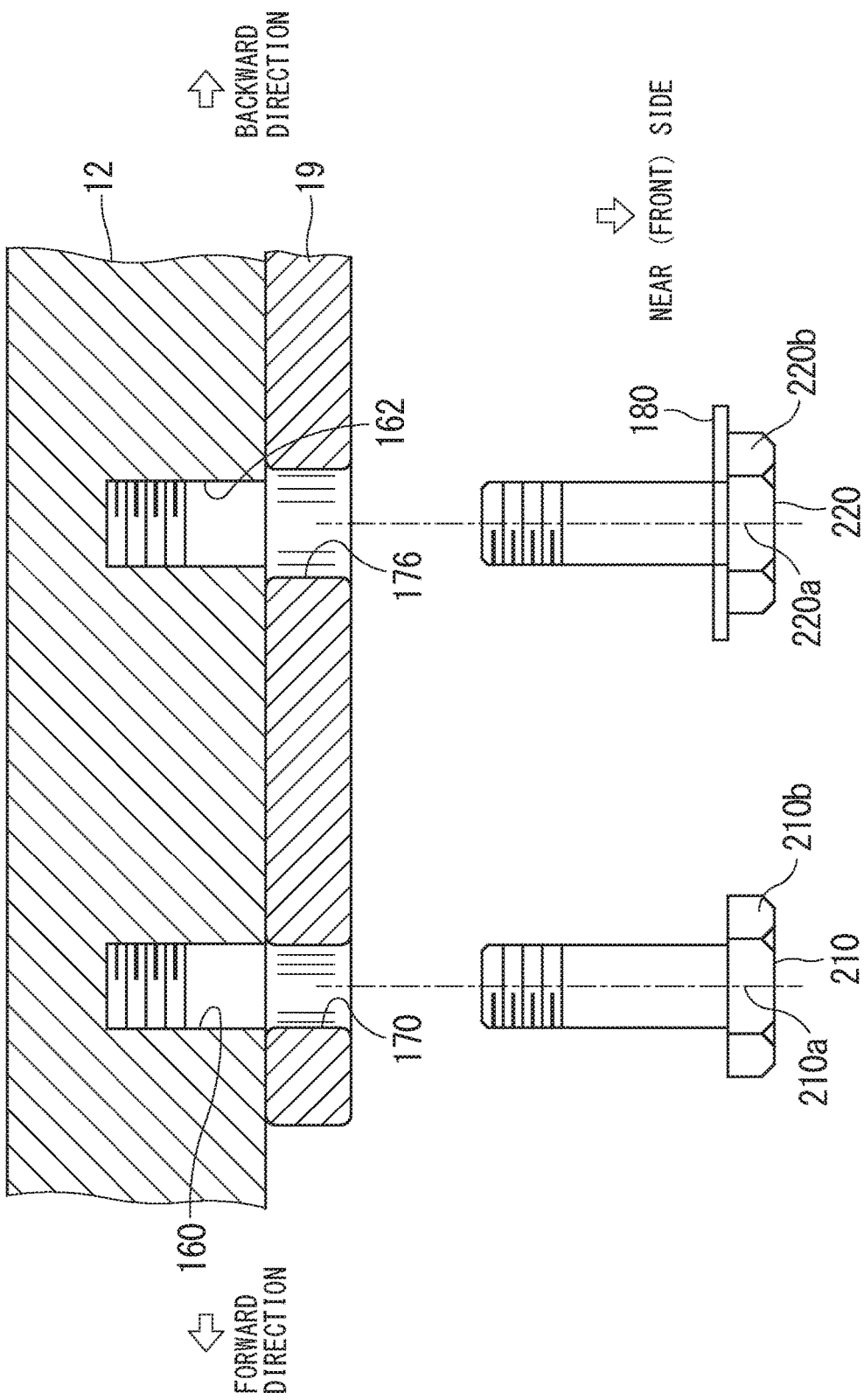
FIG. 10 is a planar cross-sectional view illustrating an attachment state between the wire gripper body member and a cover member.

In the upper portion of the fixed gripping body 20, the wire gripper body member 12 has a circular attachment hole 160 for cover member for rotatably supporting the cover member 19 about the rotary shaft 210 for cover member, and a circular screw hole 162 for positioning the cover member 19 by fastening the cover member 19 with a pressing body 220. The attachment hole 160 for cover member is positioned ahead of the wire gripper body member 12 and the screw hole 162 is positioned behind the wire gripper body member 12, that is, the attachment hole 160 for cover member and the screw hole 162 are provided side by side. As shown in FIG. 10, the attachment hole 160 for cover member and the screw hole 162 extend in a horizontal direction from the near side (the front side) to the far side (the rear side) of the wire gripper body member 12. The pressing body 220 fastens the cover member 19 with a spring washer or a coil spring (not shown) interposed therebetween.

(b) Operating Member

The operating member 14 has a substantially triangular shape in front view. In the operating member 14, at a portion of interior angle on the upper forward side, the attachment hole 60 for wire gripper body member, into which the support shaft 70 is inserted, is formed; at a portion of the interior angle on the upper backward side, the attachment hole 62 for movable gripping body member, into which the rotary shaft 74 for movable gripping body member is inserted, is formed; and at a portion of the interior angle on the lower backward side, the attachment hole 64 for coupling member, into which the rotary shaft 72 for coupling member is inserted, is formed. The rotary shaft 72 for coupling member and the rotary shaft 74 for movable gripping body member are positioned further on the backward side (right side) than the support shaft 70 in the direction in which the coupling member 18 extends. The operating member 14 extends downward from near the bottom surface of the linear body holding portion 22 below the linear body holding portion 22.

Figure 25B:
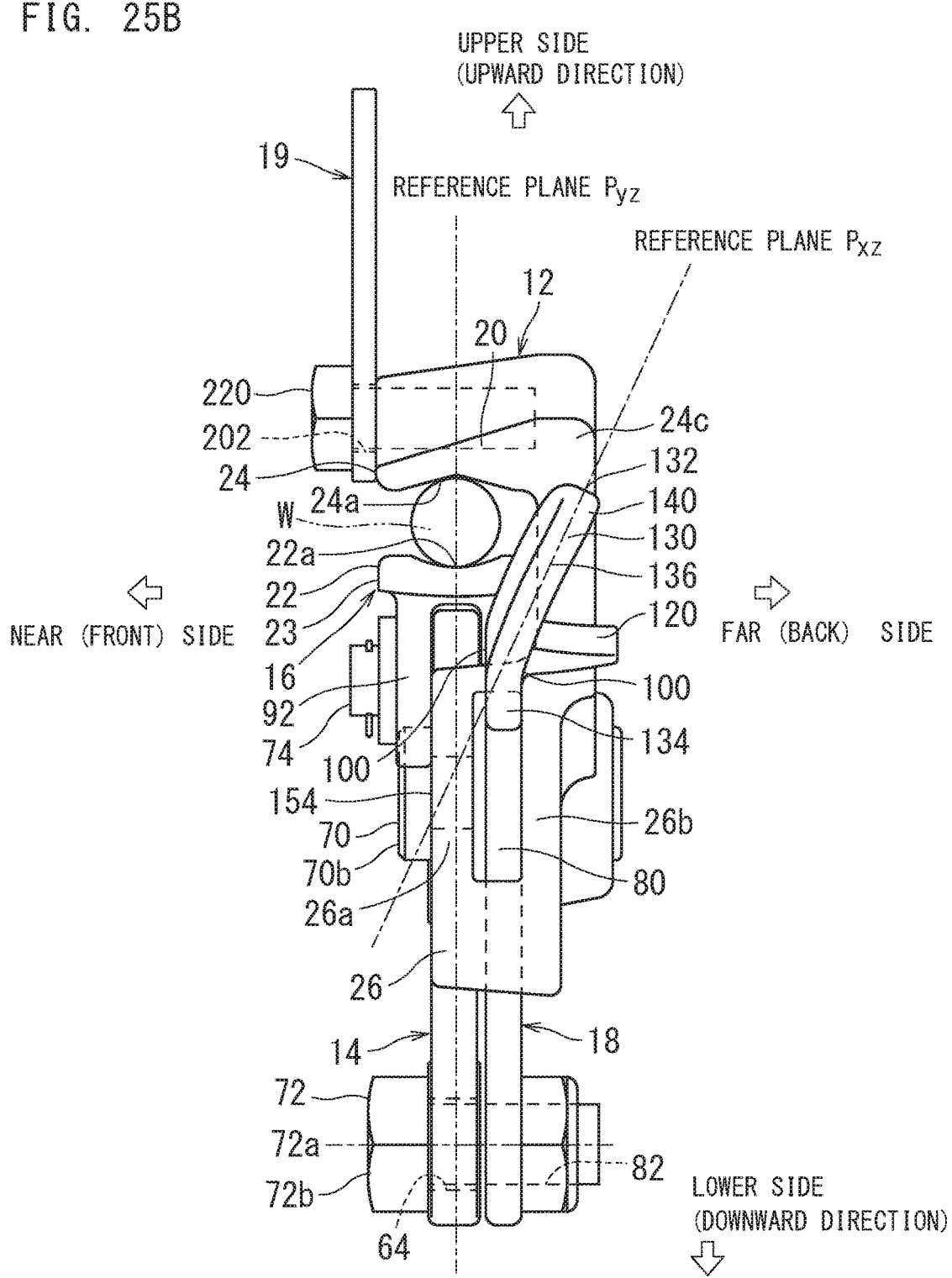
FIG. 25B is a side view illustrating a state where a wire gripper is attached to a linear body while being grasped by a hand.
Figure 26B:
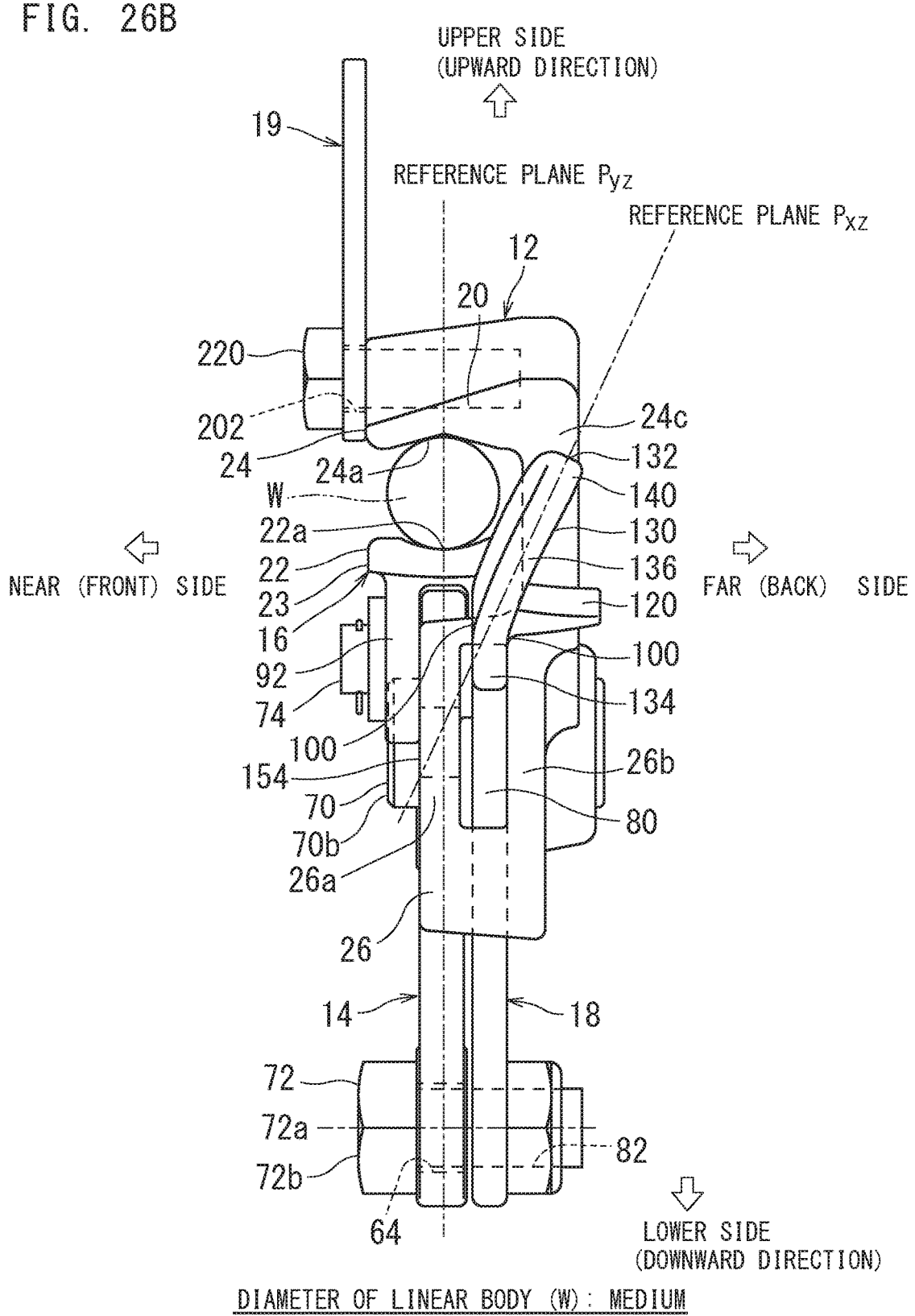
FIG. 26B is a side view illustrating a state where a wire gripper is attached to a linear body while being grasped by a hand.
Figure 27B:
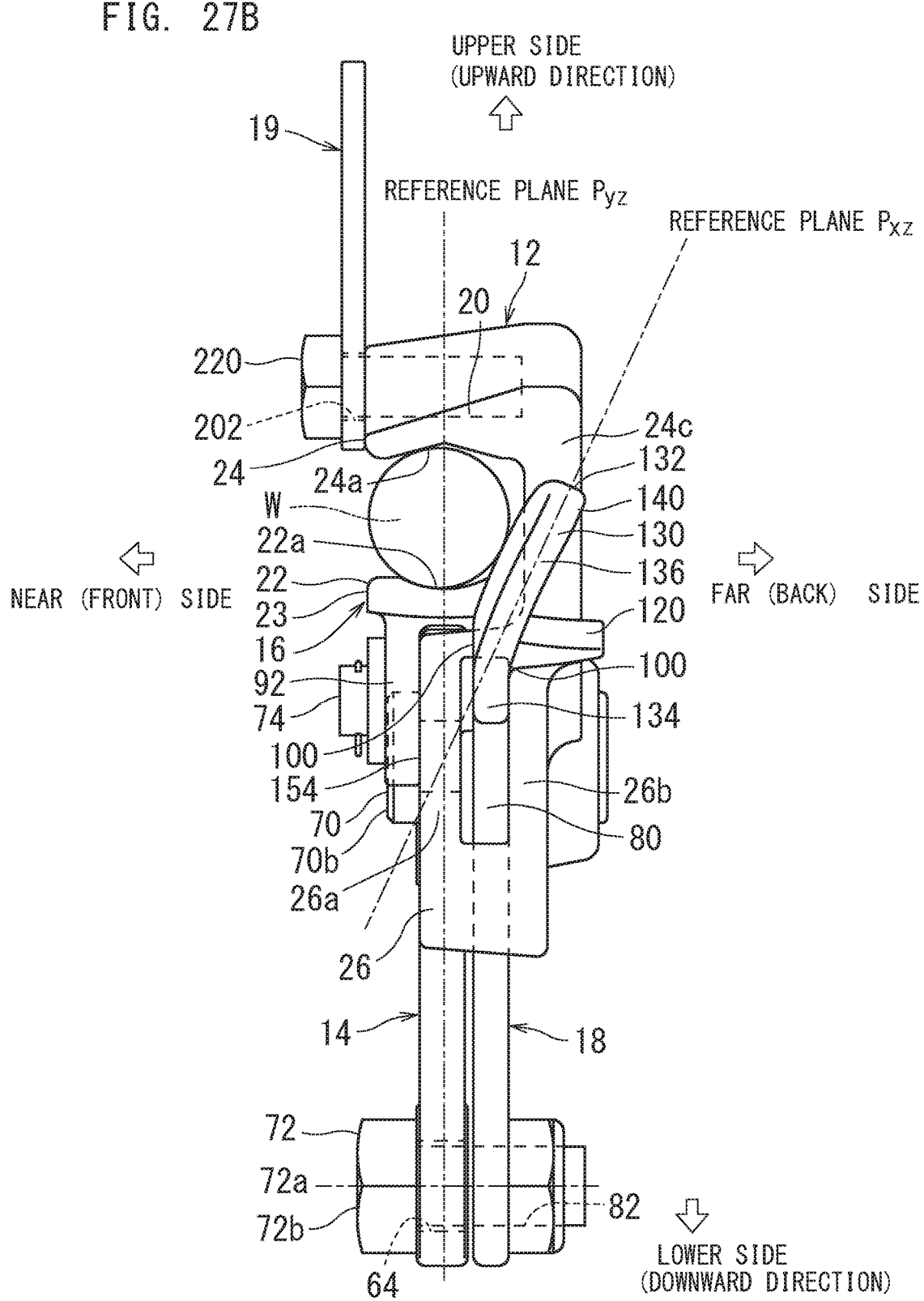
FIG. 27B is a side view illustrating a state where a wire gripper is attached to a linear body while being grasped by a hand.

When the linear body pressing portion 24 and the linear body holding portion 22 are placed closer to each other to grip the linear body W due to a smaller diameter thereof, and when the linear body pressing portion 24 and the linear body holding portion 22 are spaced apart from each other to grip the linear body W due to a larger diameter thereof, the operating member 14 has a sufficient length so that a portion where the coupling member body 80 is attached to the rotary shaft 72 for coupling member can be positioned further on the pulling side than the vertically downward position of the rotary shaft 74 for movable gripping body member, while a base point t, to which a tensile force of the linear body W is applied, can be brought to a position near the center line of the linear body W (see FIGS. 25 to 27). When the linear body pressing portion 24 and the linear body holding portion 22 are placed closer to each other to grip the linear body W due to a smaller diameter thereof, and when the linear body pressing portion 24 and the linear body holding portion 22 are spaced apart from each other to grip the linear body W due to a larger diameter thereof, the operating member 14 has a sufficient length so that the coupling member 18 can extend from the lower side of the linear body holding portion 22 to a position higher than or equivalent to the height of the linear body holding portion 22, and can be supported by the coupling member guide 26 on the half way (see FIGS. 25 to 27).

The operating member 14 is placed on the thread 32 provided at one end of the wire gripper body member 12, and is rotatably attached to the wire gripper body member 12 about the support shaft 70 with the support shaft hole 30 and the attachment hole 60 for wire gripper body member being linearly aligned. The operating member 14 is pivotally moved parallel to the direction in which the linear body pressing portion 24 of the wire gripper body member 12 extends. Further, the other end of the operating member 14 is aligned to one end of the coupling member 18, and the attachment hole 82 for operating member of the coupling member 18 and the attachment hole 64 for coupling member of the operating member 14 are linearly aligned so that the coupling member 18 is rotatably attached to the operating member 14 about the rotary shaft 72 for coupling member. Further the movable gripping body member 16 is rotatably attached to the operating member 14 about the rotary shaft 74 for movable gripping body member at the attachment hole 62 for movable gripping body member provided side by side with the attachment hole 60 for wire gripper body member.

As shown in FIGS. 5 and 6, the peripheries of the attachment hole 60 for wire gripper body member, the attachment hole 62 for movable gripping body member, and the attachment hole 64 for coupling member are swollen higher than other portions in both near and far side surfaces of the operating member 14, and the top of the swollen portions has a vertical flat surface orthogonal to the direction in which the peripheral edge of the attachment hole 60 for wire gripper body member, the attachment hole 62 for movable gripping body member, and the attachment hole 64 for coupling member extends. That is, a top 60*a* of the swollen portion around the far side hole and a top 60*b* of the swollen portion around the near side hole of the attachment hole 60 for wire gripper body member; a top 62*a* of the swollen portion around the far side hole and a top 62*b* of the swollen portion around the near side hole of the attachment hole 62 for movable gripping body member; and a top 64*a* of the swollen portion around the far side hole and a top 64*b* of the swollen portion around the near side hole of the attachment hole 64 for coupling member are formed parallel to each other, and are orthogonal to the direction in which the hole edges (outer peripheral edges of holes) of the attachment hole 60 for wire gripper body member, the attachment hole 62 for movable gripping body member, and the attachment hole 64 for coupling member extend.

The sliding surface of the top 60*a* of the swollen portion around the far side hole of the attachment hole 60 for wire gripper body member in the operating member 14 (sliding surface in slidably contact with the top 32*a* of the thread 32 and the top 40*a* of the thread 40) is orthogonal to the shaft center 70*a* of the support shaft 70 for the operating member 14, and is formed as a vertical surface parallel to the clipping groove 24*a* of the linear body pressing portion 24 of the fixed gripping body 20, and the clipping groove 22*a* of the linear body holding portion 22 of the movable gripping body member 16.

The sliding surface of the top of the swollen portion around the near side hole of the attachment hole 62 for movable gripping body member (sliding surface in slidably contact with the attachment surface for the movable gripping body member 16) and the top of the swollen portion around the far side hole, are orthogonal to the shaft center of rotary shaft 74 for movable gripping body member for the movable gripping body member 16, and is formed as a vertical surface parallel to the clipping groove 24*a* of the linear body pressing portion 24 of the fixed gripping body 20, and the clipping groove 22*a* of the linear body holding portion 22 of the movable gripping body member 16.

The sliding surface of the top 64*a* of the swollen portion around the far side hole of the attachment hole 64 for coupling member (sliding surface in slidably contact with the attachment surface for the coupling member 18) is orthogonal to the shaft center 72*a* of the rotary shaft 72 for coupling member for the coupling member 18, and is formed as a vertical surface parallel to the clipping groove 24*a* of the linear body pressing portion 24 of the fixed gripping body 20, and the clipping groove 22*a* of the linear body holding portion 22 of the movable gripping body member 16.

The support shaft 70 is formed into a columnar shape having the shaft center 70*a* extending in the length direction, and has a flange 70*b* projecting in a direction intersecting with the shaft center 70*a* on the near side thereof. The support shaft 70 is inserted into the attachment hole 60 for wire gripper body member of the operating member 14 from the near side and screwed into the support shaft hole 30 of the wire gripper body member 12, and thus attached to the wire gripper body member 12 and the operating member 14. The shaft center 70*a* of the support shaft 70 functions as the center of the pivotal movement for the operating member 14. The support shaft 70 may be swaged on the far side of the support shaft hole 30.

The rotary shaft 72 for coupling member is formed into a columnar shape having the shaft center 72*a* extending in the length direction, and has a flange 72*b* projecting in a direction intersecting with the shaft center 72*a* on the near side thereof. The rotary shaft 72 for coupling member is fitted into the attachment hole 64 for coupling member for the operating member 14 and the attachment hole 82 for operating member of the coupling member 18 from the near side and swaged and mounted onto the operating member 14 and the coupling member 18 on the far side of the attachment hole 82 for operating member. The shaft center 72a of the rotary shaft 72 for coupling member functions as the center of the pivotal movement for the coupling member 18.

The rotary shaft 74 for movable gripping body member is formed into a columnar shape having the shaft center 74a extending in the length direction, and has a flange 74b projecting in a direction intersecting with the shaft center 74a on the far side thereof. The rotary shaft 74 for movable gripping body member is fitted into the attachment hole 62 for movable gripping body member of the operating member 14 and an attachment hole 96 for first operating member from an attachment hole 98 for second operating member on the far side of the movable gripping body member 16 as described later, and locked in place with a split pin 76 at a portion projecting on the near side of the attachment hole 96 for first operating member and on the near side of the movable gripping body member 16. The shaft center 74a of the rotary shaft 74 for coupling member functions as the center of the pivotal movement for the movable gripping body member 16.

An annular-shaped step portion 98a is circumferentially formed in the periphery of a far side attachment hole 98 for second operating member. The far side surface of the flange 74b of the rotary shaft 74 for movable gripping body member is configured to planarly continue to the far side surface of the attachment portion 94 for second operating member when the flange 74b of the rotary shaft 74 for movable gripping body member is fitted into the annular-shaped step portion 98a.

The support shaft hole 30 has the same diameter as the attachment hole 60 for wire gripper body member of the operating member 14, and the support shaft hole 30 and the attachment hole 60 are arranged side by side so that the outer peripheral edges are parallel to each other. A direction in which the peripheral edge of the support shaft hole 30 extends; a direction in which the peripheral edges of the attachment hole 60 for wire gripper body member, the attachment hole 62 for movable gripping body member, and the attachment hole 64 for coupling member extend; the shaft center 70a of the support shaft 70; the shaft center 72a of the rotary shaft 72 for coupling member; and the shaft center 74a of the rotary shaft 74 for movable gripping body member, are configured to be parallel to each other.

Further, a coil spring 110 is provided between the wire gripper body member 12 and the operating member 14 to thereby bias the operating member 14 in a direction in which the coupling member 18 is pulled. The coil spring 110 is inserted into the support shaft 70. A coil portion 112 of the coil spring 110 is fitted into the spring groove 44 of the wire gripper body member 12. A linear first hook 114 extending from one end of the coil portion 112 of the coil spring 110 is fixed in a hook hole 66 formed on the far side of the operating member 14. A linear second hook 116 extending from the other end of the coil portion 112 is fixed in a hook hole 48 formed on the near side surface of the wire gripper body member 12. The first hook 114 is fixed in the hook hole 66 so as to create a state where the coupling member 18 is pulled by the coil spring 110 toward a pulling side (direction a shown in FIG. 1) when the wire gripper 10 is free from a load.

The thread 32 and the thread 34 of the wire gripper body member 12 are formed at a prescribed height so that the sliding surface of the top 32a and the top 40a facing the top 60a of the swollen portion around the far side attachment hole 60 for wire gripper body member of the operating member 14 is parallel to the direction in which the clipping groove 24a of the fixed gripping body 20 extends and orthogonal to the shaft center 70a of the support shaft 70.

The sliding surface of the top 32a of the thread 32 and the top 40a of the thread 40 is a parallel surface that faces the sliding surface of the tops 60a, 62a, and 64a of the swollen portions around the far side holes, and the tops 60b, 62b, and 64b of the swollen portions around the near side holes for each of the attachment hole 60 for wire gripper body member, the attachment hole 62 for movable gripping body member, and the attachment hole 64 for coupling member. Further, the top 32a of the thread 32 and the top 40a of the thread 40 are in planar contact with the top 60a of the swollen portion around the far side attachment hole 60 for wire gripper body member so that the operating member 14 rotates about the shaft center 70a of the support shaft 70.

Further, a vertical plane P1 intersecting with the sliding surface of the tops 60a, 62a, and 64a of the swollen portions side around the far holes for each of the attachment hole 60 for wire gripper body member, the attachment hole 62 for movable gripping body member, and the attachment hole 64 for coupling member of the operating member 14, and a vertical plane P2 intersecting with the sliding surface of the tops 60b and 62b of the swollen portions side around the near holes for each of the attachment hole 60 for wire gripper body member and the attachment hole 62 for movable gripping body member, are orthogonal to the shaft center 70a of the support shaft 70, the shaft center 72a of the support shaft 72 for coupling member and the shaft center 74a of the support shaft 74 for movable gripping body member, and parallel to the clipping groove 24a of the fixed gripping body 20. The vertical plane P1 is configured to pass through the inside of the guide hole 28 of the coupling member guide 26.

(c) Movable Gripping Body Member

As shown in FIG. 5, the movable gripping body member 16 has a U-shaped cross-section and has an attachment portion 92 for first operating member and an attachment portion 94 for second operating member arranged parallel to each other on the front and rear sides. The attachment portion 92 for first operating member and the attachment portion 94 for second operating member extend over the upper portion at the rear portion. The attachment portion 92 for first operating member is provided with an attachment hole 96 for first operating member, and the attachment portion 94 for second operating member is provided with an attachment hole 98 for a second operating member. The movable gripping body member 16 is rotatably attached to the operating member 14 about the rotary shaft 74 for movable gripping body member inserted through the attachment hole 96 for first operating member, the attachment hole 98 for second operating member, and the attachment hole 62 for movable gripping body member of the operating member 14, which are linearly aligned. The attachment hole 96 for first operating member, the attachment hole 98 for second operating member, and the attachment hole 62 for movable gripping body member have mutually the same diameter, and are arranged side by side such that the outer peripheral edges of these holes are parallel to each other.

Further, the attachment portion 92 for first operating member and the attachment portion 94 for second operating member have vertical surfaces (each inner surface) facing each other, and are attached to the operating member 14 so that the vertical surfaces are parallel to the top 32a of the thread 32 and the top 40a of the thread 40. The surfaces facing each other (each inner surface) of the attachment portion 92 for first operating member and the attachment portion 94 for second operating member are orthogonal to the direction in which the outer peripheral edges of the attachment hole 96 for first operating member and the attachment hole 98 for second operating member extend, and orthogonal to the support center 74*a* of the rotary shaft 74 for movable gripping body member. The movable gripping body member 16 attached to the operating member 14 rotates about the shaft center 74*a* of the rotary shaft 74 for movable gripping body member. The rotation range of the movable gripping body member 16 is controlled, but the rotation is small enough to correct the deviation due to the pivotal movement of the operating member 14 from a state where the upper surface is parallel to the lower surface of the linear body pressing portion 24 of the fixed gripping body 20.

The linear body holding portion 22 storing the lower portion of the linear body W is formed on the upper surface of the movable gripping body member 16. The clipping groove 22*a* is formed in the upper surface of the linear body holding portion 22 so as to face the clipping groove 24*a* formed in the lower surface of the fixed gripping body 20. The clipping groove 22*a* is formed parallel to the reference plane Pyz including a lateral axis along which the liner body pressing portion 24 of the fixed gripping body 20 and the linear body holding portion 22 of the movable gripping body member 16 extend.

(d) Coupling Member

The coupling member 18 includes an elongate coupling member body 80 and a ring portion 130 provided at the backward end of the coupling member body 80. The ring portion 130 is bent at a prescribed angle relative to a reference plane including a lateral axis along which the linear body pressing portion 24 and the linear body holding portion 22 extend, along an axis line in a pulling direction from a boundary with the coupling member body 80 to a side contour portion. When the linear body W is gripped between the linear body pressing portion 24 and the linear body holding portion 22, the bending region is formed along the direction in which the linear body pressing portion 24 and the linear body holding portion 22 extend, and positioned along a direction in which the coupling member is pulled at a level lower than or equivalent to the level of the linear body holding portion 22. The coupling member 18 extends from the lower end of the operating member 14 upward in the pulling direction on the far side of the operating member 14 (that is, on the side of the installation portion 24*c*).

When the linear body pressing portion 24 and the linear body holding portion 22 are placed closer to each other to grip the linear body W due to a smaller diameter thereof, and when the linear body pressing portion 24 and the linear body holding portion 22 are spaced apart from each other to grip the linear body W due to a larger diameter thereof, the coupling member 18 has a sufficient length so that a portion attached to the rotary shaft 72 for coupling member can be positioned further on the pulling side than the vertically downward position of the rotary shaft 74 for movable gripping body member, while a base point t, to which a tensile force of the linear body W is applied, can reach a position near the center line of the linear body W (see FIGS. 25 to 27). When the linear body pressing portion 24 and the linear body holding portion 22 are placed closer to each other to grip the linear body W due to a smaller diameter thereof, and when the linear body pressing portion 24 and the linear body holding portion 22 are spaced apart from each other to grip the linear body W due to a larger diameter thereof, the coupling member 18 has a sufficient length so that the coupling member 18 can extend from the lower side of the linear body holding portion 22 to a position higher than or equivalent to the height of the linear body holding portion 22, and can be supported by the coupling member guide 26 on the half way (see FIGS. 25 to 27).

The coupling member 18 includes an elongate rod-shaped coupling member body 80 having a rectangular cross-section, a ring portion 130 provided at the backward end of the coupling member body 80, and the thumb hooking portion 120 provided on the side of the ring portion 130 of the coupling member body 80. The attachment hole 82 for operating member is provided on the forward portion of the coupling member body 80. The attachment hole 64 for coupling member of the operating member 14 and the attachment hole 82 for operating member of the coupling member 18 have the same diameter, and the attachment hole 64 for coupling member and the attachment hole 82 for operating member are arranged side by side so that the outer peripheral edges of these holes are parallel to each other. The coupling member 18 is rotatably attached to the operating member 14 about the rotary shaft 72 for coupling member which is inserted through the attachment hole 64 for coupling member and the attachment hole 82 for operating member.

The guide hole 28 of the coupling member guide 26 is formed at substantially the same height as the support shaft hole 30 of the wire gripper body member 12, and the attachment hole 60 for wire gripper body member of the operating member 14 is formed at substantially the same height as the support shaft hole 30 and the guide hole 28 of the wire gripper body member 12. Therefore, the coupling member 18 attached to the attachment hole 64 for coupling member, which is formed below the attachment hole 60 for wire gripper body member of the operating member 14, is inserted through the guide hole 28 and raised in a direction in which the coupling member 18 is pulled (direction a shown in FIG. 1).

The coupling member 18 is attached to the operating member 14 such that the coupling member 18 is parallel to the top 32*a* of the thread 32 and the top 40*a* of the thread 40 of the wire gripper body member 12, and extends along the direction in which the clipping groove 24*a* of the fixed gripping body 20 and the clipping groove 22*a* of the movable gripping body member 16 extend. The coupling member 18 rotates about the shaft center 72*a* of the rotary shaft 72 for coupling member.

The coupling member body 80 of the coupling member 18 has a substantially linear belt-like body and an arc-like and belt-like body gradually curved as it rises upward, and includes an upper end edge and a lower end edge. The left side end of the coupling member body 80 of the coupling member 18 is rotatably attached to the operating member 14 about the rotary shaft 72 for coupling member, and the intermediate portion is supported by the guide hole 28 of the coupling member guide 26.

The guide hole 28 of the coupling member guide 26 is positioned further on the backward side than the position of the rotary shaft 72 for coupling member on the upper side of the rotary shaft 72, and the coupling member body 80 of the coupling member 18 supported by the guide hole 28 of the coupling member guide 26 extends upward on the backward side. The coupling member body 80 of the coupling member 18 has the lower end edge slidably supported by the lower end of the guide hole 28 of the coupling member guide 26.

Figure 8:
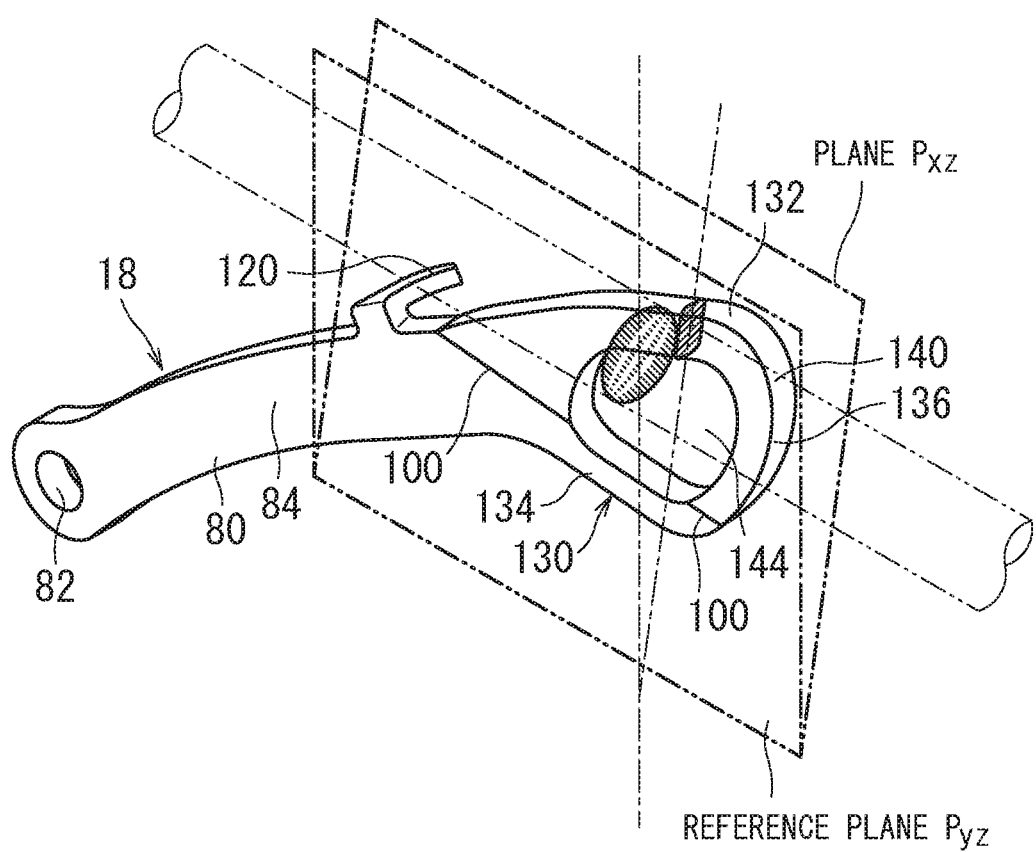
FIG. 8 is a perspective view illustrating the coupling member.
Figure 9:
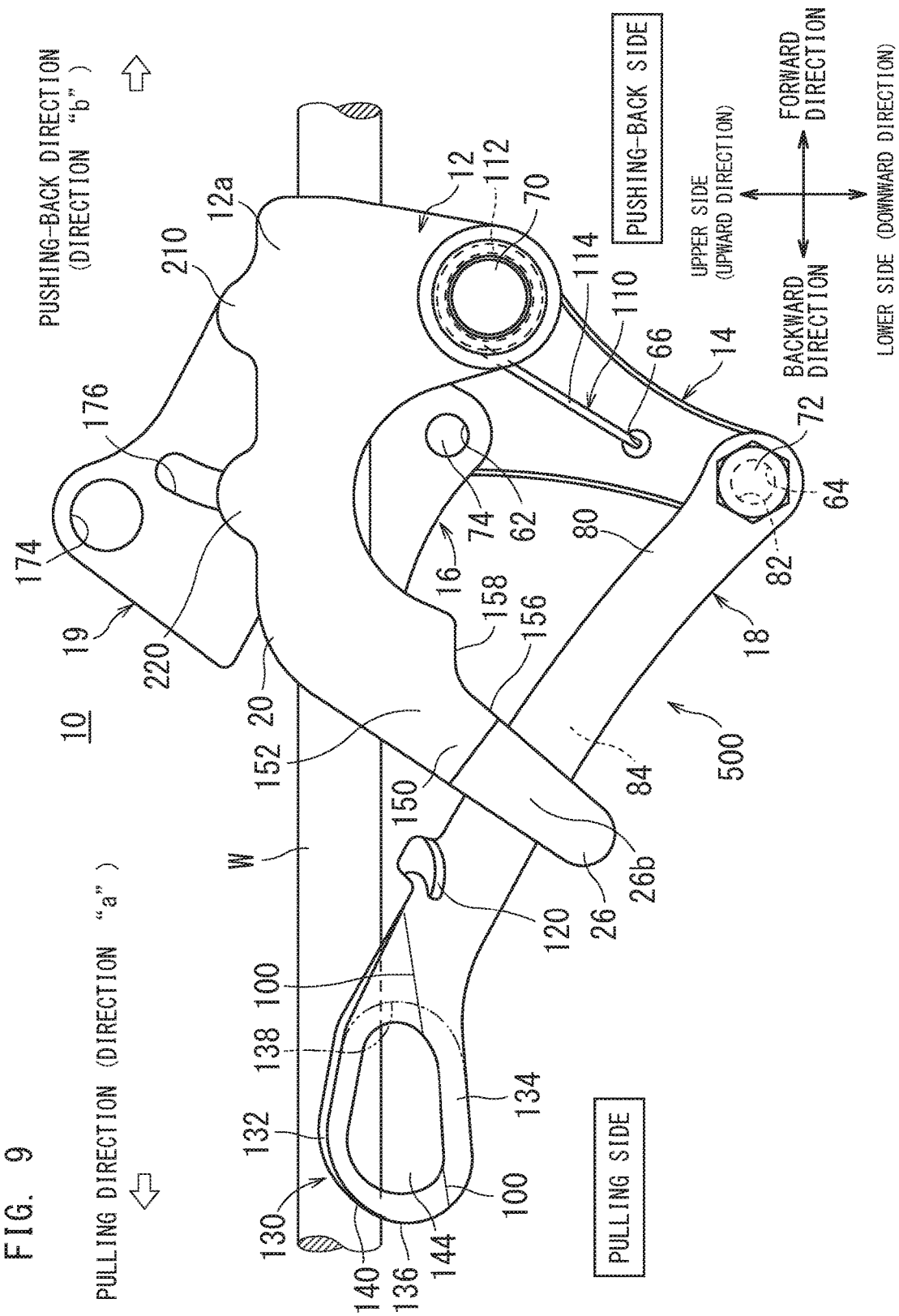
FIG. 9 is a rear side view of the wire gripper shown in FIG. 2.

As shown in FIG. 7A(c) and FIG. 8, the coupling member body 80 extends parallel to the reference plane Pyz including a lateral axis along which the liner body pressing portion 24 of the fixed gripping body 20 and the linear body holding portion 22 of the movable gripping body member 16 extend.

The reference plane Pyz is also a plane including a lateral axis along which the linear body W gripped between the fixed gripping body 20 and the movable gripping body member 16 extends.

The ring portion 130 has a substantially elliptical annular shape in plan view, and includes an upper contour portion 132, a lower contour portion 134, and a side contour portion 136. The ring portion 130 has a substantially oval shape, and has a narrow region on the side of the coupling member body 80 and a swollen region at the free end opposite the coupling member body 80.

The upper contour portion 132 forming the upper region of the inclined portion 140 and the lower region of the lower contour portion 134 is formed into a tapered shape where the interval therebetween gradually increases as it proceeds from a boundary 138 between the coupling member body 80 and the ring portion 130 toward the free end. The lower contour portion 134 goes down to a lower level than the lower end edge of the coupling member body 80 as it proceeds toward the side contour portion 136 at the free end.

The ring portion 130 has a pulling hole 144 at its center through which a wire or the like is inserted to pull the linear body W. The pulling hole 144 has the backward side, that is, the hole edge in the pulling direction formed into an arc shape that is easily hooked with a hook or the like of a wire tensioning device.

The coupling member 18 is configured such that the base point t, to which a tensile force is applied when the coupling member 18 is pulled with a hook or the like hooked in the pulling hole 144 of the ring portion 130, is brought to a position near the linear body W. Further, the coupling member 18 is configured such that the base point t, to which a tensile force of the ring portion 130 is applied, is positioned at a height close to the height of the linear body holding portion 22 of the movable gripping body member 16. Further, the coupling member 18 is configured such that the base point t, to which a tensile force is applied, is located at a position higher than the position of the bending region 100. With this configuration, when the wire gripper 10 is pulled with the hook of a wire tensioning device, the extending direction of the linear body W is substantially parallel to the pulling direction, thereby enabling pulling without tilting the wire gripper 10, and bending and rotating the linear body W. This can be done substantially in the same manner even when the diameter of the linear body W changes.

The upper region of the ring portion 130 is bent in the bending region 100 toward the far side at a prescribed angle relative to the reference plane Pyz including a lateral axis along which the liner body pressing portion 24 of the fixed gripping body 20 and the linear body holding portion 22 of the movable gripping body member 16 extend. In other words, the ring portion 130 has an inclined portion 140, in which the upper region of the ring portion 130 is bent toward the far side at a prescribed angle relative to the principal surface of the coupling member body 80 in the bending region 100 from the side of the opening 36 to the side of the installation portion 24c of the fixed gripping body 20 so as to avoid the linear body W; and the lower contour portion 134 parallel to the principal surface of the coupling member body 80. The ring portion 130 is configured such that a plane Pxz passing through the inclined portion 140 including the upper region of the pulling hole 144 obliquely intersecting with the reference plane Pyz. Meanwhile, the lower contour portion 134 is formed parallel to the reference plane Pyz. When gripping the linear body W with the wire gripper 10, since the upper region of the ring portion 130 is bent from the near side toward the far side, even when a user grasps the grasp portion 500 of the wire gripper 10 and lifts the wire gripper 10 so as to make an approach to the linear body W, the linear body W can be reliably gripped between the linear body pressing portion 24 and the linear body holding portion 22 while preventing the linear body W from interfering with the ring portion 130. Further, even when the ring portion 130 of the coupling member 18 of the wire gripper 10, which is mounted to the linear body W, is pulled in the pulling direction with a wire tensioning device or the like, since the upper region of the ring portion 130 is bent from the near side toward the far side, the ring portion 130 can be reliably pulled while preventing the linear body W from interfering with the ring portion 130.

The axis line A1 of the coupling member body 80 (passing through the rotary shaft 72 for coupling member) and the center line A2 of the ring portion 130 (passing through the base point t to which a tensile force of the ring portion 130 is applied) obliquely intersect with each other. The center line A2 of the ring portion 130 in the longitudinal direction passes through between the upper contour portion 132 forming the upper region of the inclined portion 140, and the lower region of the lower contour portion 134.

As shown in FIG. 2, when the linear body W is gripped between the linear body pressing portion 24 and the linear body holding portion 22, the bending region 100 is substantially parallel to the direction in which the linear body pressing portion 24 and the linear body holding portion 22 extend, and extends over the ring portion 130 while passing through the pulling hole 144 below the linear body W. As such, the ring portion 130 is configured such that the upper region of the inclined portion 140 that is closer to the linear body W is positioned far side of the linear body W gripped in a substantially horizontal direction between the linear body pressing portion 24 and the linear body holding portion 22. In other word, the plane Pxz passing through the inclined portion 140 is inclined such that the upper side of the ring portion 130 is positioned on the far side of the linear body W gripped in a substantially horizontal direction between the linear body pressing portion 24 and the linear body holding portion 22.

The bending region 100 continues from the forward side of the ring portion 130 at the upper end edge of the coupling member body 80, that is further on the forward side than the boundary between the coupling member body 80 and the ring portion 130, to the backward side of the ring portion 130. The bending region 100 is substantially linear; obliquely intersects with the axis line A1 of the coupling member body 80; and continues toward the pulling hole 144 of the lower region of the lower contour portion 134. The bending region 100 continues to the lower side on the backward region and continues to near the boundary with the lower region of the lower contour portion 134 in the backward region of the ring portion 130; the backward side region of the ring portion 130 is bent. The bending region 100 extends in a position near the center line A2 of the ring portion 130 in a direction substantially parallel to the center line A2, that is, at a small angle made with the center line A2. The bending region 100 is made substantially parallel to the direction in which the linear body W extends, whether the diameter of the linear body W is small, that is, the linear body W is thin, or the diameter of the linear body W is large, that is, the linear body W is thick. That is, the bending region 100 is substantially parallel to the direction in which the linear body pressing portion 24 and the linear body holding portion 22 extend, and made to extend in substantially the same direction as the direction in which the linear body W extends, that is, at a small angle relative to the direction in which the linear body W extends.

When the linear body pressing portion 24 and the linear body holding portion 22 are placed closer to each other to grip the linear body W due to a smaller diameter thereof, and when the linear body pressing portion 24 and the linear body holding portion 22 are spaced apart from each other to grip the linear body W due to a larger diameter thereof (in front view), the bending region 100 of the ring portion 130 is positioned substantially at the same height as, or slightly higher than or slightly lower than the height of the linear body holding portion (see FIGS. 25 to 27). When the linear body pressing portion 24 and the linear body holding portion 22 are placed closer to each other to grip the linear body W due to a smaller diameter thereof, and when the linear body pressing portion 24 and the linear body holding portion 22 are spaced apart from each other to grip the linear body W due to a larger diameter thereof (in front view), the bending region 100 of the ring portion 130 is positioned substantially at the same height as, or slightly higher than or slightly lower than the height of the support shaft 70 and the rotary shaft 74 for movable gripping body member (see FIGS. 25 to 27).

The ring portion 130 is bent at a prescribed angle by bending, for example, by forging, and thus a mechanical stress applied to the bending portion is small so that the mechanical stress of the coupling member 18 is almost free from change. Further, bending is performed in the bending region 100 extending over at least the ring portion 130, and thus the mechanical stress created during bending is dispersed in the entire ring portion 130. The extending direction of the bending region 100 is substantially parallel to the center line A2 of the ring portion 130 (passing through the base point t to which a tensile force of the ring portion 130 is applied). As such, the mechanical strength of the coupling member 18 is further prevented from decreasing, thereby improving the durability of the coupling member 18.

Further, the prescribed angle is made such that the outer peripheral surface of the linear body W comes closer to the surface of the ring portion 130 when the linear body W is gripped between the linear body pressing portion 24 and the linear body holding portion 22.

According to the embodiment of the present invention, the prescribed angle, that is, the angle between the reference plane Pyz including a lateral axis along which the linear body pressing portion 24 of the fixed gripping body 20 and the linear body holding portion 22 of the movable gripping body member 16 extend, and the plane Pxz passing through the inclined portion 140 including the upper region of the pulling hole 144 of the ring portion 130, is 25 degrees, and the prescribed angle is within the range from 15 to 40 degrees. When the prescribed angle is less than 15 degrees, the likelihood of the interference between the linear body W and the ring portion 130 increases, and if the prescribed angle exceeds forty degrees, the pulling direction hardly become substantially parallel to the direction in which the linear body W extends when pulling the coupling member 18 with a hook or a belt of a wire tensioning device. With this configuration, the ring portion 130 can make a reliable approach to the linear body W without the interference between the ring portion 130 and the linear body W. As such, the center line A2 of the ring portion 130 is not significantly spaced apart from the center of the linear body W. That is, when the ring portion 130 is pulled with a hook or belt of a tensioning device hooked in the pulling hole 144, the ring portion 130 is pulled at a position near the center of the linear body W, and thus the linear body W can be pulled while the wire gripper 10 is not subjected to inclination, or the linear body W is not subjected to bending. As a result, the damages created on the surface of the linear body W due to bending can be minimized.

(e) Grasp Portion

The wire gripper 10 according to the present invention is provided with a grasp portion 500 to allow a user to grasp the wire gripper 10 with a single hand. The grasp portion 500 is mainly constituted by the coupling member guide 26, the coupling member body 80, and the thumb hooking portion 120.

The grasp portion 500 of the coupling member guide 26 is located at a position lower than the positions of the linear body pressing portion 24 and the linear body holding portion 22, and at a position higher than the position of the support shaft 30.

On the far side (the rear side) surface, the coupling member guide 26 is provided with a hand contact portion 150 with which a palm and a portion near the base of a forefinger of the human hand are brought into contact. On the far side (the rear side) surface, the wire gripper body member 12 is provided with a forefinger contact portion 152 with which a forefinger is brought into contact in the region where the coupling member guide 26 is formed around the upper portion of the coupling member guide 26. On the near side (the front side), the coupling member guide 26 of the wire gripper body member 12 is provided with a middle finger contact portion 154 with which the pad of a middle finger reaching the near side (the front side) from the far side (the rear side) of the coupling member 18 is brought into contact. On the surface of the forward side or the surface of the pushing side, the wire gripper body member 12 is provided with a grip portion 156 with which a portion near the base of a middle finger is brought into contact. The grip portion 156 is pulled backward (pulling side) by the middle finger applied thereto.

In the coupling member guide 26, the body portion 26a on the near side of the guide hole 28 constitutes the middle finger contact portion 154, and the middle finger contact portion 154 is formed downward on the lower side of the clipping groove 22a of the linear holding portion 22. In the coupling member guide 26, a body portion 26b on the far side of the coupling member guide 26 opposite the body portion 26a constituting the middle finger contact portion 154 with the guide hole 28 sandwiched therebetween constitutes the forefinger contact portion 152, and the forefinger contact portion 152 is formed downward on the lower portion of the installation portion 24c of the linear body pressing portion 24. The guide hole 28 formed between the body portion 26a and the body portion 26b has the coupling member body 80 of the coupling member 18 inserted therethrough.

The wire gripper body member 12 is provided with a finger contact portion 158 for supporting the wire gripper body member 12 with the upper portion of a finger between a second joint from the tip of a middle finger (PIP joint) and a joint at the base of a finger (MP joint). The finger contact portion 158 has a horizontal surface extending further backward than the support 68 for movable gripping body member, that intersect with the forward surface of the coupling member guide 26.

The thumb hooking portion 120 is provided to allow a thumb to hook thereon when a user grips the wire gripper 10 with his or her hand. With this configuration, the wire gripper 10 can be reliably gripped by a single hand. The protruded thumb hooking portion 120 is formed in the upper region on the side of the installation portion 24c of the fixed gripping body 20 on the side of the ring portion 130 of the coupling member body 80 and projects to the far side of the coupling member body 80 substantially orthogonal to the coupling member body 80. The protruded thumb hooking portion 120 is orthogonal to the direction in which the coupling member 18 is pulled (direction a shown in FIG. 1). The protruded thumb hooking portion 120 is positioned ahead of the ring portion 130, and the coupling member guide 26 is ahead of the protruded thumb hooking portion 120. The protruded thumb hooking portion 120 and the coupling member guide 26 are position further on the backward side than the backward side of the linear pressing portion 24 and the linear holding portion 22 with the linear body W gripped therebetween, but further on the forward side than the ring portion 130.

The coupling member body 80 is provided with the finger contact portion 84 to which the pads of a middle finger and an annular finger are applied when grasping the wire gripper 10. The thumb hooking portion 120 and the coupling member guide 26 are formed at positions close to the linear pressing portion 24 and the linear holding portion 22, and thus the weight is relatively well balanced. As such, the wire gripper 10 can be easily lifted and hooked onto the linear body W by grasping the portions of the wire gripper 10 extending over the thumb hooking portion 120 and the coupling member guide 26 with a single hand. According to an embodiment of the present invention, in order that the wire gripper 10 may be grasped by a thumb hooked onto the thumb hooking portion 120 and by a forefinger, a middle finger, and an annular finger hooked onto the forward end of the coupling member guide 26 in a state where the ring portion 130 is pulled backward, a length L1 between the thumb hooking portion 120 and the coupling member guide 26 is set within the range of 3 to 6 cm corresponding to a length L2 between a thumb and a forefinger.

The coupling member 18 includes an elongate coupling member body 80 and a ring portion 130 provided at the backward end of the coupling member body 80, and the thumb hooking portion 120 of the coupling member 18 onto which a thumb is hooked when gripping the wire gripper 10 with a user's hand is provided on the side of the ring portion 130 of the coupling member body 80 in the region on the side of the installation portion 24c of the fixed gripping body 20. The ring portion 130 is bent at a prescribed angle relative to a reference plane including a lateral axis along which the linear body pressing portion 24 and the linear body holding portion 22 extend, along an axis line in a pulling direction from the boundary between the ring portion 130 and the coupling member body 80 to the side contour portion. When the linear body W is gripped between the linear body pressing portion 24 and the linear body holding portion 22, the bending region is formed along the direction in which the linear body pressing portion 24 and the linear body holding portion 22 extend, and positioned along a direction in which a lever member is pulled at a level lower than or equivalent to the level of the linear body holding portion 22. The bending of the bent region may be performed by forging, but the thumb hooking portion 120 is also bent by forging at the same time. Therefore, the uppermost end of the thumb hooking portion 120 is formed at the same height as the height of bending or slightly lower than that at the position where the bent region is bendable.

(f) Cover Region

The cover member 19 is formed into a substantially rectangular shape in front view and is rotatably attached to the wire gripper body member 12 about the rotary shaft 210 for cover member. The cover member 19 is provided to prevent the linear body W gripped between the linear body pressing portion 24 of the fixed gripping body 20 and the linear body holding portion 22 of the movable gripping body member 16 from being disengaged from the wire gripper 10.

The cover member 19 is formed parallel to the reference plane Pyz including a lateral axis along which the linear body pressing portion 24 of the fixed gripping body 20 and the linear body holding portion 22 of the movable gripping body member 16 extend.

In the cover member 19, at a portion of interior angle on the forward side, the attachment hole 170 for wire gripper body member into which the rotary shaft 210 for cover member is inserted, is formed; and at a portion of the interior angle on the upper backward side, a hook opening 174, which is used when the cover member 19 is rotated by a hand, is formed. At a center portion of the cover member 19, an arc-shaped long hole 176 for regulating movable range is formed with the rotary shaft 210 for cover member as the center. The arc-shaped long hole 176 for regulating movable range is provided to regulate the rotational range of the cover member 19 in cooperation with the pressing body 220. The pressing body 220 is positioned on the backward side (right side) compared to the rotary shaft 210 for cover member. The attachment hole 170 for wire gripper body member and the attachment hole 160 for cover member of the wire gripper body member 12 has the same diameter and arranged side by side with the outer peripheral edges arranged parallel to each other. The hole diameter of the long hole 176 for regulating movable range is set slightly larger than the hole diameter of the screw hole 162 of the wire gripper body member 12, and the pressing body 220 is configured to smoothly move without making contact with the outer peripheral edge of the arc-shaped long hole 176 for regulating movable range, when the cover member 19 is rotated.

As shown in FIG. 10, the cover member 19 is placed on the fixed gripping body 20 of the wire gripper body member 12, and the attachment hole 170 for wire gripper body member and the attachment hole 160 for cover member linearly aligned and rotatably attached to the wire gripper body member 12 about the rotary shaft 210 for cover member. The cover member 19 rotates parallel to the direction where the linear body pressing portion 24 of the fixed gripping body 20 formed on the wire gripper body member 12 extends. At this time, the far side surface of the cover member 19 is in sliding contact with each of the near side surfaces of the linear body pressing portion 24 of the fixed gripping body 20 and the linear body holding portion 22 of the movable gripping body member 16.

The rotary shaft 210 for cover member has a columnar shape having the shaft center 210a extending in the length direction, and has a flange 210b projecting in a direction intersecting with the shaft center 210a on the near side thereof. The rotary shaft 210 for cover member is fitted into the attachment hole 170 for wire gripper body member of the cover member 19 from the near side and screwed into the attachment hole 160 for cover member of the wire gripper body member 12, and thus attached to the wire gripper body member 12 and the cover member 19. The shaft center 210a of the rotary shaft 210 for cover member functions as the center of the pivotal movement for the cover member 19.

The pressing body 220 has a columnar shape having the shaft center 220a extending in the length direction, and has a flange 220b projecting in a direction intersecting with the shaft center 220a on the near side thereof. The pressing body 220 is fitted into the long hole 176 for regulating movable range of the cover member 19 from the near side and attached to the wire gripper body member 12 so as to freely move back and forth. The pressing body 220 can be moved back and forth by rotating the flange 220b with the pressing body being screwed into or screwed out from the screw hole 162 of the wire gripper body member 12. The pressing body 220 may move and advance the cover member 19 to a point where the cover member 19 can press the near side surface of the wire gripper body member 12 through the washer 180, to thus position the cover member 19 with respect to the wire gripper body member 12 so as to be secured thereto. Further, when the cover member 19 is rotated, the cover member 19 is untightened by moving the pressing body 220 backward, thereby releasing the cover member 19 from pressing the near side surface of the wire gripper body member 12.

Figure 11:
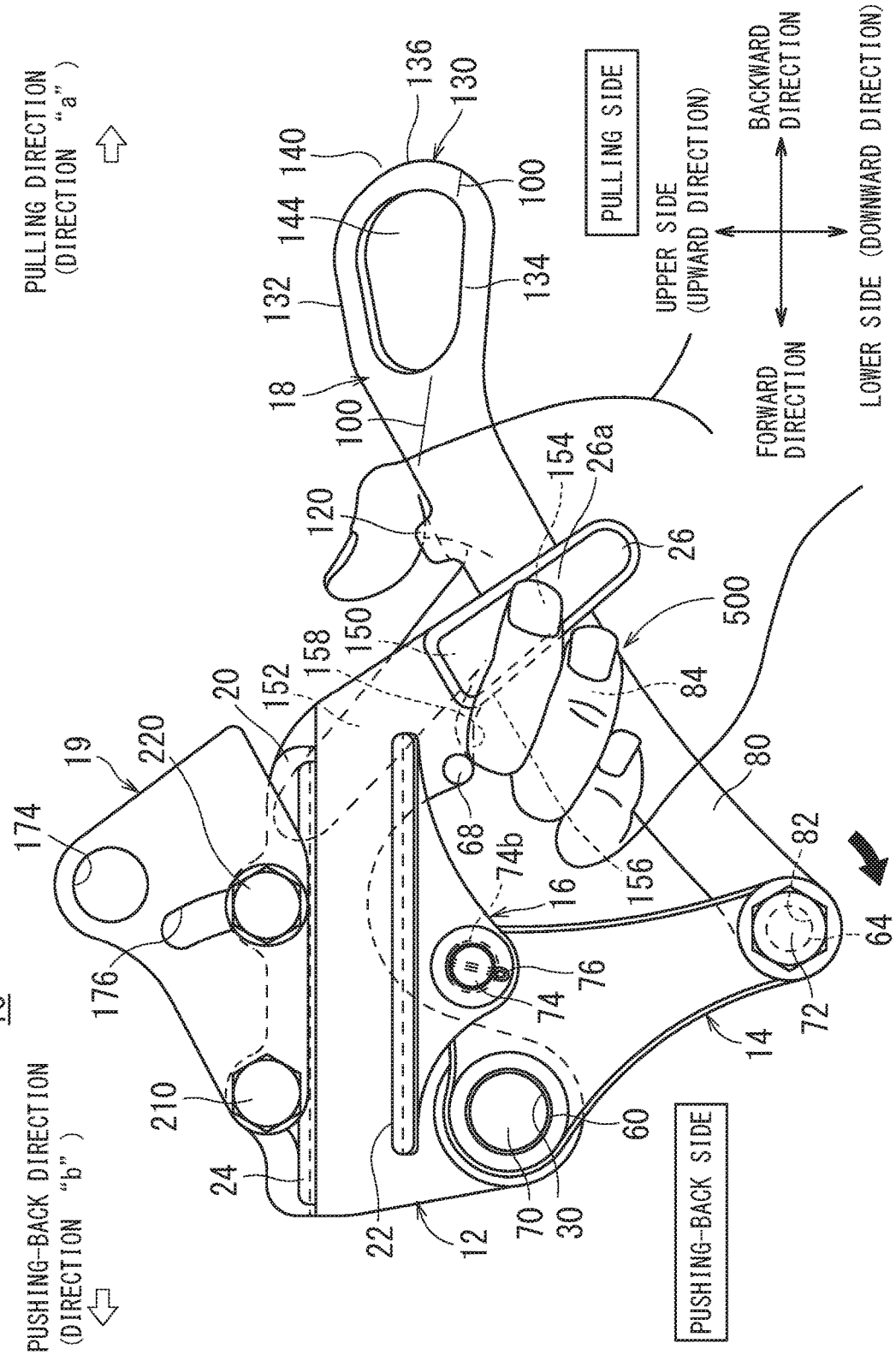
FIG. 11 is a front view illustrating a procedure of attaching the wire gripper to a linear body.

2. Operation of Wire Gripper (a) Process of Mounting Wire Gripper onto Linear Body Next, a process of mounting the wire gripper 10 onto the linear body W is described. As shown in FIG. 11, the wire gripper 10 is lifted with the wire gripper body member 12 positioned upward, the coupling portion between the operating member 14 and the coupling member 18 is gripped by user's one hand (left hand), and the coupling member guide 26 of the wire gripper body member 12 and the coupling member 18 that constitute the grasp portion 500 are gripped by user's the other hand (right hand). At this time, a palm portion close to the base of a user's finger is brought into contact with the coupling member 18 (the far side surface); the pads of a middle finger, an annular finger and a little finger are brought into contact with the near side surface of the coupling member 18 by bending these fingers; and a thenar area is brought into contact with the far side surface of the coupling member 18. A thumb is bent and its surface close to a forefinger is hooked onto the thumb hooking portion 120. The forefinger is stretched and brought into contact with the far side surface of the coupling member guide 26 and the far side of the wire gripper body member 12. The middle finger is bent and its pad portion is placed on the near side (the front side) of the coupling member guide 26.

Then, as shown by an arrow in FIG. 3, the coupling member 18 is pushed in a push-back direction (direction b shown in FIG. 3) with the middle finger and the thumb being made closer to each other, thereby reducing the interval between the coupling member guide 26 and the thumb hooking portion 120. Here, the linear body holding portion 22 of the movable gripping body member 16 is sufficiently moved away from the linear body pressing portion 24 of the fixed gripping body 20, thereby making it easier to insert the linear body W between the linear body pressing portion 24 and the linear body holding portion 22.

Figure 13:
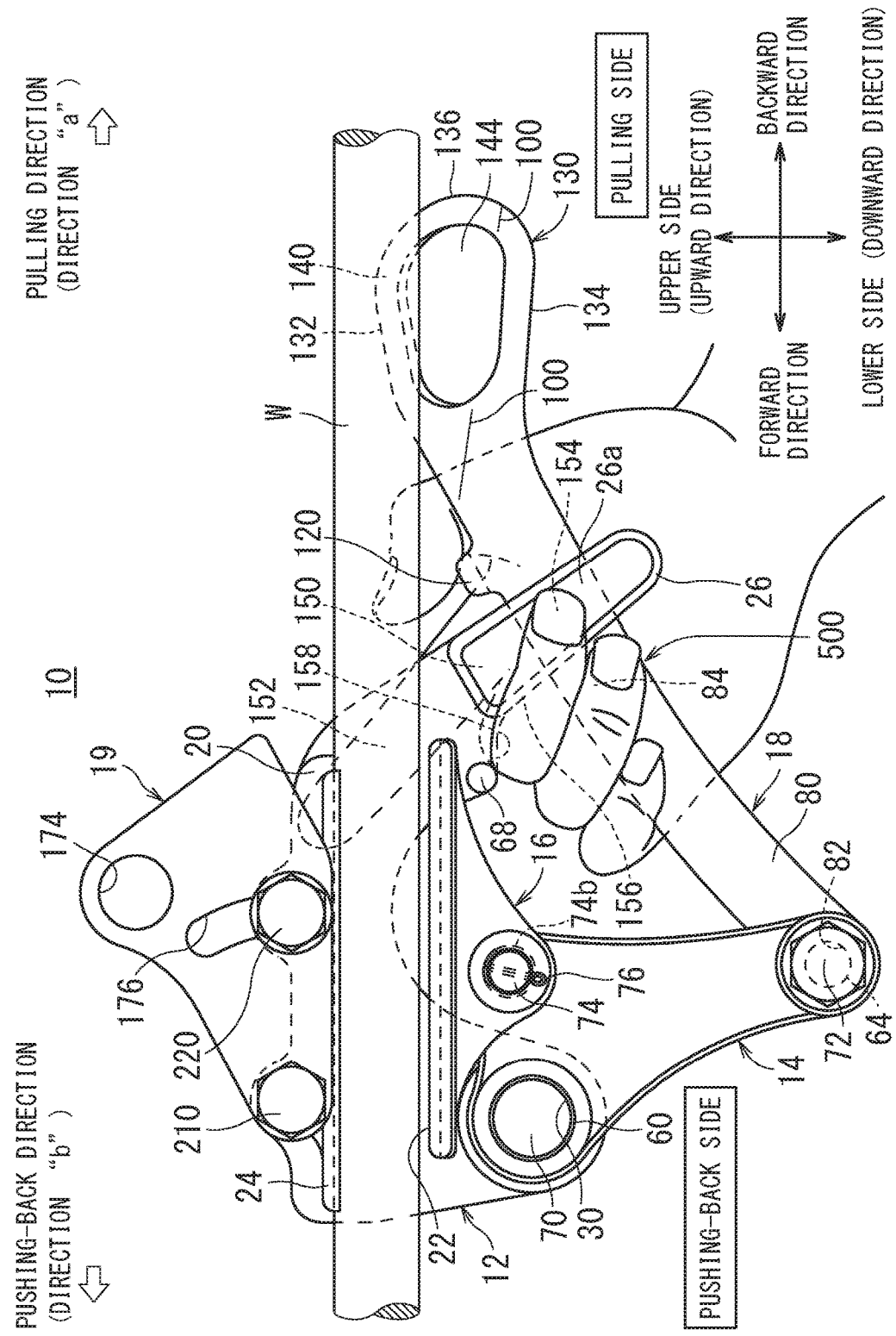
FIG. 13 is a front view illustrating a procedure of attaching the wire gripper to a linear body subsequent to FIG. 11.

Next, as shown in FIG. 13, the linear body W is inserted between the linear body pressing portion 24 and the linear body holding portion 22, and the upper portion of the linear body W is stored in the clipping groove 24a formed in the bottom surface of the linear body pressing portion 24, and thus the wire gripper 10 is hung from the linear body W.

Figure 12:
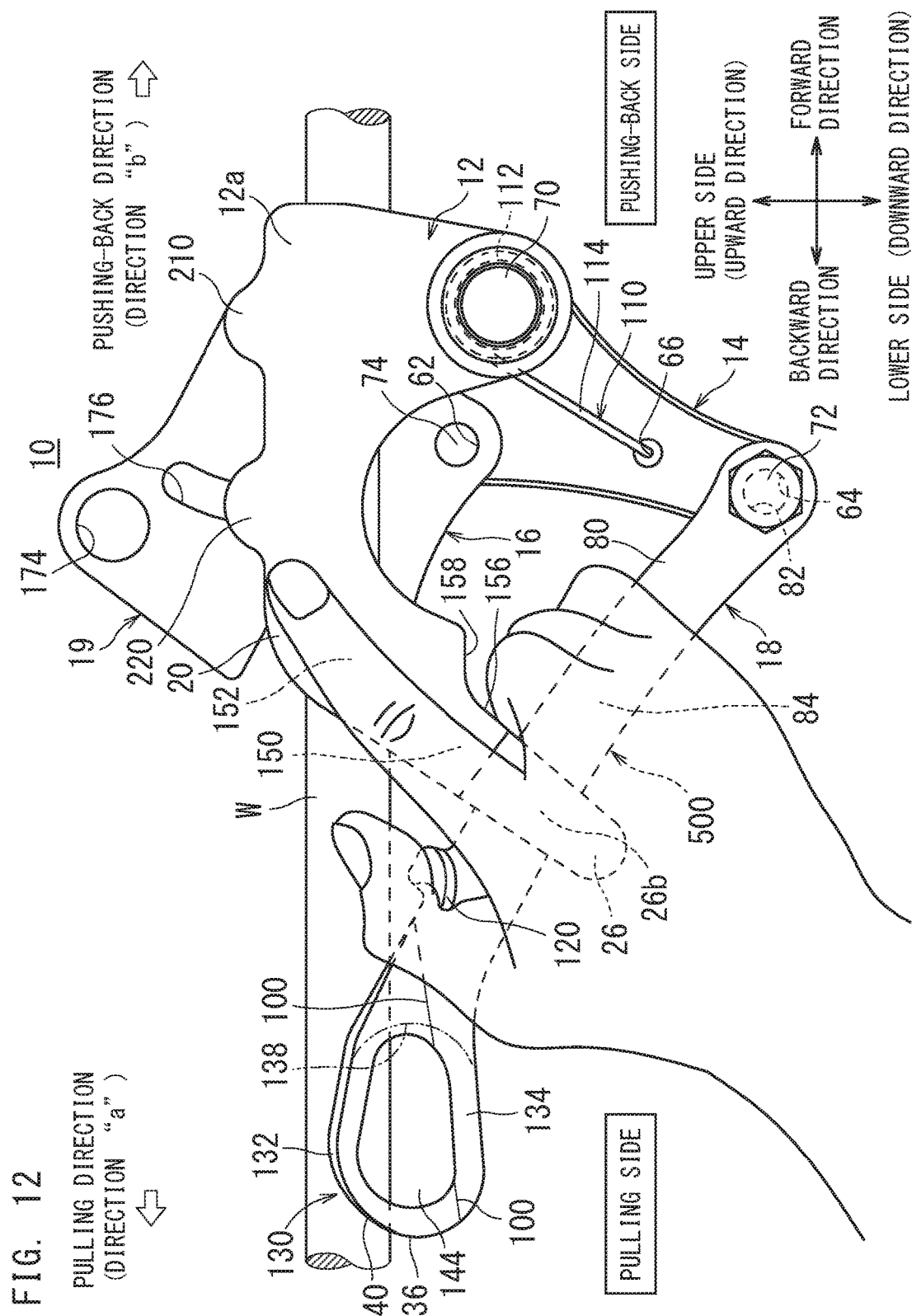
FIG. 12 is a rear side view illustrating a procedure of attaching the wire gripper to a linear body.
Figure 14:
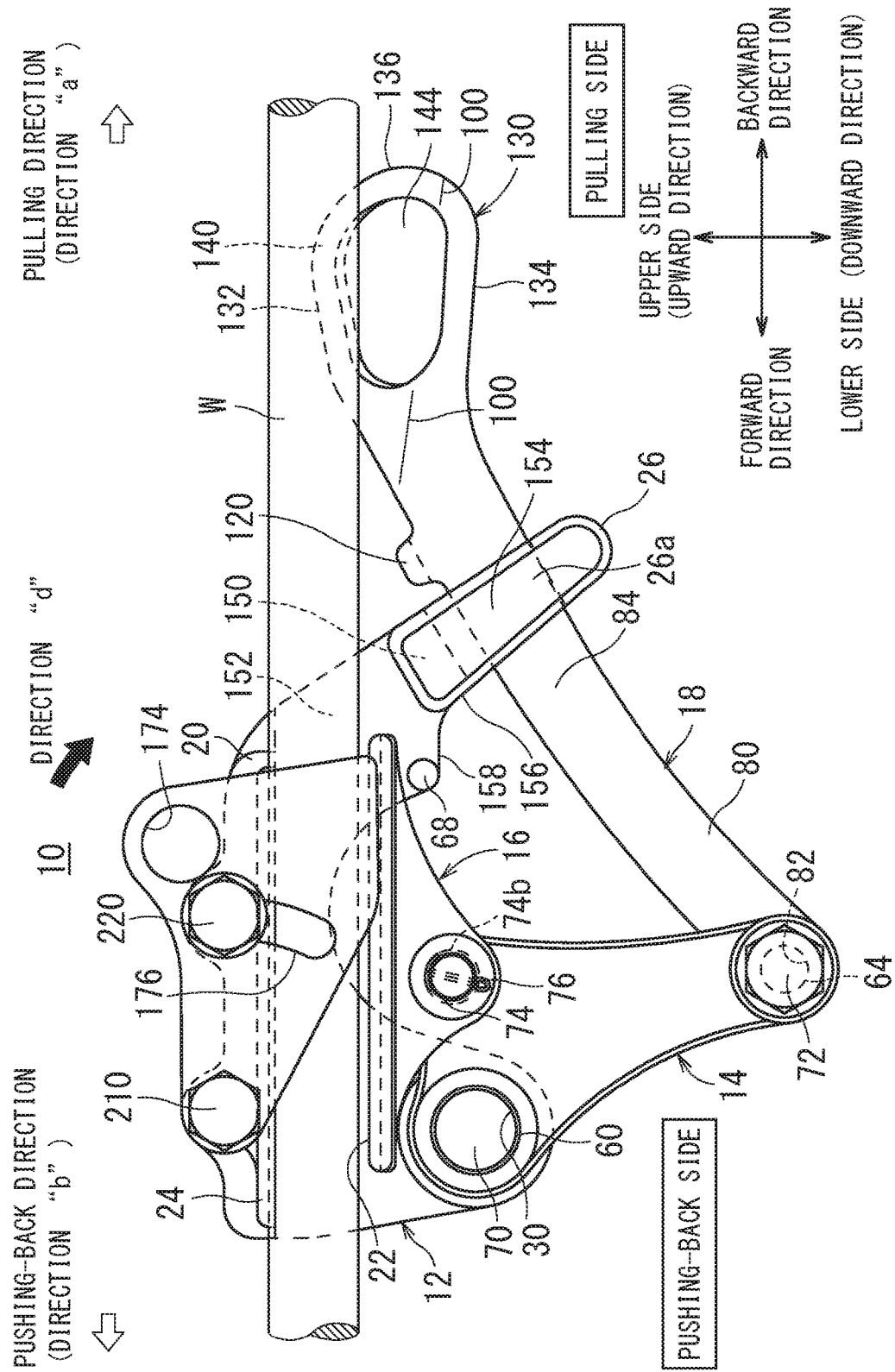
FIG. 14 is a front view illustrating a procedure of attaching the wire gripper to a linear body subsequent to FIG. 13.

Next, as shown in FIG. 12, the pressing body 220 that positions the cover member 19 is released, and the cover member 19 is rotated downward clockwise (direction d shown in FIG. 14) with the shaft center 210a of the rotary shaft 210 for cover member as the center while the movable region of the cover member 19 being regulated by the long hole 176 for regulating movable range. In this way, the cover member 19 covers substantially half of the opening on the near side between the linear body pressing portion 24 and the linear body holding portion 22. Thereafter, the pressing body 220 is screwed in or screwed out from the screw hole 162 of the wire gripper body member 12 thereby being moved back and forth in accordance with the rotational operation of the flange 220b, and the cover member 19 may advance to a point where the cover member 19 can press the near side surface of the wire gripper body member 12 through the washer 180, thereby positioning the cover member 19 with respect to the wire gripper body member 12 so as to be secured thereto.

Figure 15:
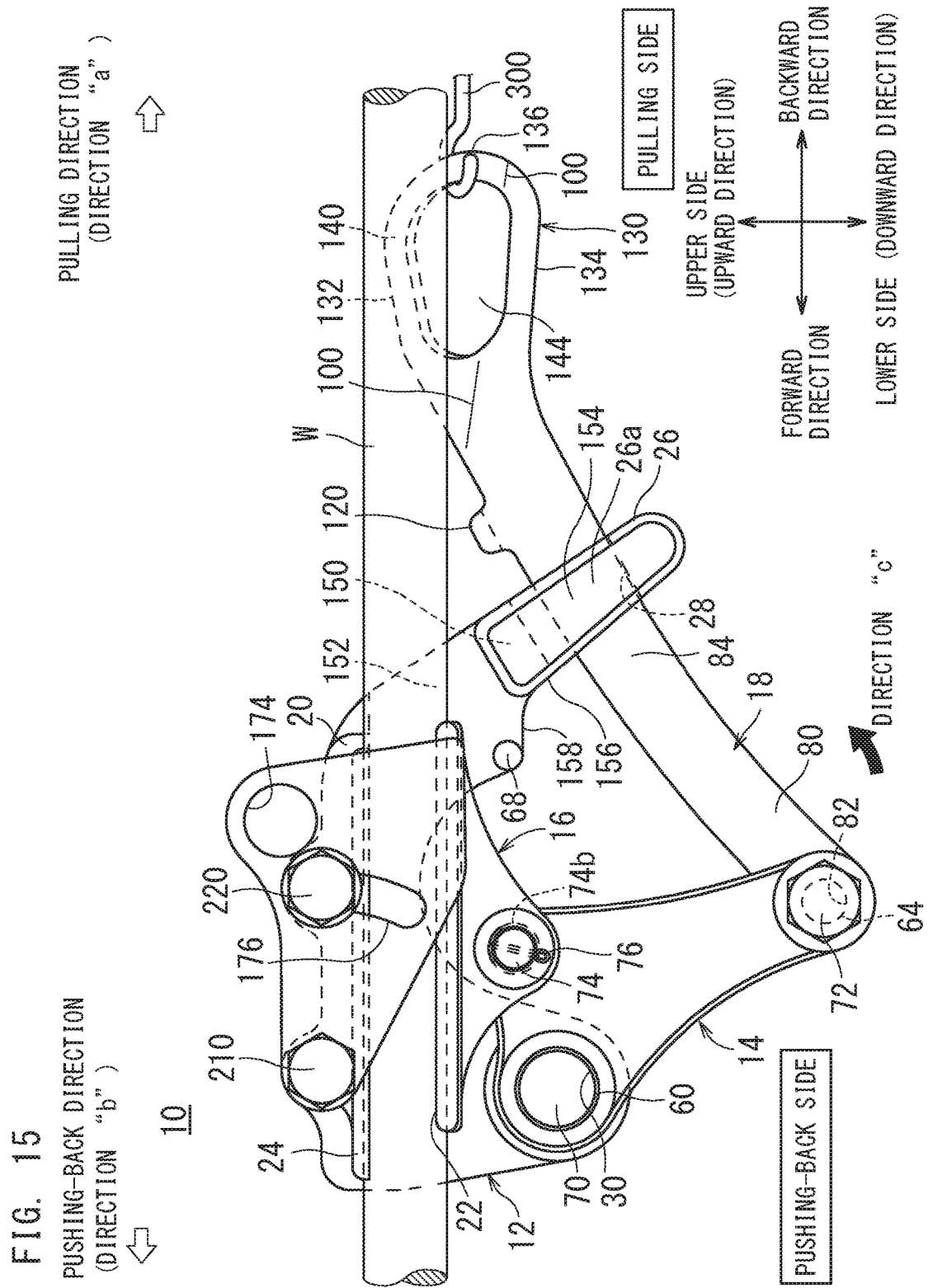
FIG. 15 is a front view illustrating a procedure of attaching the wire gripper to a linear body subsequent to FIG. 14.

When the attachment of the wire gripper 10 to the linear body W is applied to an allocation work for an electric wire as the linear body W, as shown in FIG. 15 illustrating an operation of pulling an electric wire from both sides, a coupling means 300 is provided at both ends of a tensioning device, which is coupled to the wire gripper 10 by using the pulling hole 144 of the ring portion 130 of the coupling member 18. With the tensioning devices after being coupled to both ends, an operation is performed to shorten the length of both ends is reduced, thereby applying a pulling force to the coupling member 18 of the wire gripper 10 in the pulling direction (direction a in FIG. 15).

As shown in FIG. 15, when the coupling member 18 is pulled in the pulling direction (direction a in FIG. 15), the operating member 14 to which one end of the coupling member 18 is coupled is rotated upward counter-clockwise (direction c shown in FIG. 15) with the support shaft 70 as the fulcrum. With this rotation of the operating member 14, the movable gripping body member 16 is pushed upward in the direction to the fixed gripping body 20, and thus the lower portion of the linear body W is stored in the clipping groove 22a and the linear body W is sandwiched and gripped between the linear body pressing portion 24 of the fixed gripping body 20 and the linear body holding portion 22.

When a pulling force is further applied in the pulling direction by the tensioning device (direction a shown by the arrow in FIG. 3), the linear body W gripped by the wire gripper 10 is pulled in the pulling direction shown by the arrow a, and thus the wire grippers 10 on both sides are pulled to each other, thereby creating looseness in the linear body W between both the wire grippers 10, and achieving a condition where an allocation work can be performed.

As described above, in the attachment work of the wire gripper 10, all of the work of mounting the wire gripper 10 onto the linear body W and the work of coupling the coupling means 300 of the wire tensioning device or the like to the coupling member 18 can be performed from the near side, and thus an electric wire allocating work and so forth associated with high place work involved in dangerous environment can be easily and safely performed.

(b) Process of Removing Wire Gripper from Linear Body

Figure 16:
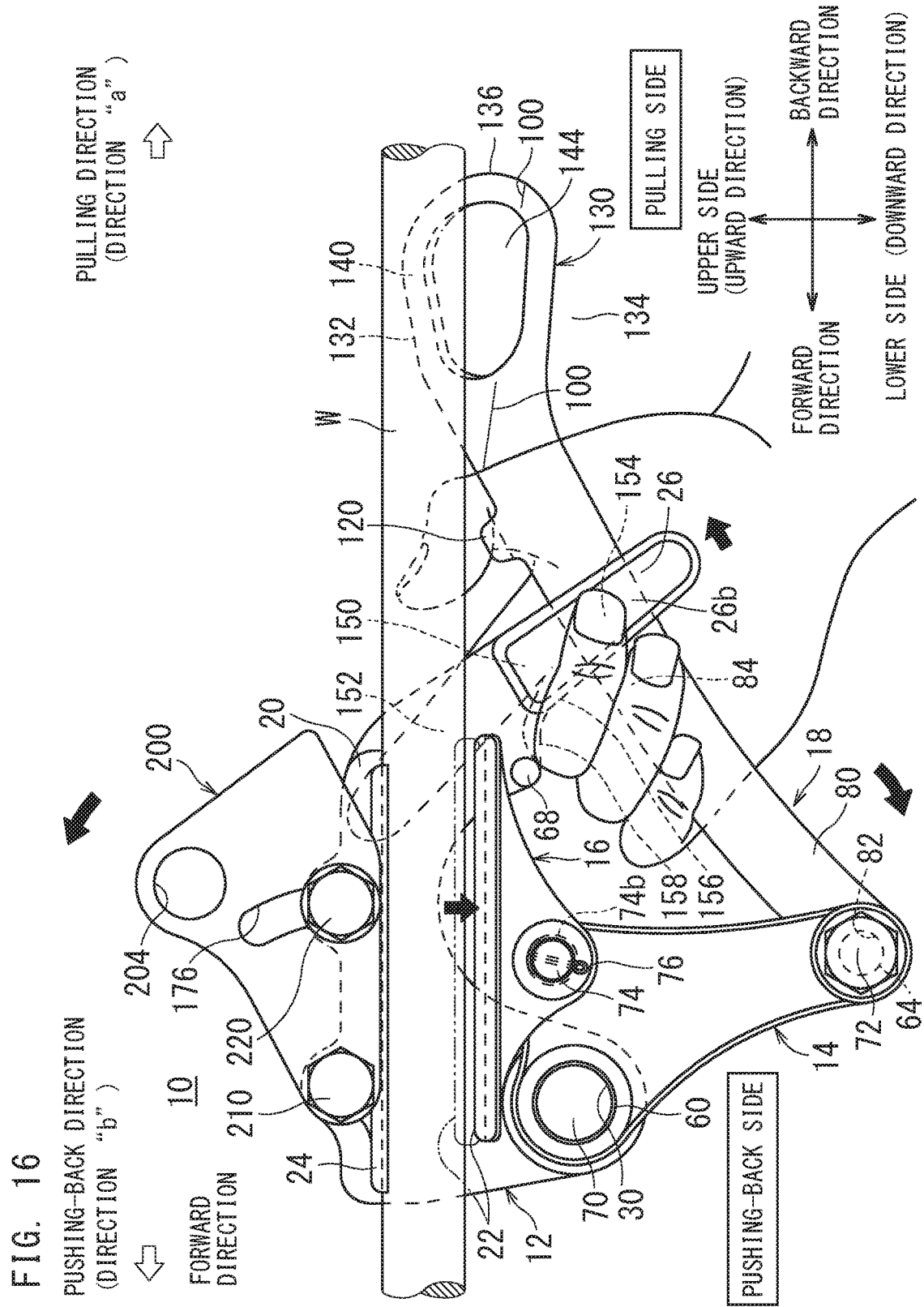
FIG. 16 is a front view illustrating a procedure of removing the wire gripper from a linear body.
Figure 18:
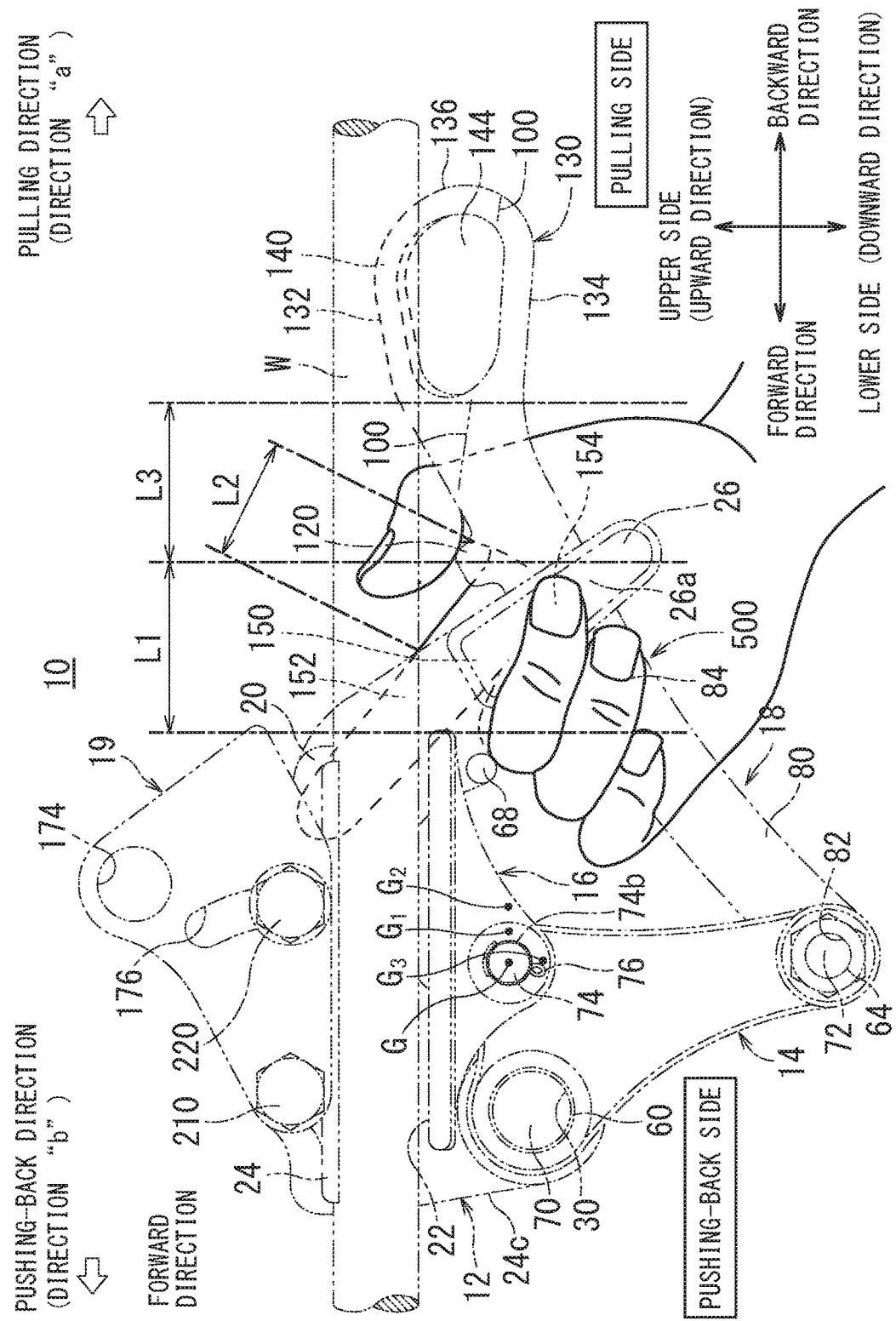
FIG. 18 is an explanatory view of the wire gripper.
Figure 19:
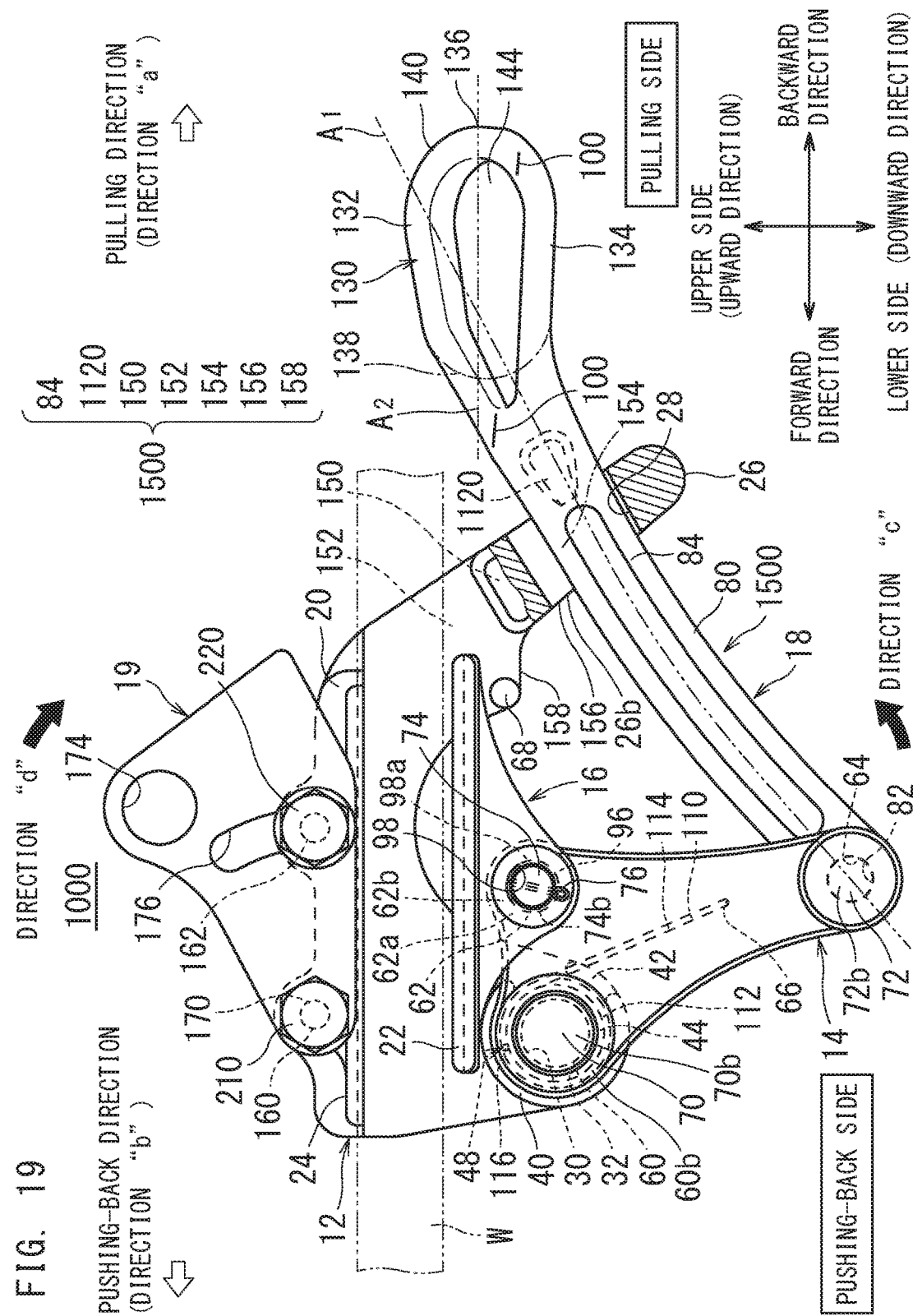
FIG. 19 is a front view illustrating a wire gripper (a wire gripper with a broaden interval between a linear body pressing portion and a linear body holding portion) according to an embodiment of the present invention.
Figure 20:
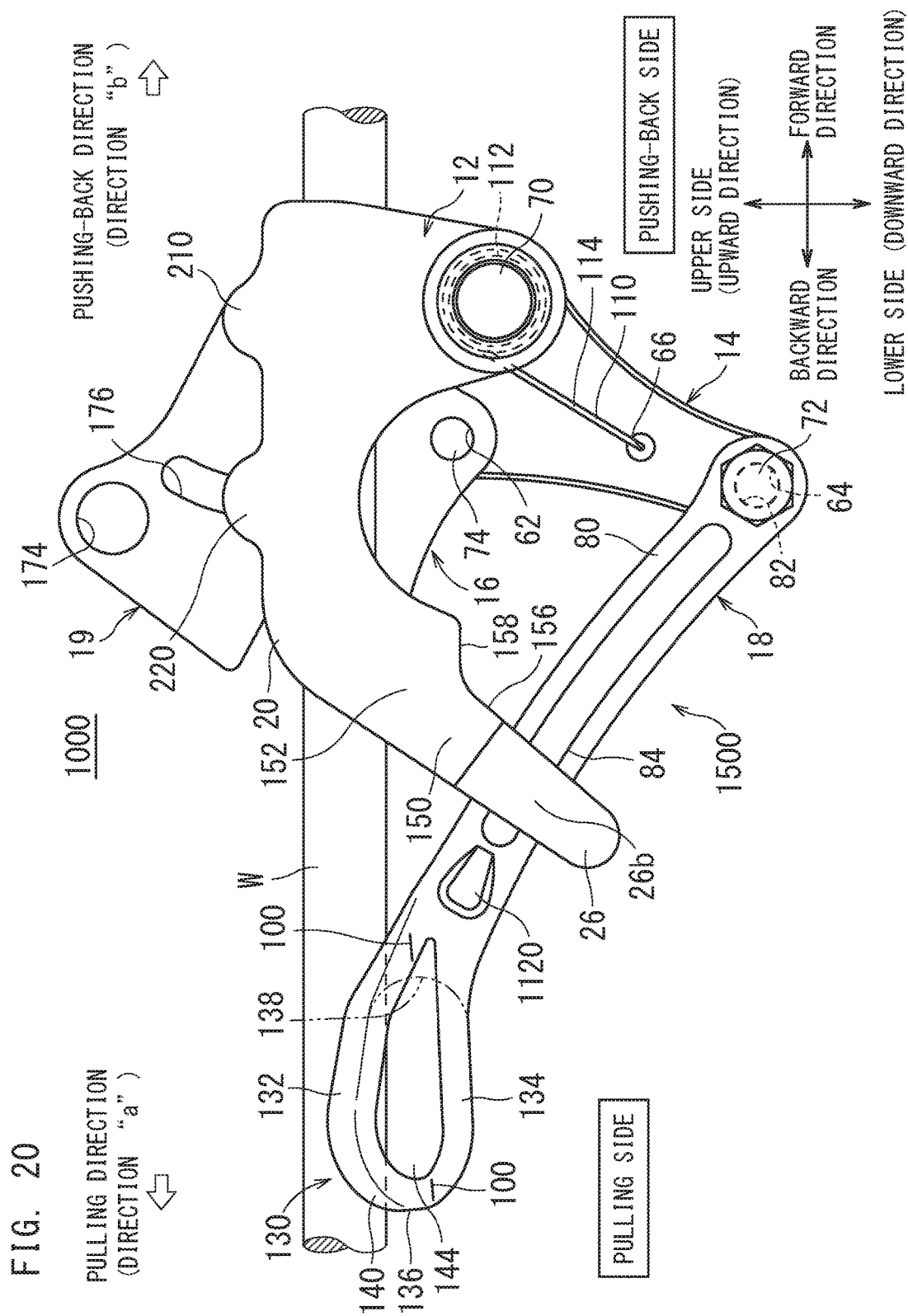
FIG. 20 is a rear side view of the wire gripper shown in FIG. 19.

Next, a process of removing the wire gripper 10 from the linear body W is described. As shown in FIG. 16, the coupling means 300 or the like of the wire tensioning device coupled to the pulling hole 144 of the ring portion 130 of the wire gripper 10 is released to thereby release a pulling force applied to the coupling means 18.

Thereafter, the pressing body 220 that positions the cover member 19 is released, and the cover member 19 is rotated upward counterclockwise (opposite to direction d shown in FIG. 14) by hooking the hook hole 174 by a hand with the shaft center 210a of the rotary shaft 210 for cover member as the center while the movable region of the cover member 19 being regulated by the long hole 176 for regulating movable range.

In this way, the cover member 19 opens the opening on the near side between the linear body pressing portion 24 and the linear body holding portion 22. Thereafter, the pressing body 220 is screwed in or screwed out from the screw hole 162 of the wire gripper body member 12 thereby being moved back and forth in accordance with the rotational operation of the flange 220b, and the cover member 19 may advance to a point where the cover member 19 can press the near side surface of the wire gripper body member 12 through the washer 180, thereby positioning the cover member 19 with respect to the wire gripper body member 12 so as to be secured thereto.

Next, the coupling member guide 26 of the wire gripper body member 12 and the coupling member 18 are gripped by a user's hand. At this time, the wire gripper 10 is lifted with the wire gripper body member 12 positioned upward, the coupling portion between the operating member 14 and the coupling member 18 is gripped by user's one hand (left hand), and the coupling member guide 26 of the wire gripper body member 12 and the coupling member 18 that constitute the grasp portion 500 are gripped by user's the other hand (right hand). At this time, a palm portion close to the base of a user's finger is brought into contact with the coupling member 18 (the far side surface); the pads of a middle finger, an annular finger and a little finger are brought into contact with the near side surface of the coupling member 18 by bending these fingers; and a thenar area is brought into contact with the far side surface of the coupling member 18. A thumb is bent and its surface close to a forefinger is hooked onto the thumb hooking portion 120. The forefinger is stretched and brought into contact with the far side surface of the coupling member guide 26 and the far side surface of the wire gripper body member 12. The middle finger is bent and its pad portion is placed on the near side (front side) of the coupling member guide 26.

Then, as shown by the arrow, the coupling member 18 is pushed in a push-back direction with the middle finger and the thumb being made closer to each other, thereby reducing the interval between the coupling member guide 26 and the thumb hooking portion 120. Here, the linear body holding portion 22 of the movable gripping body member 16 is sufficiently moved away from the linear body pressing portion 24 of the fixed gripping body 20. The movable gripping body member 16 is moved away from the liner body W, and thus the linear body W is released from a gripped state, thereby making it possible to remove the fixed gripping body 20 from the linear body W and disengage the wire gripper 10 therefrom.

Next, a wire gripper 1000 that is another embodiment according to the present invention will be described mainly with reference to FIG. 19 to FIG. 24. The wire gripper 1000 according to this embodiment is different from the wire gripper 10 according to the embodiment shown in FIG. 1 in the configuration of the coupling member 18.

The wire gripper 1000 according to second embodiment of the present invention includes: a wire gripper body member 12 including a fixed gripping body 20 having a linear body pressing portion 24; an operating member 14 mounted to the wire gripper body member 12 pivotably about a support shaft 70; a movable gripping body member 16 including a linear body holding portion 22 that pivotally moves toward the linear body pressing portion 24 of the fixed gripping body 20 in accordance with the pivotal movement of the operating member 14; and a coupling member 18 coupled to the operating member 14 through a rotary shaft for pivotally moving the operating member 14. The coupling member 18 includes an elongate coupling member body 80 and a ring portion 130 provided at the backward end of the coupling member body 80, and the ring portion 130 is bent at a prescribed angle relative to a reference plane including a lateral axis along which the linear body pressing portion 24 and the linear body holding portion 22 extend, along an axis line in a pulling direction from a boundary with the coupling member body 80 to a side contour portion. When the linear body W is gripped between the linear body pressing portion 24 and the linear body holding portion 22, the bending region is formed along the direction in which the linear body pressing portion 24 and the linear body holding portion 22 extend, and positioned along a direction in which the coupling member 18 is pulled at a level lower than or equivalent to the level of the linear body holding portion 22.

A larger weight is allocated to the wire gripper body member 12, the operating member 14, and the movable gripping body member 16 than the coupling member 18 to thus establish weight distribution whereby a more weight is allocated in a direction in which the coupling member 18 is pushed back than in a direction in which the coupling member 18 is pulled. A grasp portion 1500 for grasping the wire gripper 1000 is provided in a region near the center of gravity and/or on the pulling side of the coupling member 18; and the grasp portion 1500 is composed of a coupling member body 80 of the coupling member 18 and the coupling member guide 26 projected downward at the pulling side of the wire gripper body member 12 with the grasp portion 1500 being formed so that the grasp portion 1500 can be grasped by a finger and/or a palm. When the coupling member 18 is positioned on the push-back side of the coupling member 18 (first state), the center of gravity G of the wire gripper 1000 equipped with a cover member 19 is positioned near a rotary shaft 74 for movable gripping body member. When the coupling member 18 is positioned slightly further on the pulling side than the first state (second state), the center of gravity G1 of the wire gripper 1000 equipped with the cover member 19 is positioned slightly further on the pulling side than the rotary shaft 74 for movable gripping body member. When the coupling member 18 is further pulled from the second state (third state), the center of gravity G2 of the wire gripper 1000 equipped with the cover member 19 is positioned further on the pulling side than the position of the center of gravity G1. The center of gravity G3 of the wire gripper 1000 without the cover member 19 is positioned at little bit lower position than the first state.

(a) Coupling Member

The coupling member 18 includes an elongate coupling member body 80 and a ring portion 130 provided at the backward end of the coupling member body 80. The ring portion 130 is bent at a prescribed angle relative to a reference plane including a lateral axis along which the linear body pressing portion 24 and the linear body holding portion 22 extend, along an axis line in a pulling direction from a boundary with the coupling member body 80 to a side contour portion. When the linear body W is gripped between the linear body pressing portion 24 and the linear body holding portion 22, the bending region is formed along the direction in which the linear body pressing portion 24 and the linear body holding portion 22 extend, and positioned along a direction in which the coupling member is pulled at a level lower than or equivalent to the level of the linear body holding portion 22. The coupling member 18 extends from the lower end of the operating member 14 upward in the pulling direction on the far side of the operating member 14 (that is, on the side of the installation portion 24c).

When the linear body pressing portion 24 and the linear body holding portion 22 are placed closer to each other to grip the linear body W due to a smaller diameter thereof, and when the linear body pressing portion 24 and the linear body holding portion 22 are spaced apart from each other to grip the linear body W due to a larger diameter thereof, the coupling member 18 has a sufficient length so that a portion attached to the rotary shaft 72 for coupling member can be positioned further on the pulling side than the vertically downward position of the rotary shaft 74 for movable gripping body member, while a base point t, to which a tensile force of the linear body W is applied, can reach a position near the center line of the linear body W (see FIGS. 25 to 27).

When the linear body pressing portion 24 and the linear body holding portion 22 are placed closer to each other to grip the linear body W due to a smaller diameter thereof, and when the linear body pressing portion 24 and the linear body holding portion 22 are spaced apart from each other to grip the linear body W due to a larger diameter thereof, the coupling member 18 has a sufficient length so that the coupling member 18 can extend from the lower side of the linear body holding portion 22 to a position higher than or equivalent to the height of the linear body holding portion 22, and can be supported by the coupling member guide 26 on the half way (see FIGS. 25 to 27).

The coupling member 18 includes an elongate rod-shaped coupling member body 80 having a rectangular cross-section, a ring portion 130 provided at the backward end of the coupling member body 80, and the thumb hooking portion 1120 provided on the side of the ring portion 130 of the coupling member body 80. The attachment hole 82 for operating member is provided on the forward portion of the coupling member body 80. The attachment hole 64 for coupling member of the operating member 14 and the attachment hole 82 for operating member of the coupling member 18 have the same diameter, and the attachment hole 64 for coupling member and the attachment hole 82 for operating member are arranged side by side so that the outer peripheral edges of these holes are parallel to each other. The coupling member 18 is rotatably attached to the operating member 14 about the rotary shaft 72 for coupling member which is inserted through the attachment hole 64 for coupling member and the attachment hole 82 for operating member.

The guide hole 28 of the coupling member guide 26 is formed at substantially the same height as the support shaft hole 30 of the wire gripper body member 12, and the attachment hole 60 for wire gripper body member of the operating member 14 is formed at substantially the same height as the support shaft hole 30 and the guide hole 28 of the wire gripper body member 12. Therefore, the coupling member 18 attached to the attachment hole 64 for coupling member, which is formed below the attachment hole 60 for wire gripper body member of the operating member 14, is inserted through the guide hole 28 and raised in a direction in which the coupling member 18 is pulled (direction a shown in FIG. 19).

The coupling member 18 is attached to the operating member 14 such that the coupling member 18 is parallel to the top 32a of the thread 32 and the top 40a of the thread 40 of the wire gripper body member 12, and extends along the direction in which the clipping groove 24a of the fixed gripping body 20 and the clipping groove 22a of the movable gripping body member 16 extend. The coupling member 18 rotates about the shaft center 72a of the rotary shaft 72 for coupling member.

The coupling member body 80 of the coupling member 18 has a substantially linear belt-like body and an arc-like and belt-like body gradually curved as it rises upward, and includes an upper end edge and a lower end edge. The left side end of the coupling member body 80 of the coupling member 18 is rotatably attached to the operating member 14 about the rotary shaft 72 for coupling member, and the intermediate portion is supported by the guide hole 28 of the coupling member guide 26.

The guide hole 28 of the coupling member guide 26 is positioned further on the backward side than the position of the rotary shaft 72 for coupling member on the upper side of the rotary shaft 72, and the coupling member body 80 of the coupling member 18 supported by the guide hole 28 of the coupling member guide 26 extends upward on the backward side. The coupling member body 80 of the coupling member 18 has the lower end edge slidably supported by the lower end of the guide hole 28 of the coupling member guide 26.

Figure 23C:
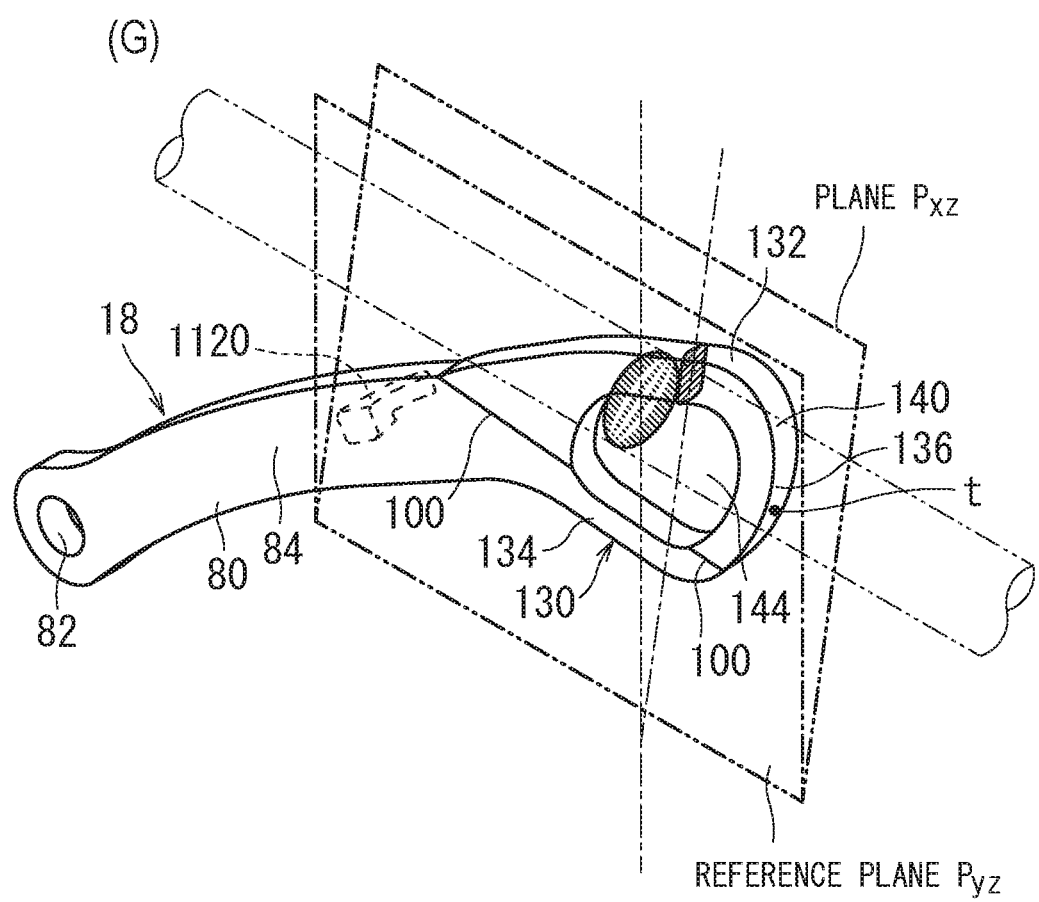
FIG. 23C is an explanatory view of the coupling member.
Figure 24:
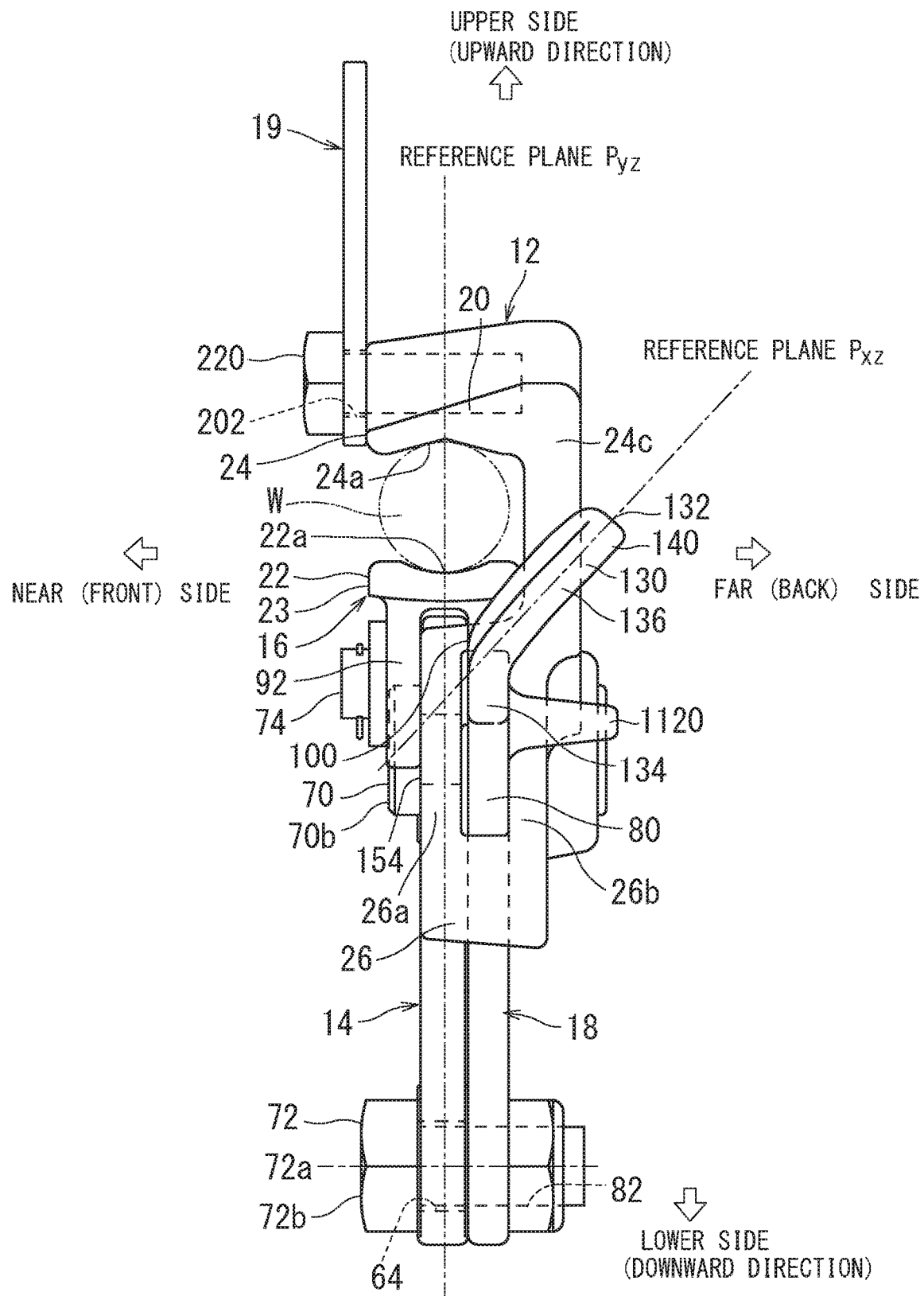
FIG. 24 is a right side view of the wire gripper shown in FIG. 19.

As shown in FIG. 23A(d) and FIG. 23C, the coupling member body 80 extends parallel to the reference plane Pyz including a lateral axis along which the liner body pressing portion 24 of the fixed gripping body 20 and the linear body holding portion 22 of the movable gripping body member 16 extend. The reference plane Pyz is also a plane including a lateral axis along which the linear body W gripped between the fixed gripping body 20 and the movable gripping body member 16 extends.

The ring portion 130 has a substantially elliptical annular shape in plan view, and includes an upper contour portion 132, a lower contour portion 134, and a side contour portion 136. The ring portion 130 has a substantially oval shape, and has a narrow region on the side of the coupling member body 80 and a swollen region at the free end opposite the coupling member body 80.

The upper contour portion 132 forming the upper region of the inclined portion 140 and the lower region of the lower contour portion 134 is formed into a tapered shape where the interval therebetween gradually increases as it proceeds from a boundary 138 between the coupling member body 80 and the ring portion 130 toward the free end. The lower contour portion 134 goes down to a lower level than the lower end edge of the coupling member body 80 as it proceeds toward the side contour portion 136 at the free end.

The ring portion 130 has a pulling hole 144 at its center through which a wire or the like is inserted to pull the linear body W. The pulling hole 144 has the backward side, that is, the hole edge in the pulling direction formed into an arc shape that is easily hooked with a hook or the like of a wire tensioning device.

The coupling member 18 is configured such that the base point t, to which a tensile force is applied when the coupling member 18 is pulled with a hook or the like hooked in the pulling hole 144 of the ring portion 130, is brought to a position near the linear body W. Further, the coupling member 18 is configured such that the base point t, to which a tensile force of the ring portion 130 is applied, is positioned at a height close to the height of the linear body holding portion 22 of the movable gripping body member 16. Further, the coupling member 18 is configured such that the base point t, to which a tensile force is applied, is located at a position higher than the position of the bending region 100. With this configuration, when the wire gripper 1000 is pulled with the hook of a wire tensioning device, the extending direction of the linear body W is substantially parallel to the pulling direction, thereby enabling pulling without tilting the wire gripper 1000, and bending and rotating the linear body W. This can be done substantially in the same manner even when the diameter of the linear body W changes.

The upper region of the ring portion 130 is bent in the bending region 100 toward the far side at a prescribed angle relative to the reference plane Pyz including a lateral axis along which the liner body pressing portion 24 of the fixed gripping body 20 and the linear body holding portion 22 of the movable gripping body member 16 extend. In other words, the ring portion 130 has an inclined portion 140, in which the upper region of the ring portion 130 is bent toward the far side at a prescribed angle relative to the principal surface of the coupling member body 80 in the bending region 100 from the side of the opening 36 to the side of the installation portion 24c of the fixed gripping body 20 so as to avoid the linear body W; and the lower contour portion 134 parallel to the principal surface of the coupling member body 80. The ring portion 130 is configured such that a plane Pxz passing through the inclined portion 140 including the upper region of the pulling hole 144 obliquely intersecting with the reference plane Pyz. Meanwhile, the lower contour portion 134 is formed parallel to the reference plane Pyz. When gripping the linear body W with the wire gripper 1000, since the upper region of the ring portion 130 is bent from the near side toward the far side, even when a user grasps the grasp portion 500 of the wire gripper 1000 and lifts the wire gripper 1000 so as to make an approach to the linear body W, the linear body W can be reliably gripped between the linear body pressing portion 24 and the linear body holding portion 22 while preventing the linear body W from interfering with the ring portion 130. Further, even when the ring portion 130 of the coupling member 18 of the wire gripper 1000, which is mounted to the linear body W, is pulled in the pulling direction with a wire tensioning device or the like, since the upper region of the ring portion 130 is bent from the near side toward the far side, the ring portion 130 can be reliably pulled while preventing the linear body W from interfering with the ring portion 130.

The axis line A1 of the coupling member body 80 (passing through the rotary shaft 72 for coupling member) and the center line A2 of the ring portion 130 (passing through the base point t to which a tensile force of the ring portion 130 is applied) obliquely intersect with each other. The center line A2 of the ring portion 130 in the longitudinal direction passes through between the upper contour portion 132 forming the upper region of the inclined portion 140, and the lower region of the lower contour portion 134.

Figure 21:
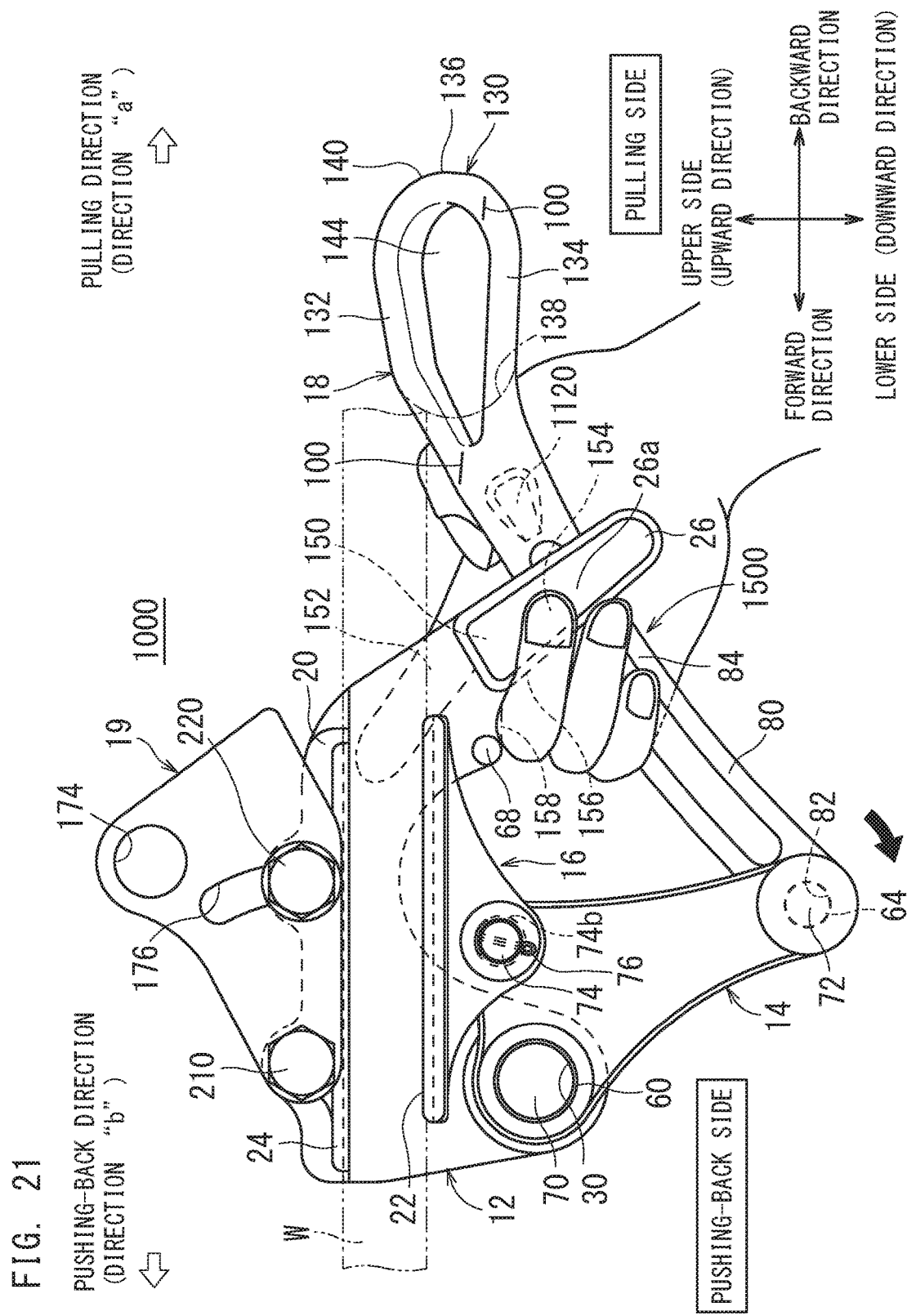
FIG. 21 is a front view illustrating a procedure of attaching the wire gripper to a linear body.
Figure 22:
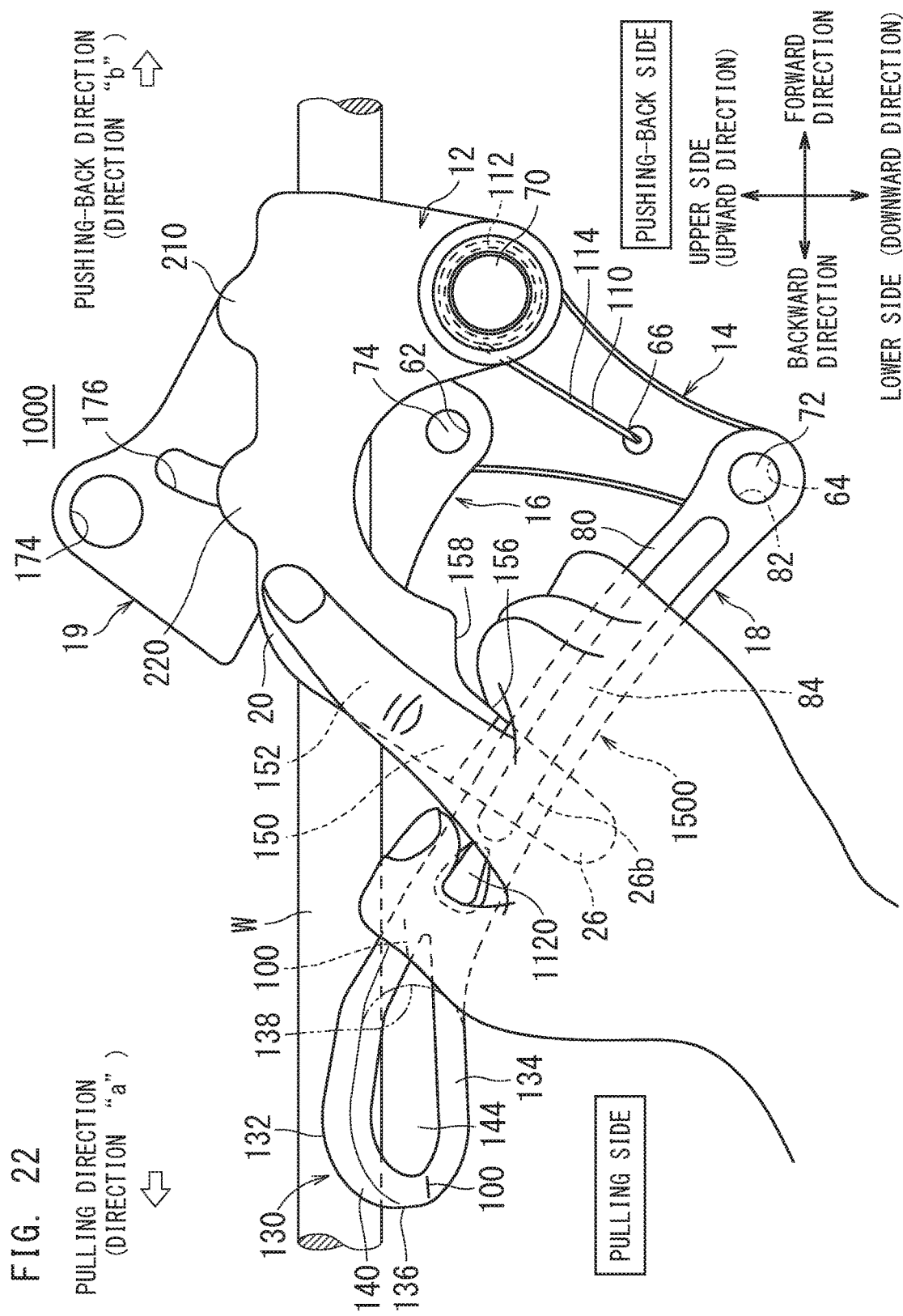
FIG. 22 is a rear side view illustrating a procedure of attaching the wire gripper to a linear body.

As shown in FIG. 21, when the linear body W is gripped between the linear body pressing portion 24 and the linear body holding portion 22, the bending region 100 is substantially parallel to the direction in which the linear body pressing portion 24 and the linear body holding portion 22 extend, and extends over the ring portion 130 while passing through the pulling hole 144 below the linear body W. As such, the ring portion 130 is configured such that the upper region of the inclined portion 140 that is closer to the linear body W is positioned behind the linear body W gripped in a substantially horizontal direction between the linear body pressing portion 24 and the linear body holding portion 22. In other word, the plane Pxz passing through the inclined portion 140 is inclined such that the upper side of the ring portion 130 is positioned on the far side of the linear body W gripped in a substantially horizontal direction between the linear body pressing portion 24 and the linear body holding portion 22.

The bending region 100 continues from the forward side of the ring portion 130 at the upper end edge of the coupling member body 80, that is further on the forward side than the boundary between the coupling member body 80 and the ring portion 130, to the backward side of the ring portion 130. The bending region 100 is substantially linear; obliquely intersects with the axis line A1 of the coupling member body 80; and continues toward the pulling hole 144 of the lower region of the lower contour portion 134. The bending region 100 continues to the lower side on the backward side region and continues to near the boundary with the lower region of the lower contour portion 134 in the backward side region of the ring portion 130; the backward side region of the ring portion 130 is bent. The bending region 100 extends in a position near the center line A2 of the ring portion 130 in a direction substantially parallel to the center line A2, that is, at a small angle made with the center line A2. The bending region 100 is made substantially parallel to the direction in which the linear body W extends, whether the diameter of the linear body W is small, that is, the linear body W is thin, or the diameter of the linear body W is large, that is, the linear body W is thick. That is, the bending region 100 is substantially parallel to the direction in which the linear body pressing portion 24 and the linear body holding portion 22 extend, and made to extend in substantially the same direction as the direction in which the linear body W extends, that is, at a small angle relative to the direction in which the linear body W extends.

When the linear body pressing portion 24 and the linear body holding portion 22 are placed closer to each other to grip the linear body W due to a smaller diameter thereof, and when the linear body pressing portion 24 and the linear body holding portion 22 are spaced apart from each other to grip the linear body W due to a larger diameter thereof (in front view), the bending region 100 of the ring portion 130 is positioned substantially at the same height as, or slightly higher than or slightly lower than the height of the linear body holding portion (see FIGS. 25 to 27). When the linear body pressing portion 24 and the linear body holding portion 22 are placed closer to each other to grip the linear body W due to a smaller diameter thereof, and when the linear body pressing portion 24 and the linear body holding portion 22 are spaced apart from each other to grip the linear body W due to a larger diameter thereof (in front view), the bending region 100 of the ring portion 130 is positioned substantially at the same height as, or slightly higher than or slightly lower than the height of the support shaft 70 and the rotary shaft 74 for movable gripping body member (see FIGS. 25 to 27).

The ring portion 130 is bent at a prescribed angle by bending, for example, by forging, and thus a mechanical stress applied to the bending portion is small so that the mechanical stress of the coupling member 18 is almost free from change. Further, bending is performed in the bending region 100 extending over at least the ring portion 130, and thus the mechanical stress created during bending is dispersed in the entire ring portion 130. The extending direction of the bending region 100 is substantially parallel to the center line A2 of the ring portion 130 (passing through the base point t to which a tensile force of the ring portion 130 is applied). As such, the mechanical strength of the coupling member 18 is further prevented from decreasing, thereby improving the durability of the coupling member 18.

Further, the prescribed angle is made such that the outer peripheral surface of the linear body W comes closer to the surface of the ring portion 130 when the linear body W is gripped between the linear body pressing portion 24 and the linear body holding portion 22.

According to the second embodiment of the present invention, the prescribed angle, that is, the angle between the reference plane Pyz including a lateral axis along which the linear body pressing portion 24 of the fixed gripping body 20 and the linear body holding portion 22 of the movable gripping body member 16 extend, and the plane Pxz passing through the inclined portion 140 including the upper region of the pulling hole 144 of the ring portion 130, is 25 degrees, and the prescribed angle is within the range from 15 to 40 degrees. When the prescribed angle is less than 15 degrees, the likelihood of the interference between the linear body W and the ring portion 130 increases, and if the prescribed angle exceeds forty degrees, the pulling direction hardly become substantially parallel to the direction in which the linear body W extends when pulling the coupling member 18 with a hook or a belt of a wire tensioning device. With this configuration, the ring portion 130 can make a reliable approach to the linear body W without the interference between the ring portion 130 and the linear body W. As such, the center line A2 of the ring portion 130 is not significantly spaced apart from the center of the linear body W. That is, when the ring portion 130 is pulled with a hook or belt of a tensioning device hooked in the pulling hole 144, the ring portion 130 is pulled at a position near the center of the linear body W, and thus the linear body W can be pulled while the wire gripper 1000 is not subjected to inclination, or the linear body W is not subjected to bending. As a result, the damages created on the surface of the linear body W due to bending can be minimized.

(b) Grasp Portion

The wire gripper 1000 according to a second embodiment of the present invention is provided with a grasp portion 1500 to allow a user to grasp the wire gripper 1000 with a single hand. The grasp portion 1500 is mainly constituted by the coupling member guide 26, the coupling member body 80, and the thumb hooking portion 1120.

The grasp portion 1500 of the coupling member guide 26 is located at a position lower than the positions of the linear body pressing portion 24 and the linear body holding portion 22, and at a position higher than the position of the support shaft 30.

On the far side surface (the rear side surface), the coupling member guide 26 is provided with a hand contact portion 150 with which a palm and a portion near the base of a forefinger of the human hand are brought into contact. On the far side surface (the rear side surface), the wire gripper body member 12 is provided with a forefinger contact portion 152 with which a forefinger is brought into contact in the region where the coupling member guide 26 is formed and around the upper portion of the coupling member guide 26. On the near side (the front side), the coupling member guide 26 of the wire gripper body member 12 is provided with a middle finger contact portion 154 with which the pad of a middle finger reaching the near side from the far side (the rear side) of the coupling member 18 is brought into contact. On the surface of the forward side or the surface of the push-back side, the wire gripper body member 12 is provided with a grip portion 156 with which a portion near the base of a middle finger is brought into contact. The grip portion 156 is pulled backward (pulling side) with the middle finger applied thereto.

In the coupling member guide 26, the body portion 26a on the near side of the guide hole 28 constitutes the middle finger contact portion 154, and the middle finger contact portion 154 is formed downward on the lower side of the clipping groove 22a of the linear holding portion 22. In the coupling member guide 26, a body portion 26b on the far side of the coupling member guide 26 opposite the body portion 26a constituting the middle finger contact portion 154 with the guide hole 28 sandwiched therebetween constitutes the forefinger contact portion 152, and the forefinger contact portion 152 is formed downward on the lower portion of the installation portion 24c of the linear body pressing portion 24. The guide hole 28 formed between the body portion 26a and the body portion 26b has the coupling member body 80 of the coupling member 18 inserted therethrough.

The wire gripper body member 12 is provided with a finger contact portion 158 for supporting the wire gripper body member 12 with the upper portion of a finger between a second joint from the tip of a middle finger (PIP joint) and a joint at the base of a finger (MP joint). The finger contact portion 158 has a horizontal surface extending further backward than the support 68 for movable gripping body member, that intersect with the front surface of the coupling member guide 26.

The thumb hooking portion 1120 is provided to allow a thumb to hook thereon when a user grips the wire gripper 1000 with his or her hand. With this configuration, the wire gripper 1000 can be reliably gripped by a single hand. The protruded thumb hooking portion 1120 is formed at an intermediate position in a height direction in the region near the installation portion 24c of the fixed gripping body 20 on the side of the ring portion 130 of the coupling member body 80 and projects to the far side (rear side) of the coupling member body 80 substantially orthogonal to the coupling member body 80. The protruded thumb hooking portion 1120 is orthogonal to the direction in which the coupling member 18 is pulled (direction a shown in FIG. 19). The protruded thumb hooking portion 1120 is positioned ahead of the ring portion 130, and the coupling member guide 26 is ahead of the protruded thumb hooking portion 1120. The protruded thumb hooking portion 1120 and the coupling member guide 26 are position further on the backward side than the backward side of the linear pressing portion 24 and the linear holding portion 22 with the linear body W gripped therebetween, but further on the forward side than the ring portion 130.

The uppermost end of the thumb hooking portion 1120 is formed at a position lower than the center line A2 of the ring portion 130, and has the same height as the height of bending or slightly lower than that at the position where the bent region is bendable. Since the thumb hooking portion 1120 is located at a position lower than the center line A2 of the ring portion 130, the linear body W is prevented from interfering with the thumb hooked on the thumb hooking portion 1120 when the wire gripper 1000 is grasped at the grasp portion 1500, and lifted toward the linear body W so as to come closer to the linear body W, and when the linear body W is sandwiched and gripped between the linear body pressing portion 24 and the linear body holding portion 22.

The coupling member body 80 is provided with the finger contact portion 84 to which the pads of a middle finger and an annular finger are applied when grasping the wire gripper 1000. The thumb hooking portion 1120 and the coupling member guide 26 are formed at positions close to the linear pressing portion 24 and the linear holding portion 22, and thus the weight is relatively well balanced. As such, the wire gripper 1000 can be easily lifted and hooked onto the linear body W by grasping the portions of the wire gripper 1000 extending over the thumb hooking portion 1120 and the coupling member guide 26 with a single hand. According to an embodiment of the present invention, in order that the wire gripper 1000 may be grasped by a thumb hooked onto the thumb hooking portion 1120 and by a forefinger, a middle finger, and an annular finger hooked onto the forward end of the coupling member guide 26 in a state where the ring portion 130 is pulled backward, a length L1 between the thumb hooking portion 1120 and the coupling member guide 26 is set within the range of 3 to 6 cm corresponding to a length L2 between a thumb and a forefinger.

The coupling member 18 includes an elongate coupling member body 80 and a ring portion 130 provided at the backward end of the coupling member body 80, and the thumb hooking portion 1120 of the coupling member 18 onto which a thumb is hooked when gripping the wire gripper 1000 with a user's hand is provided on the side of the ring portion 130 of the coupling member body 80 in the region on the side of the installation portion 24c of the fixed gripping body 20. The ring portion 130 is bent at a prescribed angle relative to a reference plane including a lateral axis along which the linear body pressing portion 24 and the linear body holding portion 22 extend, along an axis line in a pulling direction from the boundary between the ring portion 130 and the coupling member body 80 to the side contour portion. When the linear body W is gripped between the linear body pressing portion 24 and the linear body holding portion 22, the bending region is formed along the direction in which the linear body pressing portion 24 and the linear body holding portion 22 extend, and positioned along a direction in which a lever member is pulled at a level lower than or equivalent to the level of the linear body holding portion 22. The bending of the bent region may be performed by forging. The uppermost end of the thumb hooking portion 1120 is formed at a position lower than the center line A2 of the ring portion 130, and has the same height as the height of bending or slightly lower than that at the position where the bending region is bendable. Since the thumb hooking portion 1120 is located at a position lower than the center line A2 of the ring portion 130, the linear body W is prevented from interfering with the thumb hooked on the thumb hooking portion 1120 when the wire gripper 1000 is grasped at the grasp portion 1500, and lifted toward the linear body W so as to come closer to the linear body W, and when the linear body W is sandwiched and gripped between the linear body pressing portion 24 and the linear body holding portion 22.

As described above, embodiments according to the present invention are disclosed, but the present invention is not limited to the descriptions. That is, it should be understood that various alterations can be made to the embodiments described above in relation to mechanism, shape, material, quantity, and position or arrangement without departing from the technical ideas and the scope of objects, and those alterations should be incorporated in the present invention.

INDUSTRIAL APPLICABILITY

The wire gripper according to the present invention can be applied to a linear body or the like used for pulling grapevine trellis and trees not limited to electric wires.

DESCRIPTION OF THE REFERENCE NUMERALS

10, 1000 wire gripper
12 wire gripper body member
12a wire gripper body
14 operating member
16 movable gripping body member
18 coupling member
19 cover member
20 fixed gripping body
22 linear body holding portion
24 linear body pressing portion
24c installation portion
22a, 24a clipping groove
26 coupling member guide
26a body portion
26b body portion
28 guide hole
30 support shaft hole
32, 40 thread
32a, 40a top
36 opening
42 space
44 spring groove
48, 66 hook hole
60 attachment hole for wire gripper body member
62 attachment hole for movable gripping body member
64 attachment hole for coupling member
68 support for movable gripping body member
60a, 62a, 64a top of swollen portion around rear-side hole
60b, 62b, 64b top of swollen portion around front-side hole
70 support shaft
72 rotary shaft for coupling member
74 rotary shaft for movable gripping body member
70a, 72a, 74a shaft center
70b, 72b, 74b flange
76 split pin
80 coupling member body
82 attachment hole for operating member
84 finger contact portion
92 attachment portion for first operating member
94 attachment portion for second operating member
96 attachment hole for first operating member
98 attachment hole for second operating member
98a step portion
100 bending region
110 coil spring
112 coil portion
114 first hook
116 second hook
120, 1120 thumb hooking portion
130 ring portion
132 upper contour portion
134 lower contour portion
136 side contour portion
138 boundary
140 inclined portion
144 pulling hole
150 hand contact portion
152 forefinger contact portion
154 middle finger contact portion
156 grip portion
158 finger contact portion
160 attachment hole for cover member
162 screw hole
170 attachment hole for wire gripper body member
174 hook opening
176 long hole for regulating movable range
180 washer
210 rotary shaft for cover member
220 pressing body
210a, 220a shaft center
210b, 220b flange
300 coupling means
500, 1500 grasp portion
t base point where a tensile force is applied
W linear body
Pyz reference plane including a lateral axis along which a liner body pressing portion and a linear body holding portion extend
A1 axis line of coupling member body
A2 center line of ring portion

What is claimed is:

1. A wire gripper comprising:
a wire gripper body member including a fixed gripping body having a linear body pressing portion;
an operating member mounted to the wire gripper body member pivotably about a support shaft;
a movable gripping body member including a linear body holding portion that pivotally moves toward the linear body pressing portion of the fixed gripping body in accordance with a pivotal movement of the operating member; and
a coupling member coupled to the operating member by a rotary shaft for pivotally moving the operating member relative to the coupling member, wherein
the coupling member includes an elongate coupling member body including a front end connected to the operating member by the rotary shaft and a rear end opposite the front end, and the coupling member includes a ring portion at the rear end of the coupling member body,
the coupling member includes a first lateral side and a second lateral side opposite the first lateral side, the ring portion including a hole extending through the coupling member in a lateral direction from the first lateral side to the second lateral side,
a line extending along a center of the operating member, in the end view, defines a vertical axis, the vertical axis passing through each of the linear body pressing portion and the linear body holding portion,
a direction in which a linear body passes between the linear body pressing portion and the linear body holding portion defines a pulling direction,
a first reference plane is parallel to each of the pulling direction and the vertical axis,
the ring portion includes a lower region and an upper region, separated by a bend region, the upper region bent in the lateral direction by the bend region so as to be inclined relative to the lower region to form an inclined portion, such that a second reference plane extending through a center of the inclined portion, in the end view, intersects the first reference plane,
the ring portion includes a side contour portion at the rear end of the coupling member, an upper contour portion extending from the side contour portion toward the front end of the coupling member, and a lower contour portion extending from the side contour portion toward the front end of the coupling member, the upper contour portion being in the upper region of the ring portion and the lower contour portion being in the lower region of the ring portion,
the upper contour portion and the lower contour portion have a tapered shape relative to each other, such that an interval between the upper contour portion and the lower contour portion increases in a direction from the front end of the coupling member to the rear end of the coupling member,
the inclined portion is configured such that when the linear body is gripped between the linear body pressing portion and the linear body holding portion, the first lateral side in the inclined portion faces the linear body, and the bend region is at a level lower than or equivalent to a level of the linear body holding portion.

2. The wire gripper according to claim 1,
wherein the coupling member includes a thumb hooking portion extending from the second lateral side of the coupling member between the front end of the coupling member and the ring portion of the coupling member.

3. The wire gripper according to claim 1,
wherein a thumb hooking portion is located beneath the linear body, in the end view, when the linear body is gripped between the linear body pressing portion and the linear body holding portion.

4. A wire gripper comprising:
a wire gripper body member including a fixed gripping body having a linear body pressing portion and a coupling member guide;
an operating member mounted to the wire gripper body member pivotably about a support shaft;
a movable gripping body member including a linear body holding portion that pivotally moves toward the linear body pressing portion of the fixed gripping body in accordance with the pivotal movement of the operating member; and
a coupling member coupled to the operating member by a rotary shaft for pivotally moving the operating member relative to the coupling member,
the coupling member includes an elongate coupling member body including a front end connected to the operating member by the rotary shaft and a rear end opposite the front end, and the coupling member includes a ring portion at the rear end of the coupling member body,
the coupling member includes a first lateral side and a second lateral side opposite the first lateral side, the ring portion including a hole extending through the coupling member in a lateral direction from the first lateral side to the second lateral side,
a line extending along a center of the operating member, in the end view, defines a vertical axis, the vertical axis passing through each of the linear body pressing portion and the linear body holding portion,
a direction in which a linear body passes between the linear body pressing portion and the linear body holding portion defines a pulling direction,
a first reference plane is parallel to each of the pulling direction and the vertical axis,
the ring portion includes a lower region and an upper region, separated by a bend region, the upper region bent in the lateral direction by the bend region so as to be inclined relative to the lower region to form an inclined portion, such that a second reference plane extending through a center of the inclined portion, in the end view, intersects the first reference plane,
the inclined portion is configured such that when the linear body is gripped between the linear body pressing portion and the linear body holding portion, the first lateral side in the inclined portion faces the linear body, and the bend region is at a level lower than or equivalent to a level of the linear body holding portion,
wherein a first portion of the coupling member body and a first portion of the coupling member guide define a grasp portion of the wire gripper,
the grasp portion includes a thumb hooking portion between the ring portion a portion of the coupling member and of the coupling member surrounded by the coupling member guide, and
the grasp portion is configured such that when a thumb of a hand hooks the thumb hooking portion, a palm of the hand rests against the second lateral side of the coupling member.

5. A wire gripper comprising:
a wire gripper body member including a fixed gripping body having a linear body pressing portion;

an operating member mounted to the wire gripper body member by a support shaft, so as to rotate around the support shaft relative to the gripper body member;

a movable gripping body member including a linear body holding portion that pivotally moves toward the linear body pressing portion of the fixed gripping body in accordance with a pivotal movement of the operating member; and a coupling member coupled to the operating member by a rotary shaft so as to rotate around the rotary shaft relative to the operating member, wherein the coupling member includes a front end and a rear end opposite the front end, the rotary shaft located at the front end and a ring portion located at the rear end, wherein the coupling member includes a first lateral side and a second lateral side, the first and second lateral sides extending a length of the coupling member between the front end and the rear end, wherein the ring portion includes a hole extending through the coupling member from the first lateral side to the second lateral side, and wherein the ring portion includes a lower region and an upper region, the upper region being inclined at an angle, in a lateral direction, relative to the lower region to define an inclined portion, such that, in an end view, a vertical line passes through a center of the operating member, a portion of the coupling member between the front end and the lower region of the ring portion is parallel to the vertical line, and a line passing through a center of the inclined portion, in a direction from the rear end toward the lower region, intersects the vertical line.

* * * * *